United States Patent
Mishra

(10) Patent No.: US 11,397,087 B1
(45) Date of Patent: Jul. 26, 2022

(54) OCEAN-BASED STORAGE AND DISTRIBUTION OF ITEMS

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 576 days.

(21) Appl. No.: 16/455,584

(22) Filed: Jun. 27, 2019

(51) Int. Cl.
| | |
|---|---|
| G01C 21/20 | (2006.01) |
| G05D 1/02 | (2020.01) |
| B63B 35/28 | (2006.01) |
| G06Q 10/08 | (2012.01) |
| B63G 8/42 | (2006.01) |
| G08G 3/00 | (2006.01) |
| B63B 35/68 | (2006.01) |

(52) U.S. Cl.
CPC ............ *G01C 21/203* (2013.01); *B63B 35/28* (2013.01); *B63B 35/68* (2013.01); *B63G 8/42* (2013.01); *G05D 1/0206* (2013.01); *G06Q 10/083* (2013.01); *G08G 3/00* (2013.01); *B63B 2213/00* (2013.01); *B63G 2008/425* (2013.01)

(58) Field of Classification Search
CPC ....... G01C 21/203; B63B 35/28; B63B 35/68; B63B 2213/00; B63G 8/42; B63G 2008/425; G05D 1/0206; G06Q 10/083; G08G 3/00
USPC ........................................................ 705/333
See application file for complete search history.

(56) References Cited

U.S. PATENT DOCUMENTS

| | | | | |
|---|---|---|---|---|
| 6,256,264 B1* | 7/2001 | Beckman | ................ | G01S 15/66 367/130 |
| 8,086,408 B1* | 12/2011 | Majzlik | ................ | G01V 1/3835 702/14 |
| 9,705,607 B2* | 7/2017 | Dugan | ................... | H04B 13/02 |
| 10,150,680 B1* | 12/2018 | Kurani | ................... | G01N 33/18 |
| 10,379,218 B1* | 8/2019 | Spiesberger | ............ | G01S 15/58 |
| 2010/0143038 A1* | 6/2010 | Cobb | .................. | E02B 15/0814 405/63 |

(Continued)

OTHER PUBLICATIONS

"Measurement and Analysis of Physical and Climatic Distribution Environment for Air Package Shipment" Published by STIC (Year: 2015).*

*Primary Examiner* — Zeina Elchanti
(74) *Attorney, Agent, or Firm* — Athorus, PLLC

(57) ABSTRACT

The Earth's oceans naturally distribute items aboard barges or other carrying vessels in an efficient manner. Carrying vessels are inserted into gyres, currents, eddies or other sources of flow by support vessels, which may be manned or autonomous. A carrying vessel may be transported from a port or other origin to a point within a naturally occurring flow of seawater by a support vessel, and permitted to travel at speeds and in directions defined by natural factors, from one point to another point, for extended durations. A carrying vessel may be removed from a naturally occurring flow of seawater by a support vessel and transported to a port or other destination. Flow rates, transit times and points within naturally occurring flows at which a carrying vessel may engage with or disengage from a support vessel may be determined according to a machine learning model or in any other manner.

20 Claims, 55 Drawing Sheets

(56) References Cited

U.S. PATENT DOCUMENTS

| | | | |
|---|---|---|---|
| 2011/0018275 A1* | 1/2011 | Sidenmark | F03B 13/1815 |
| | | | 290/53 |
| 2012/0316769 A1* | 12/2012 | Gagliardi | G08G 3/02 |
| | | | 701/300 |
| 2013/0063300 A1* | 3/2013 | O'Regan | G01S 19/14 |
| | | | 342/357.55 |
| 2013/0155806 A1* | 6/2013 | Brizard | G01V 1/3817 |
| | | | 367/16 |
| 2013/0218543 A1* | 8/2013 | Bourgeois | G01C 21/20 |
| | | | 703/8 |
| 2015/0355214 A1* | 12/2015 | Barron | G01P 5/001 |
| | | | 702/2 |
| 2016/0001856 A1* | 1/2016 | Gentle | B63B 49/00 |
| | | | 701/301 |
| 2016/0018377 A1* | 1/2016 | Corbett | G01N 33/1886 |
| | | | 901/1 |
| 2016/0225162 A1* | 8/2016 | Cody | G01C 13/002 |
| 2016/0306059 A1* | 10/2016 | Davies | G01V 1/3817 |
| 2016/0309692 A1* | 10/2016 | Opshaug | A01K 69/08 |
| 2016/0370187 A1* | 12/2016 | Gatland | G01C 21/203 |
| 2017/0254914 A1* | 9/2017 | Siliqi | G01V 1/3817 |
| 2019/0315440 A1* | 10/2019 | Callaway | B63B 21/56 |
| 2019/0351978 A1* | 11/2019 | Biousse | B63B 45/00 |
| 2020/0198738 A1* | 6/2020 | Hauge | G01V 3/17 |
| 2020/0264326 A1* | 8/2020 | Irving | G01V 1/38 |
| 2020/0398959 A1* | 12/2020 | Pomerantz | B63G 8/001 |
| 2021/0018319 A1* | 1/2021 | Emura | F41G 7/224 |

\* cited by examiner

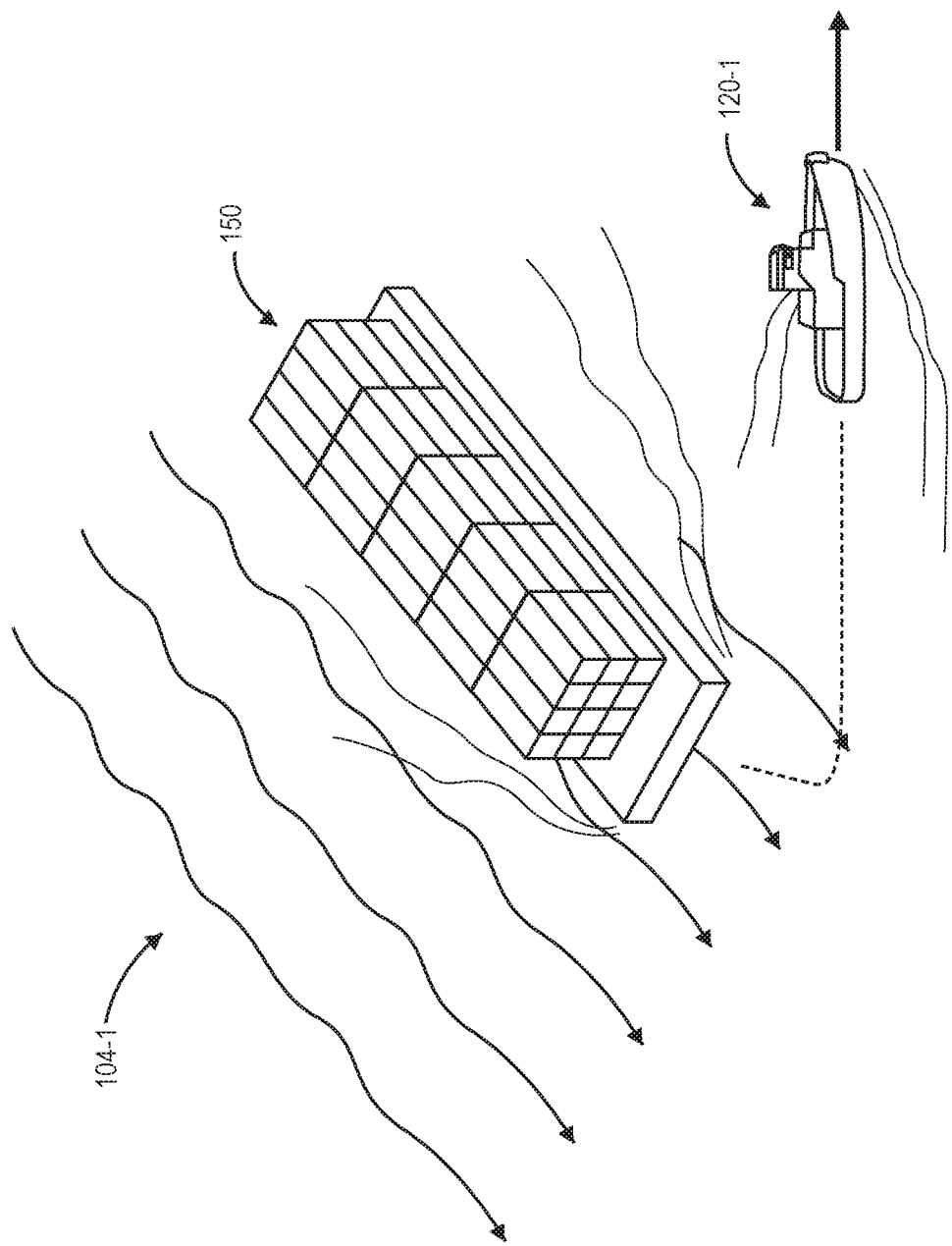

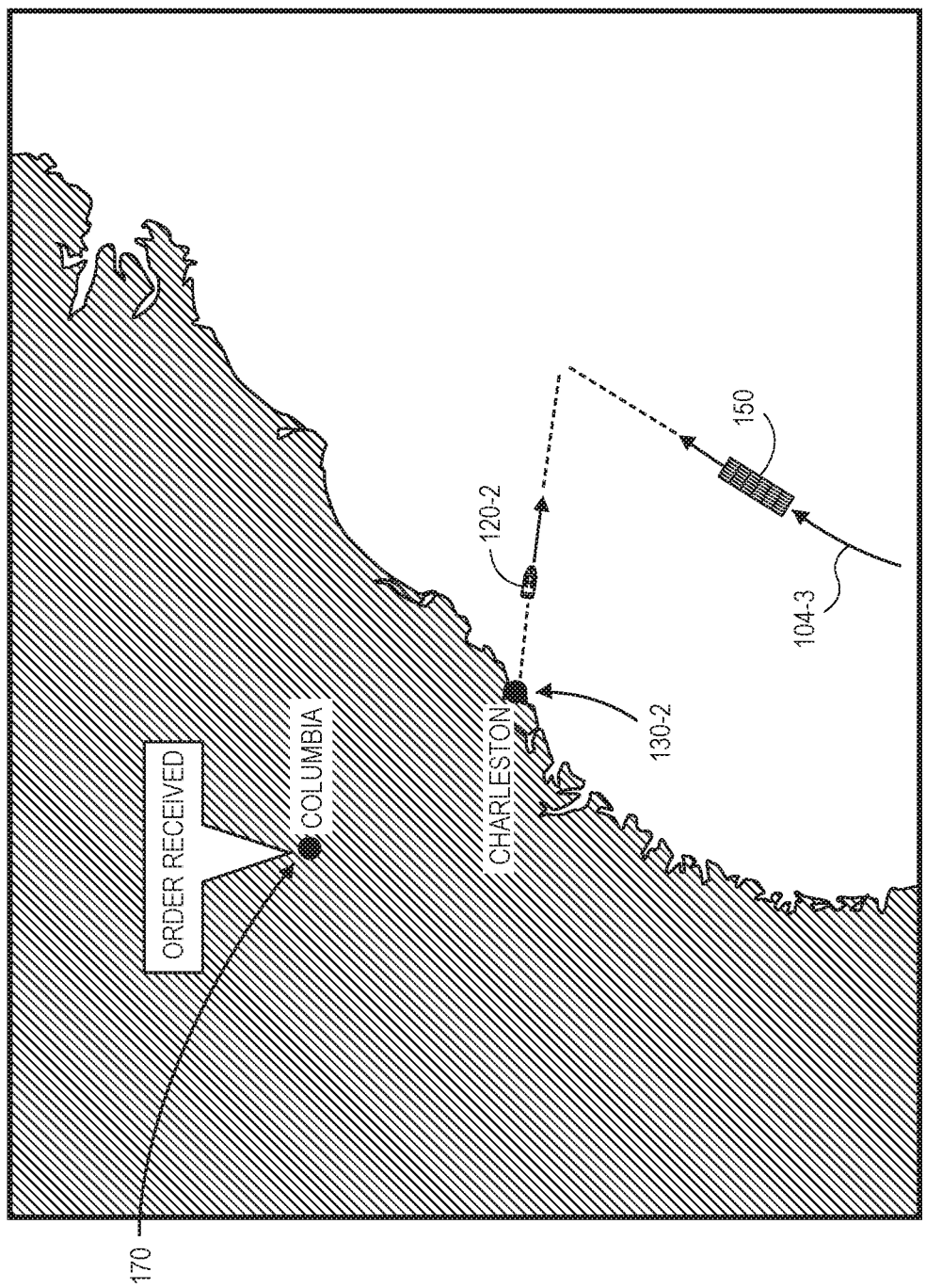

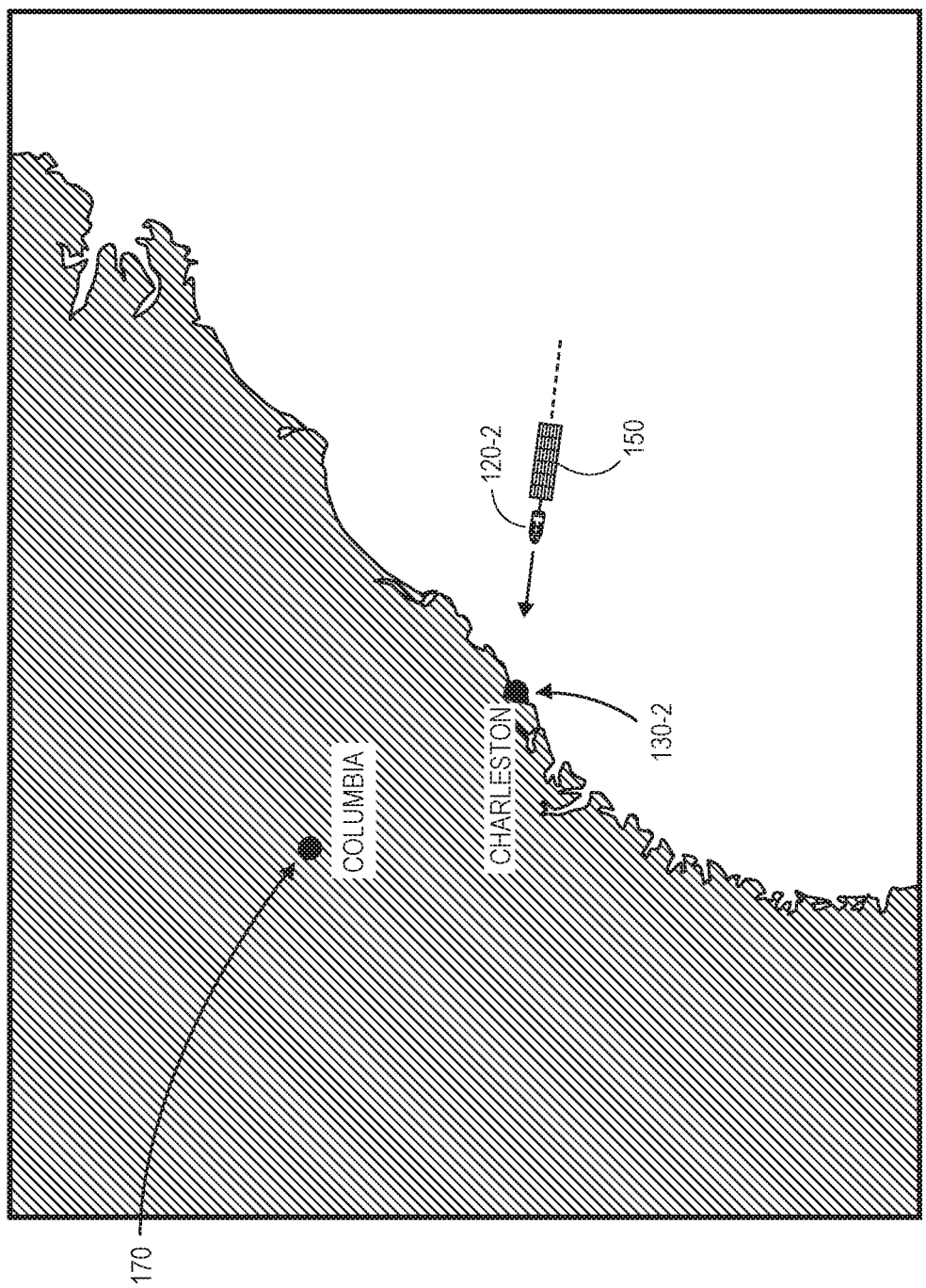

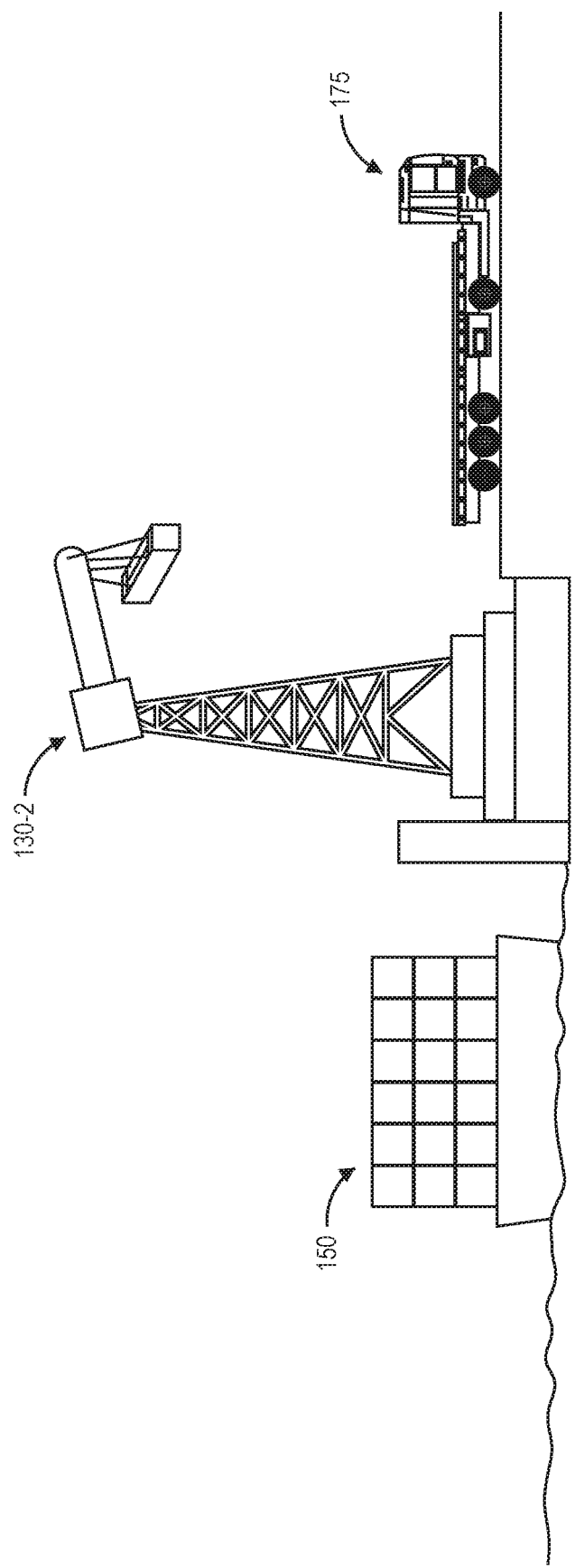

NORTH ATLANTIC GYRE AND CURRENTS

NORTH PACIFIC GYRE AND CURRENTS

SUPPORT VESSEL DEPARTS FROM PORT OF ORIGIN WITH CARRYING VESSELS

SUPPORT VESSEL RETURNS TO PORT AFTER DISENGAGING FROM CARRYING VESSELS WITHIN FLOW PATH

SUPPORT VESSEL ENGAGES WITH CARRYING VESSELS

SUPPORT VESSEL REMOVES CARRYING VESSELS FROM FLOW PATH

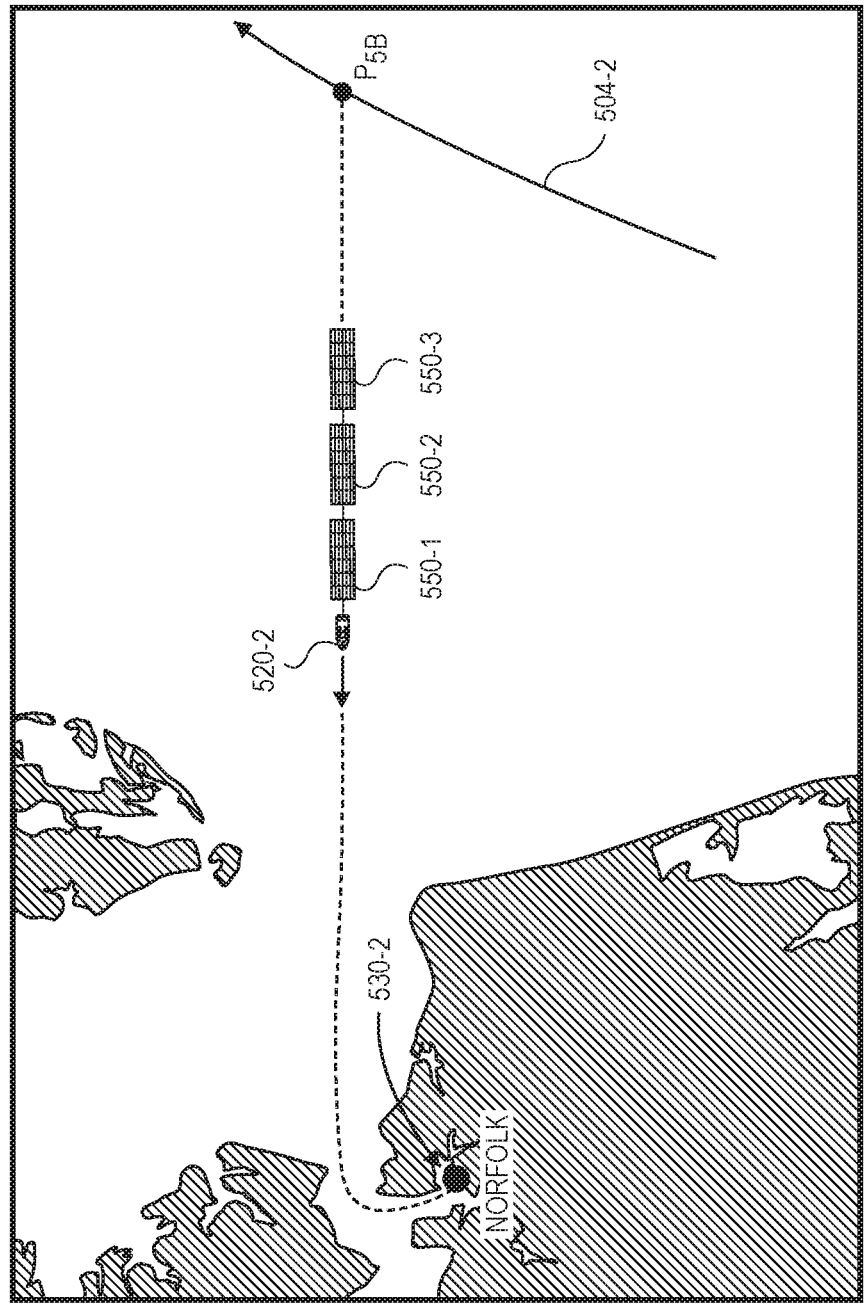
FIG. 5H SUPPORT VESSEL RETURNS TO PORT WITH CARRYING VESSELS

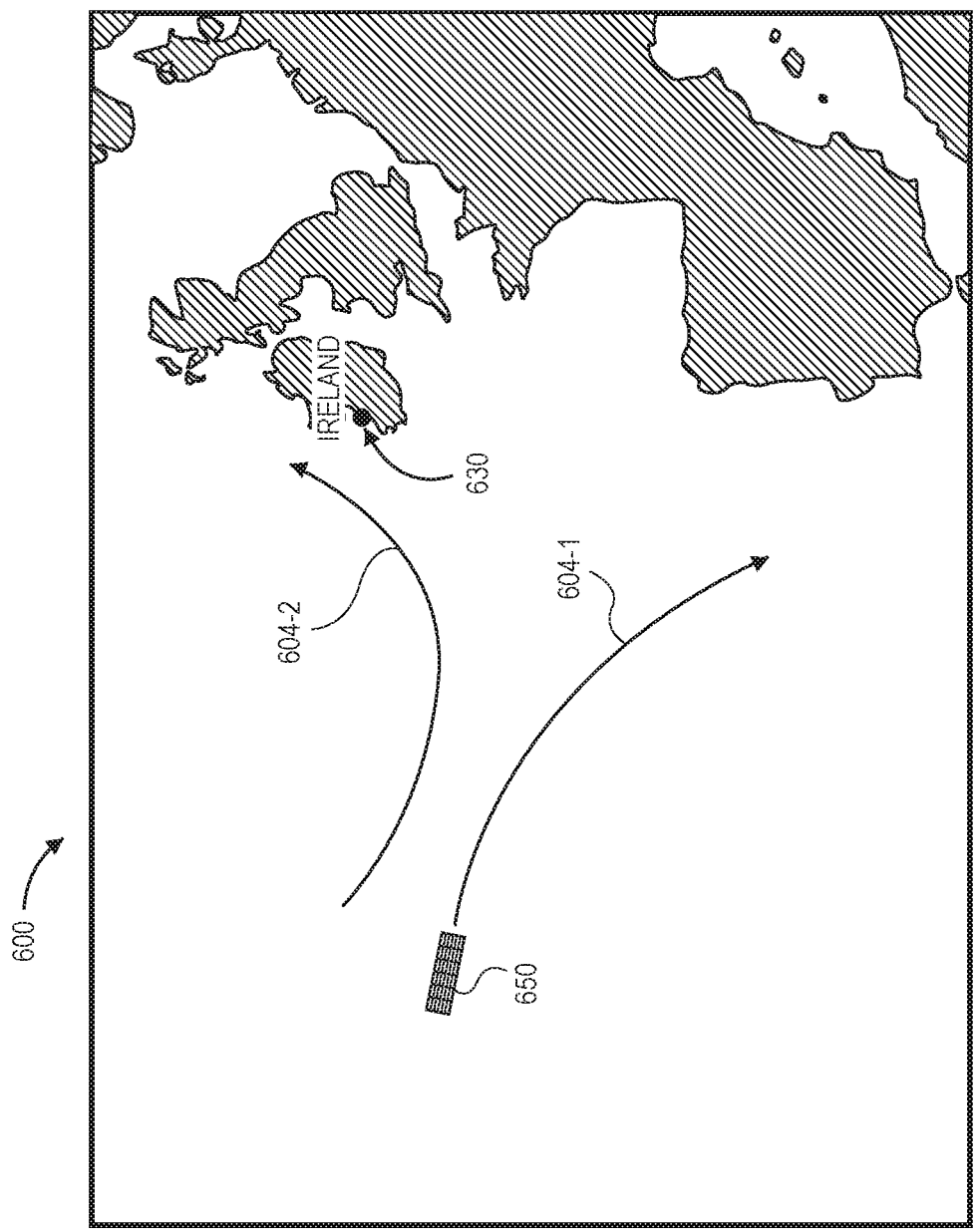
FIG. 6A — CARRYING VESSEL TRAVELS ON FIRST FLOW PATH

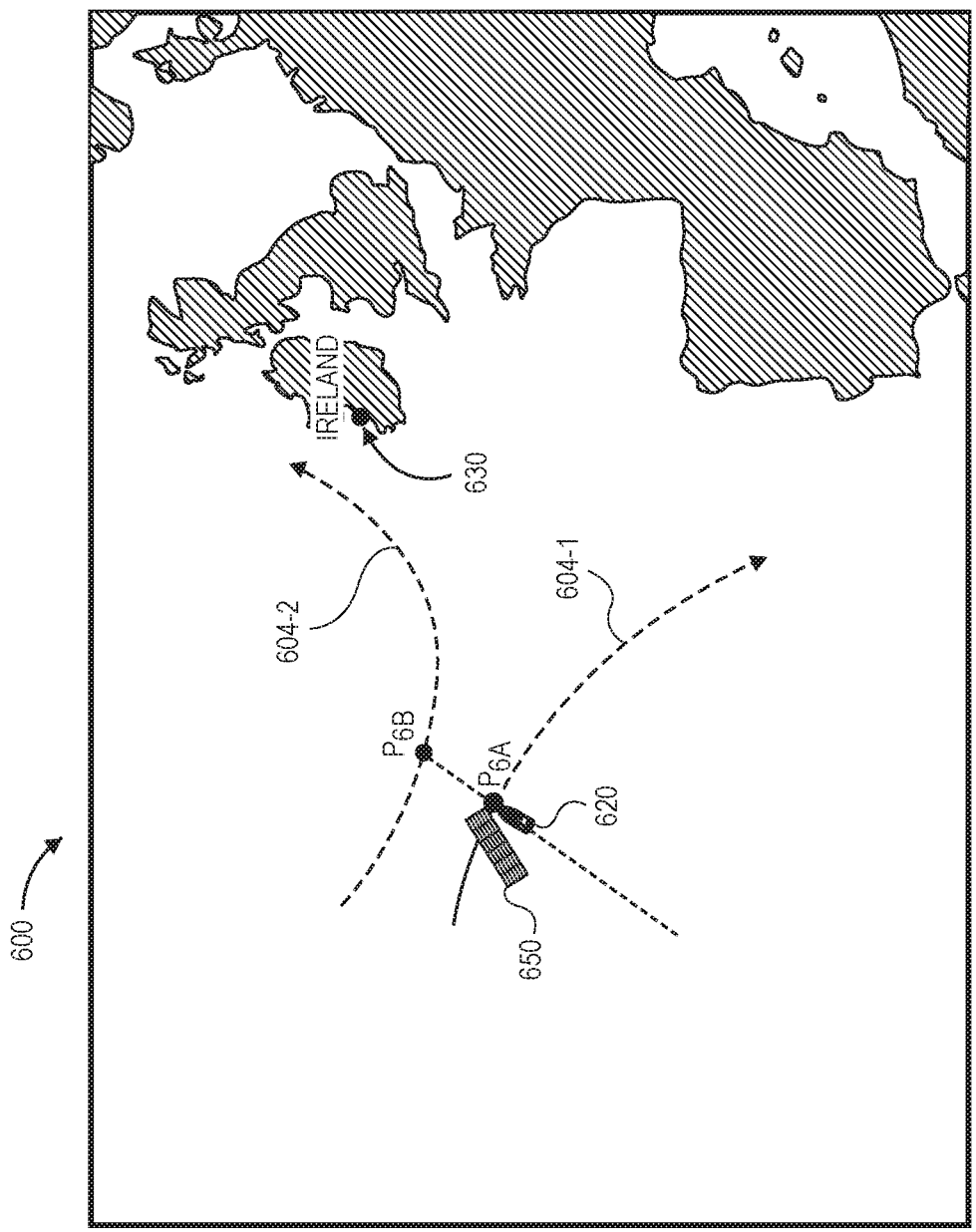

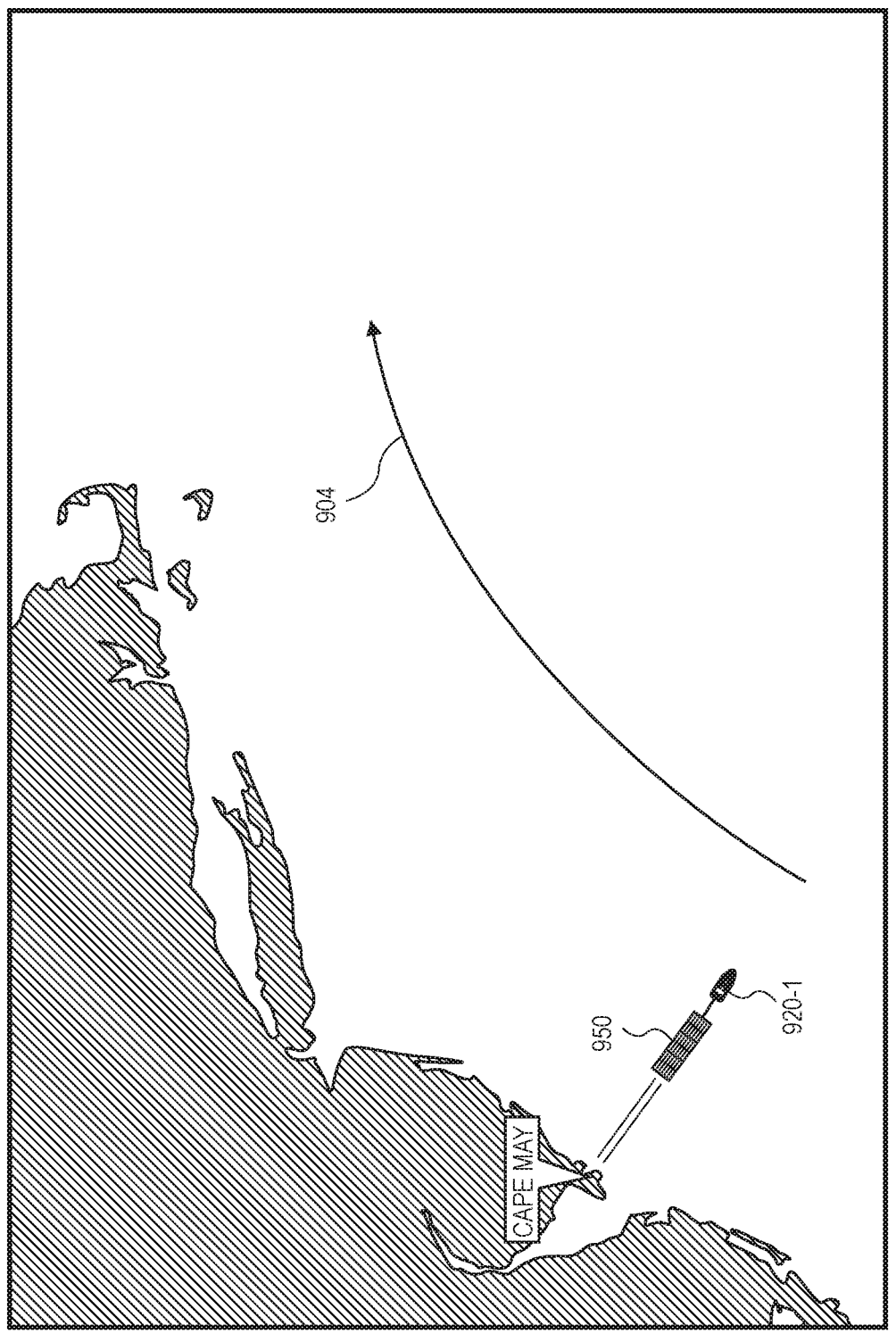

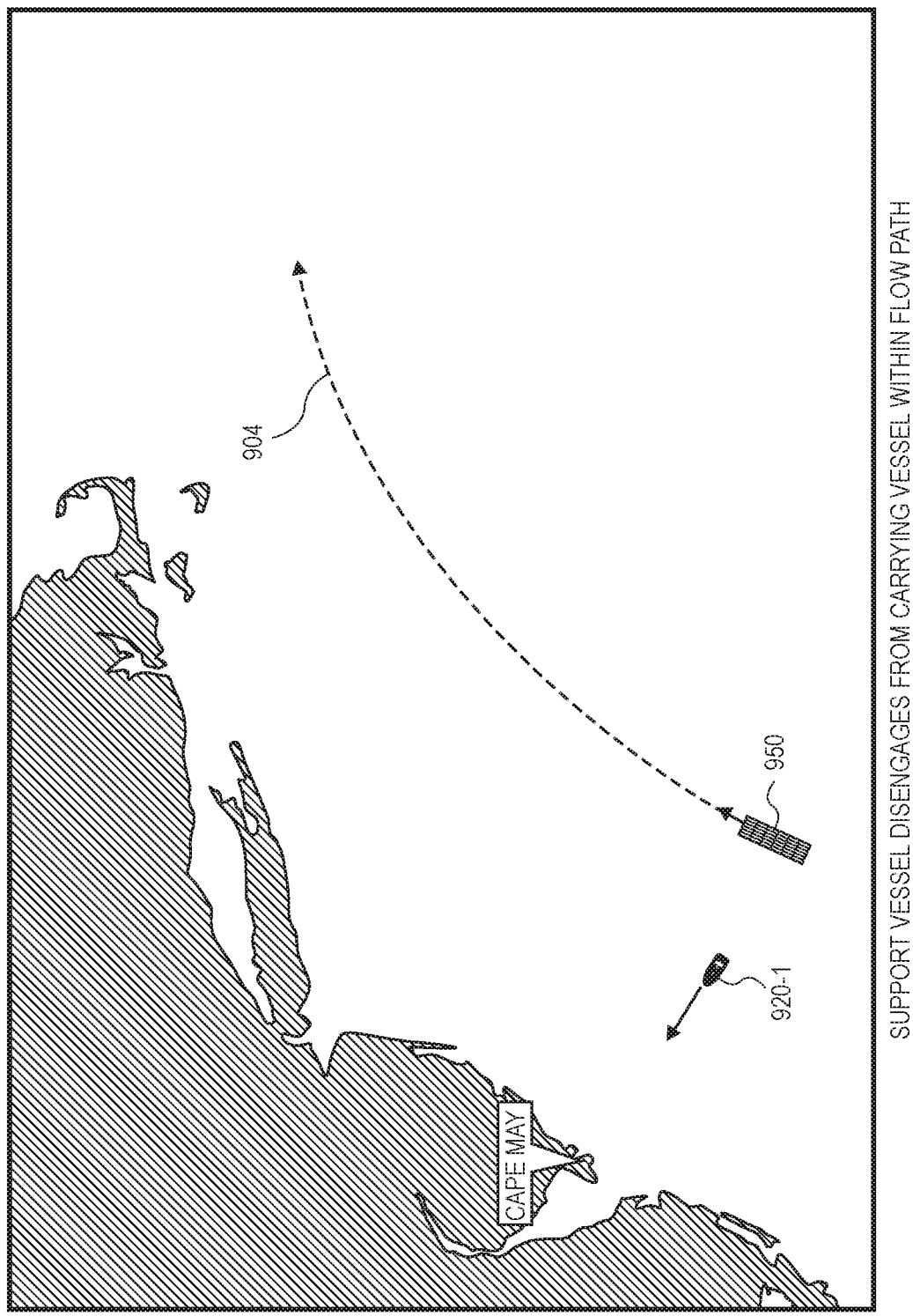

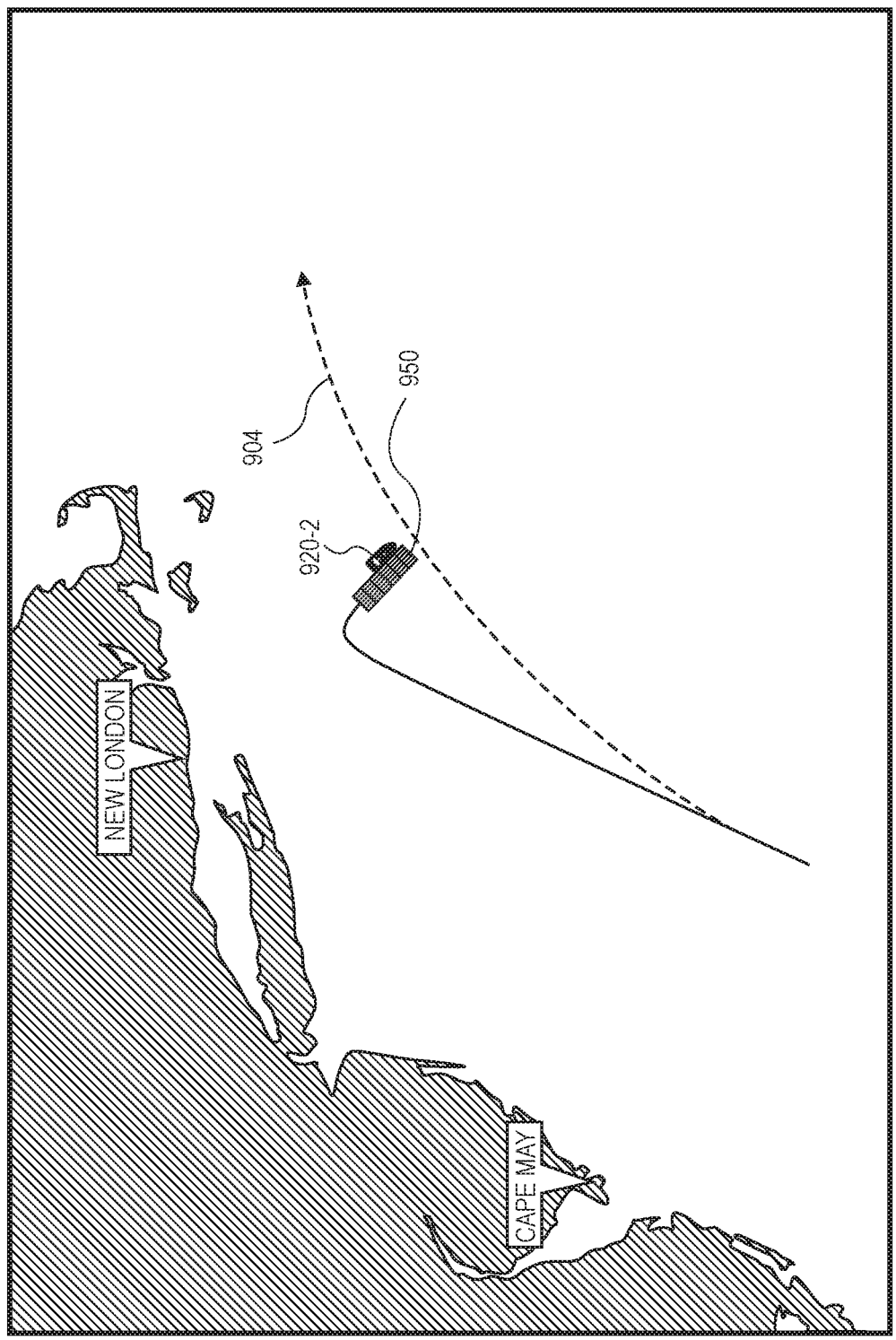
FIG. 9D — SUPPORT VESSEL REPOSITIONS CARRYING VESSEL WITHIN FLOW PATH

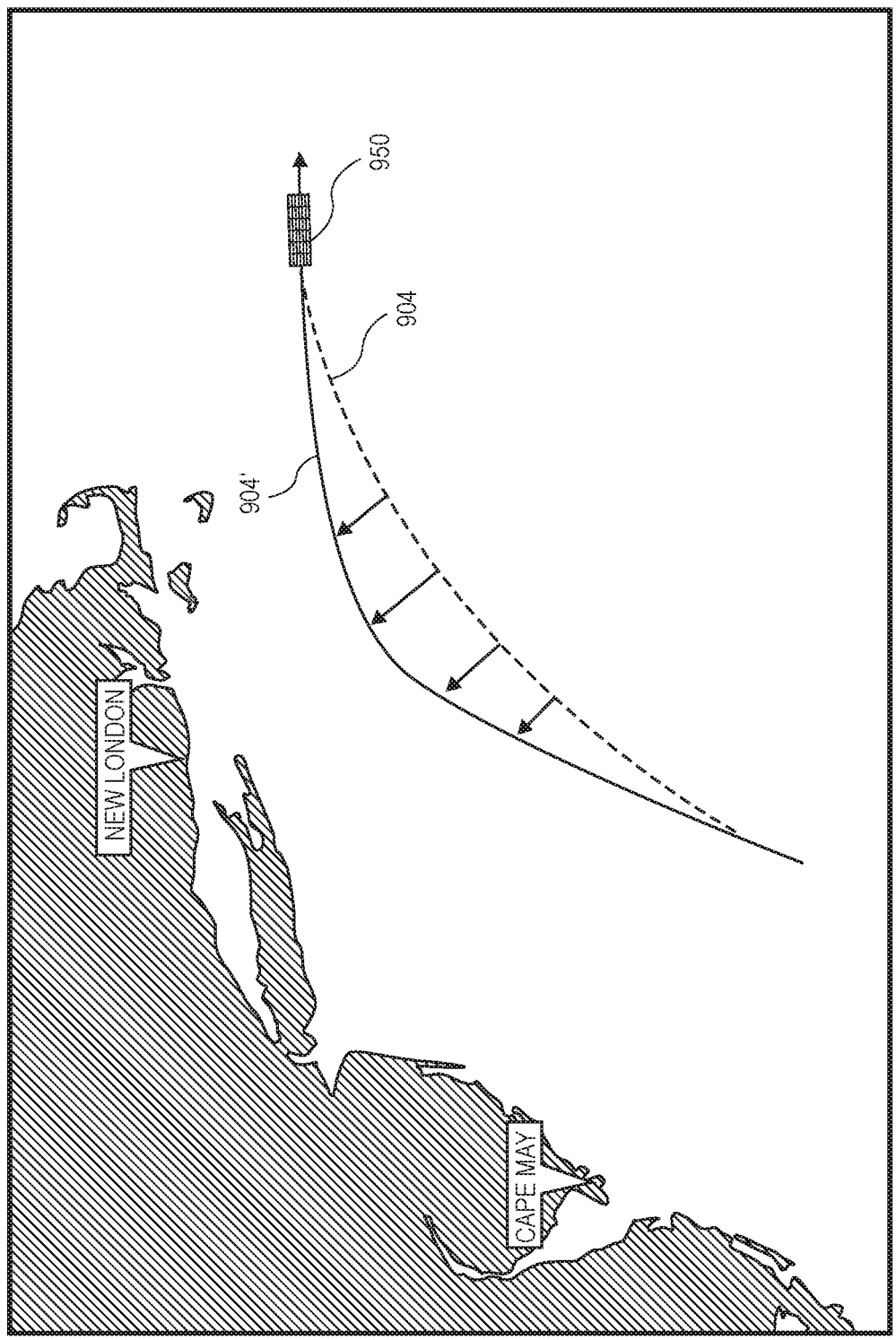

OCEAN-BASED STORAGE AND DISTRIBUTION OF ITEMS

BACKGROUND

Since the dawn of mankind, the Earth's oceans have served as sources of intrigue, targets for exploration, channels for transportation and backbones for economic development. Over one hundred fifty of the Earth's countries have direct access to an ocean, or to an ocean-accessible body of water.

Oceans cover approximately seventy percent of the Earth's surface, and are constantly in motion. Each of the Earth's oceans includes natural and coherent flows of seawater that travel throughout the oceans along various paths and at various speeds that are formed from differences in temperature, salinity, density or pressure. Such flows are also driven by the Earth's rotation, Coriolis effects, and topographic features of both the planet's landmasses and also its ocean floors. Speeds and directions of such flows are also impacted by wind flows, volcanic activity, thermohaline circulation or cabbeling, levels of sunlight, and various other factors.

Seawater flows within the Earth's oceans typically include natural and coherent streams such as gyres, currents and eddies. A gyre is a spiraling loop of seawater that is surrounded by one or more large, permanent ocean currents, and may have a diameter of several thousand miles or more. A current is a substantially long and coherent flow of seawater that is typically consistent in deep water, and may include smaller, episodic flows in coastal areas. An eddy is a small or temporary loop of seawater that may travel hundreds of miles or more before dissipating. The volume of seawater flows within the Earth's oceans dwarfs the volume of freshwater flows elsewhere on the planet. For example, the Gulf Stream current in the North Atlantic Ocean carries approximately four billion cubic feet of seawater per second, an amount that is greater than the volumetric flow rates of all of the Earth's rivers combined.

BRIEF DESCRIPTION OF THE DRAWINGS

FIGS. 1A through 1L are views of aspects of one system for ocean-based storage and distribution of items in accordance with embodiments of the present disclosure.

FIGS. 5A through 5H are views of aspects of one system for ocean-based storage and distribution of items in accordance with embodiments of the present disclosure.

FIGS. 6A through 6E are views of aspects of one system for ocean-based storage and distribution of items in accordance with embodiments of the present disclosure.

FIGS. 9A through 9F are views of aspects of one system for ocean-based storage and distribution of items in accordance with embodiments of the present disclosure.

DETAILED DESCRIPTION

Figure 1A:
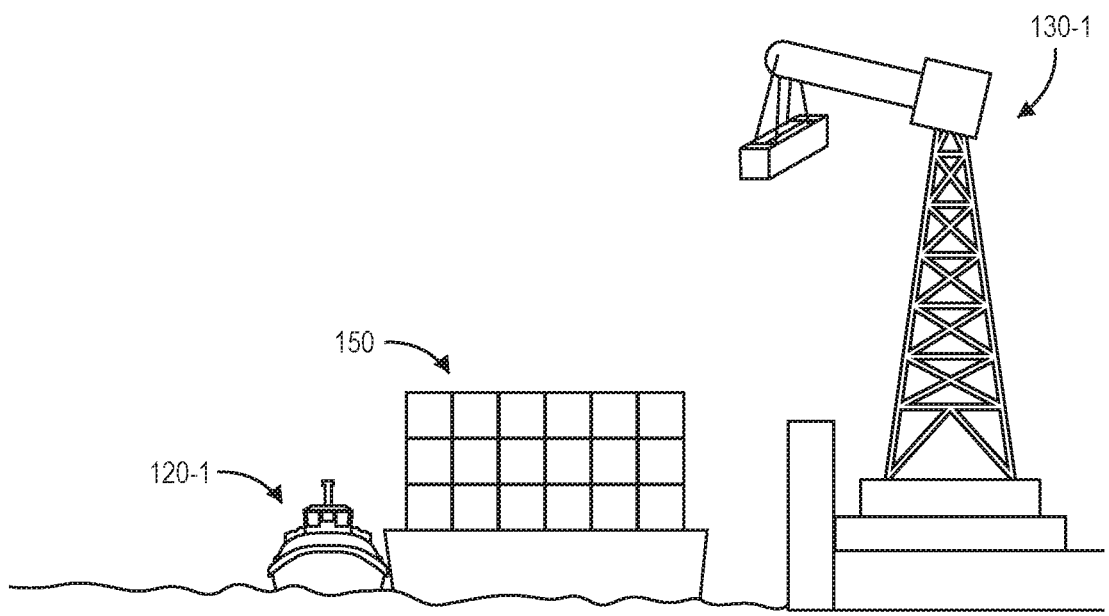

As is set forth in greater detail below, the present disclosure is directed to the ocean-based storage and distribution of items such as consumer goods, raw materials, commodities or other saleable products. More specifically, the systems and methods of the present disclosure are directed to loading items onto barges or other carrying vessels and positioning such vessels within flow paths of the Earth's gyres, currents, eddies or other sources of aquatic flow within bodies of water, e.g., on or below surfaces of such bodies. The carrying vessels may take the form of floating warehouses that are loaded with any number, type or form of items and configured to transport the items around the Earth by way of the planet's natural aquatic flow paths. The carrying vessels may be placed into such flow paths by one or more support vessels, e.g., towboats, tugs or tugboats, which may be self-powered vessels that are manned or unmanned, and may be configured to transport one or more carrying vessels (e.g., a chain of the carrying vessels in series) from a port or other origin to a point within flow paths of one or more gyres, currents or eddies. The support vessels may also be configured to remove one or more carrying vessels from a flow path, e.g., by intercepting the carrying vessels at a selected point within such paths, and to transport the carrying vessels to another location, such as a point within another flow path, or to a port or another destination.

Flow rates and directions of flow at various points within gyres, currents, eddies or other flow paths may be determined by tracking positions or other attributes of carrying vessels, support vessels or other vessels within the gyres, currents, eddies or other flow paths, and modeling the positions of the carrying vessels, support vessels or other vessels over time. One or more models of flow at any point within a gyre, a current or an eddy may be determined, e.g., by machine learning, and used to predict transit times for a carrying vessel, to select rendezvous points at which a support vessel may engage with or disengage from a carrying vessel. Additionally, some carrying vessels may be outfitted with one or more sensors, such as digital cameras or other imaging devices, which may be used to capture information or data regarding conditions, attributes or qualities of bodies of water, such as numbers or locations of plant or aquatic life, or other vessels or features that are present on such bodies of water. Some carrying vessels may be outfitted with one or more engagement systems, such as robotic arms or other features, for interacting with items carried thereon, or with items within the bodies of water. Some carrying vessels may be configured with one or more fabricating systems for manipulating items or materials aboard the carrier vessels, e.g., to manufacture an item from such materials.

Accordingly, by placing carrying vessels within naturally occurring aquatic flow paths, and permitting such carrying vessels to travel at speeds and in directions defined by such flow paths, the systems and methods effectively form an ocean-based storage and distribution network that spans the globe, and is limited in speed but operates at a maximum level of efficiency by relying on the Earth's naturally occurring energy sources rather than electric or petroleum-powered motors for transporting items around the planet. The systems and methods of the present disclosure may be used to transport items of any type, form, size or number, and are particularly useful for transporting goods having extended shelf lives, unfinished or raw materials, or items having mandatory periods of time before being saleable or available for purchase or consumption (e.g., fruits, vegetables, meats or other food products that must ripen or cure). Where flow rates of the Earth's gyres, currents, eddies or other seawater flows may be determined or predicted, such flow rates may be relied upon and used to selectively store items at sea, and to distribute the items via such seawater flows to one or more destinations.

Referring to FIGS. 1A through 1L, views of aspects of one system for ocean-based storage and distribution of items in accordance with embodiments of the present disclosure are shown. As is shown in FIG. 1A, a support vessel 120-1 (e.g., a towboat, a tugboat, a pusher or a puller) is aligned alongside a carrying vessel 150 (e.g., a barge or a like vessel) at a port 130-1. The support vessel 120-1 may be any manned or autonomous seagoing vessels that are sufficiently capable of pulling or pushing other vessels, such as the carrying vessel 150, while traveling on or below the surfaces of the Earth's oceans or other bodies of water. The support vessel 120-1 may include any number of motors and rudders or other control surfaces, as well as other mechanisms (e.g., nozzles) for placing the support vessel 120-1 in selected orientations on the open ocean, on inland water courses or bodies, or in any other location.

The port 130-1 may include any number of systems for loading items onto the support vessel 120-1 or the carrying vessel 150, or otherwise providing services to the support vessel 120-1 or the carrying vessel 150, including one or more cranes, e.g., bulk-handling cranes, deck cranes, floating cranes, gantry cranes, hammerhead cranes, overhead cranes, tower cranes, or others, as well as elevators or any other such systems. The port 130-1 may be associated with a fulfillment center, a warehouse, or any other like facility that is configured to receive, store, process and/or distribute items to or on behalf of customers.

The carrying vessel 150 may be any seagoing vessel that is configured to travel on or below surfaces of one or more bodies of water, and to carry one or more items thereon. In some embodiments, the carrying vessel 150 may be a barge or another substantially long and/or narrow vessel having a flat-bottomed hull defined by any number of trusses, stanchions or bulkheads, as well as any numbers of knuckles, frames or other structures. The carrying vessel 150 may include any number of decks, cargo bays or other storage compartments for receiving and storing items therein, or distributing items therefrom.

Figure 1B:
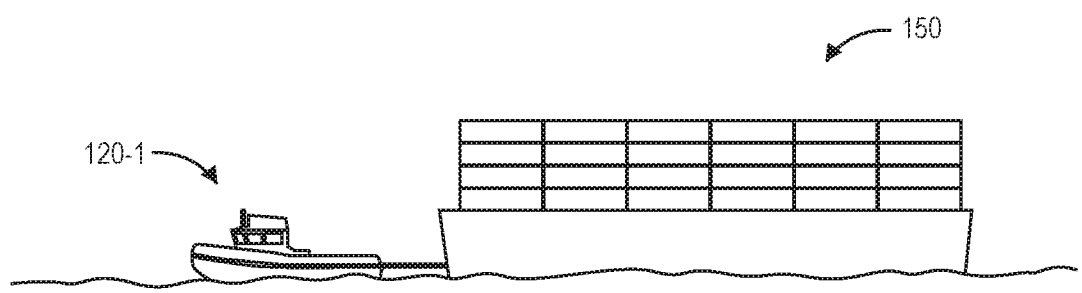

As is shown in FIG. 1B, after the carrying vessel 150 has been successfully loaded with one or more containers of items of any type or form, the support vessel 120-1 departs the port 130-1 with the carrying vessel 150 in tow. The carrying vessel 150 may be coupled to the support vessel 120-1 in any manner, such as by one or more sets of lines or other connectors. Although FIG. 1B shows a single carrying vessel 150 being coupled to a single support vessel 120-1, those of ordinary skill in the pertinent arts will recognize that the carrying vessel 150 may be pushed or pulled by any number of support vessels 120-1, having any number of motors or other propulsion systems, and that the support vessel 120-1 may also push or pull any number of the carrying vessels 150, which may be coupled to one another in series by one or more sets of lines or other connectors.

In some embodiments, such as where the support vessel 120-1 is operated by one or more human members of a crew, the support vessel 120-1 may depart under the operation and control of a manned crew, e.g., by one or more human members, who may navigate the support vessel 120-1 and the carrying vessel 150 along or through any transit channels or sea lanes, under the guidance of a pilot or other like staff, or without such assistance. In some other embodiments, the support vessel 120-1 may be operated autonomously, and may receive or otherwise be programmed with one or more sets of instructions for departing from the port 130-1, including but not limited to sets of instructions for operating one or more motors and/or rudders or other control surfaces, as necessary to cause the support vessel 120-1 and/or the carrying vessel 150 to travel on desired courses and at desired speeds. Alternatively, the support vessel 120-1 may cause the carrying vessel 150 to leave the port 130-1 in any other manner, such as by direct contact and/or pushing the carrying vessel 150 to sea.

Figure 1C:
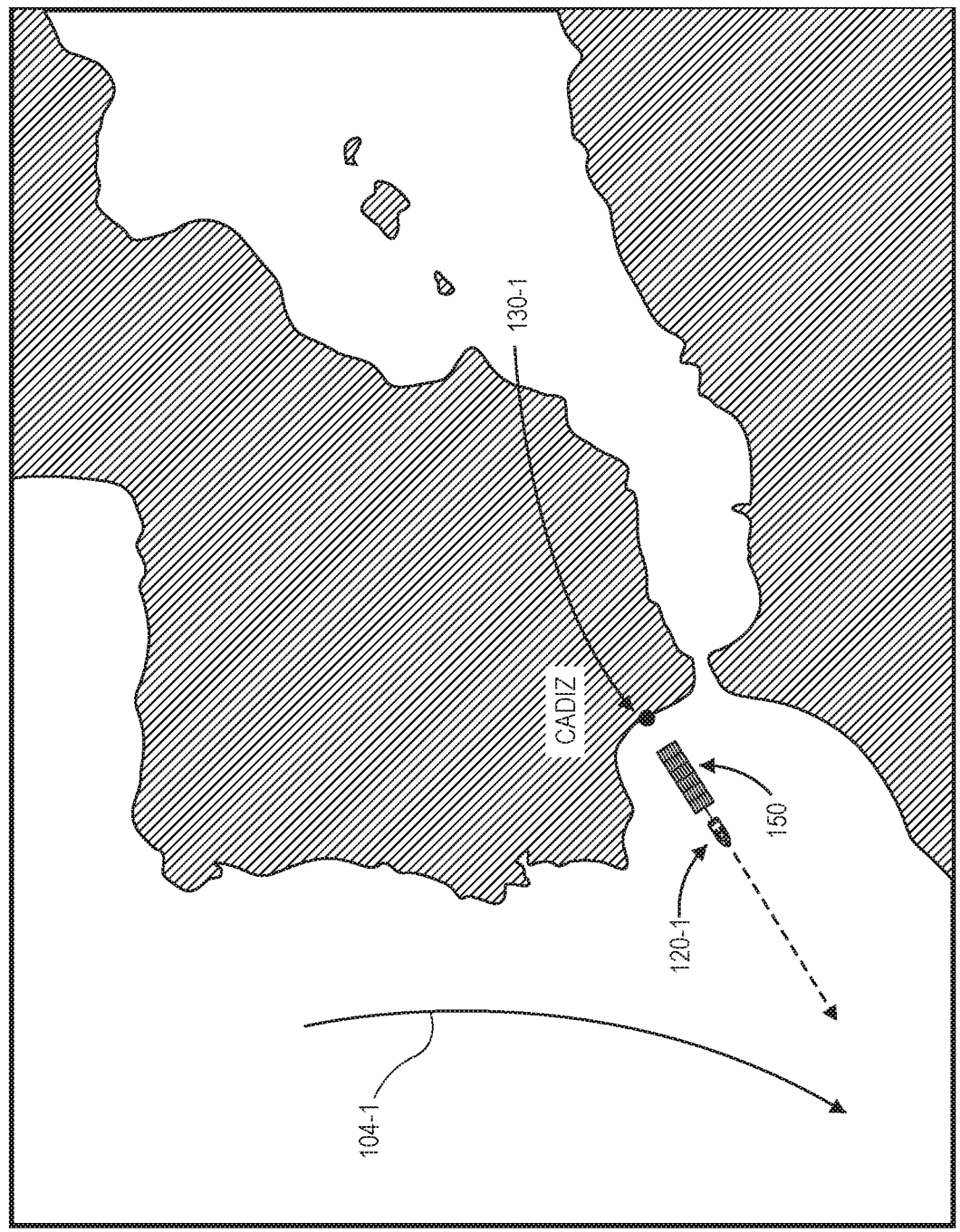
Figure 1D:
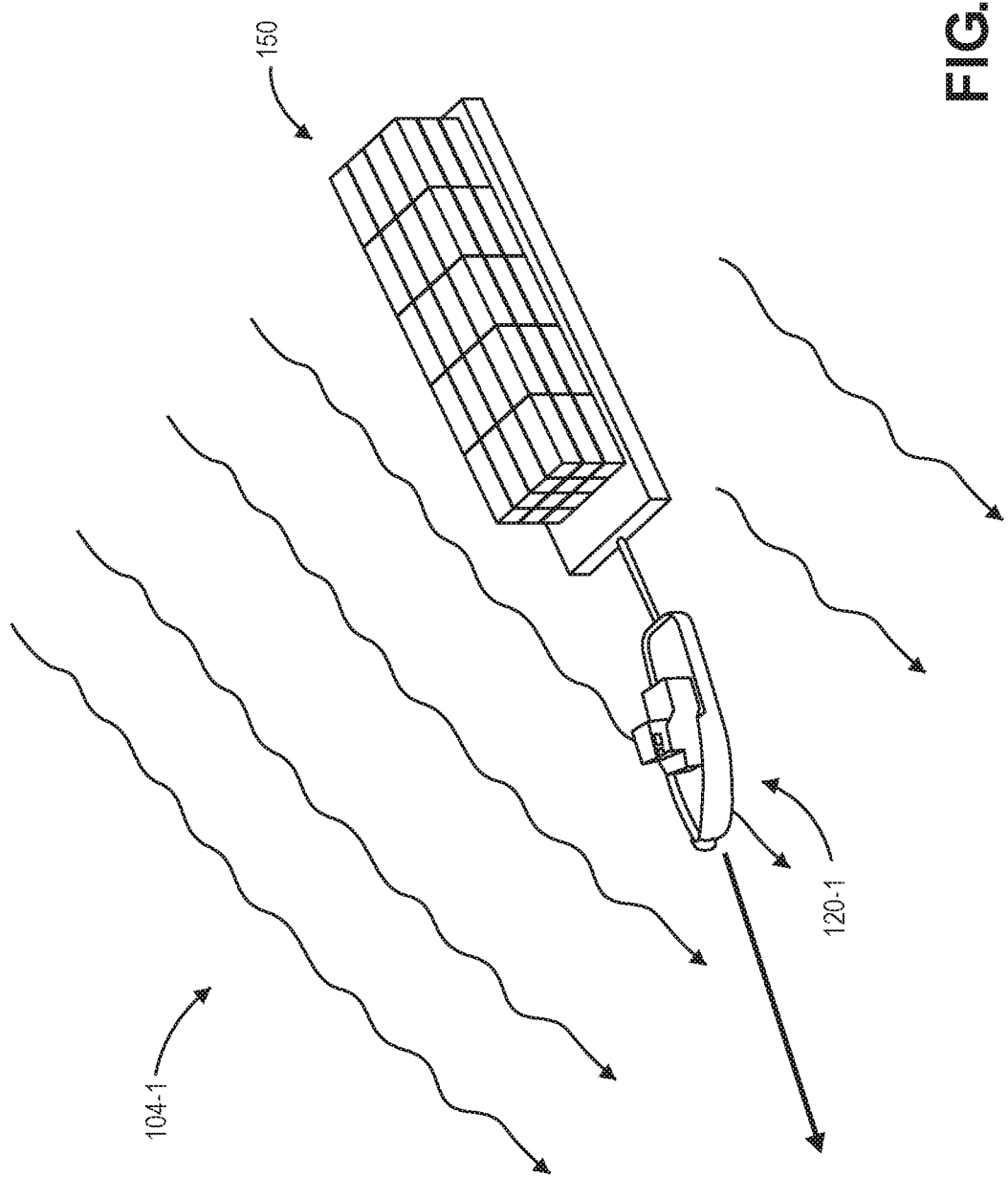

As is shown in FIG. 1C, after departing the port 130-1, which is located on the Costa de la Luz in southern Spain, the support vessel 120-1 transits with the carrying vessel 150 in tow toward a current 104-1, e.g., the Canary current, which passes to the west of the port 130-1 in a southerly direction. As is shown in FIG. 1D, upon arriving at a location within a flow path of the current 104-1, the support vessel 120-1 may take any action to prepare to disengage from the carrying vessel 150, or to orient the carrying vessel 150 within the current 104-1. Additionally, a location for disengaging from the carrying vessel 150 within the current 104-1 may be selected or otherwise identified in any manner, such as by resort to one or more maps or other cartographic representations, along with any information or data regarding prevailing weather conditions, sea traffic conditions, or any other factors. As is shown in FIG. 1E, the support vessel 120-1 disengages from the carrying vessel 150, such as by taking in one or more lines therefrom, and releases the carrying vessel 150 within the current 104-1.

Figure 1F:
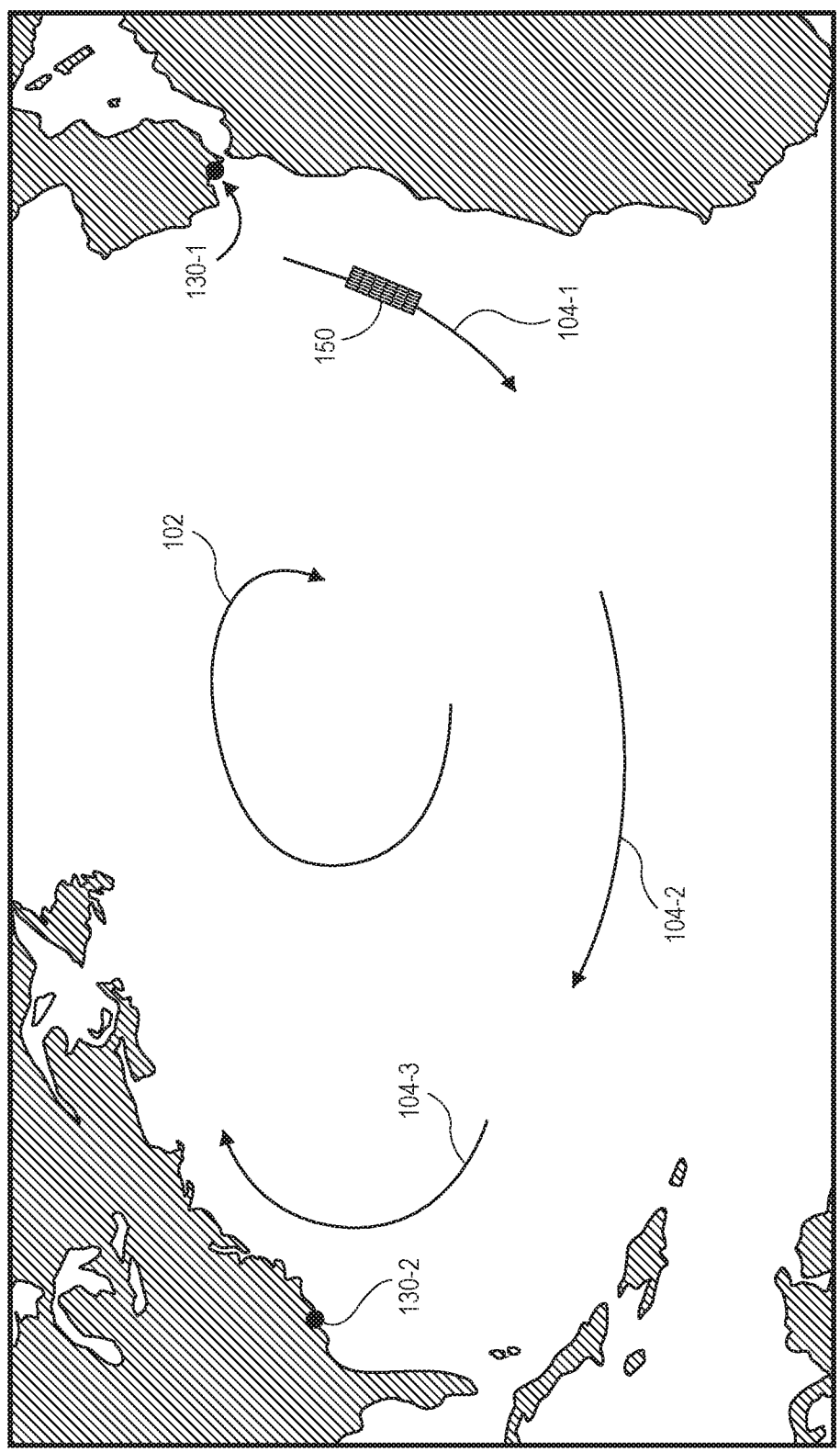

In accordance with embodiments of the present disclosure, carrying vessels may be transferred into naturally occurring aquatic flow paths and permitted to travel at speeds and in directions defined by such flow paths. The carrying vessels may be permitted to travel within such flow paths for any period of time, and may be withdrawn from an aquatic flow path in order to be transferred into another aquatic flow path, or to transit into a port or other land-based or sea-based destination. As is shown in FIG. 1F, the carrying vessel 150 is permitted to travel on any number of currents within the Atlantic Ocean, including the current 104-1, as well as a current 104-2, viz., the North Atlantic equatorial current, or a current 104-3, viz., the Gulf Stream current, which are parts of a large gyre 102 that rotates within the North Atlantic and in a clockwise direction, driven by global winds, Coriolis effects, and any other local or global factors. As is also shown in FIG. 1F, the current 104-3 passes to the east of another port 130-2 at the city of Charleston, S.C.

Figure 1H:
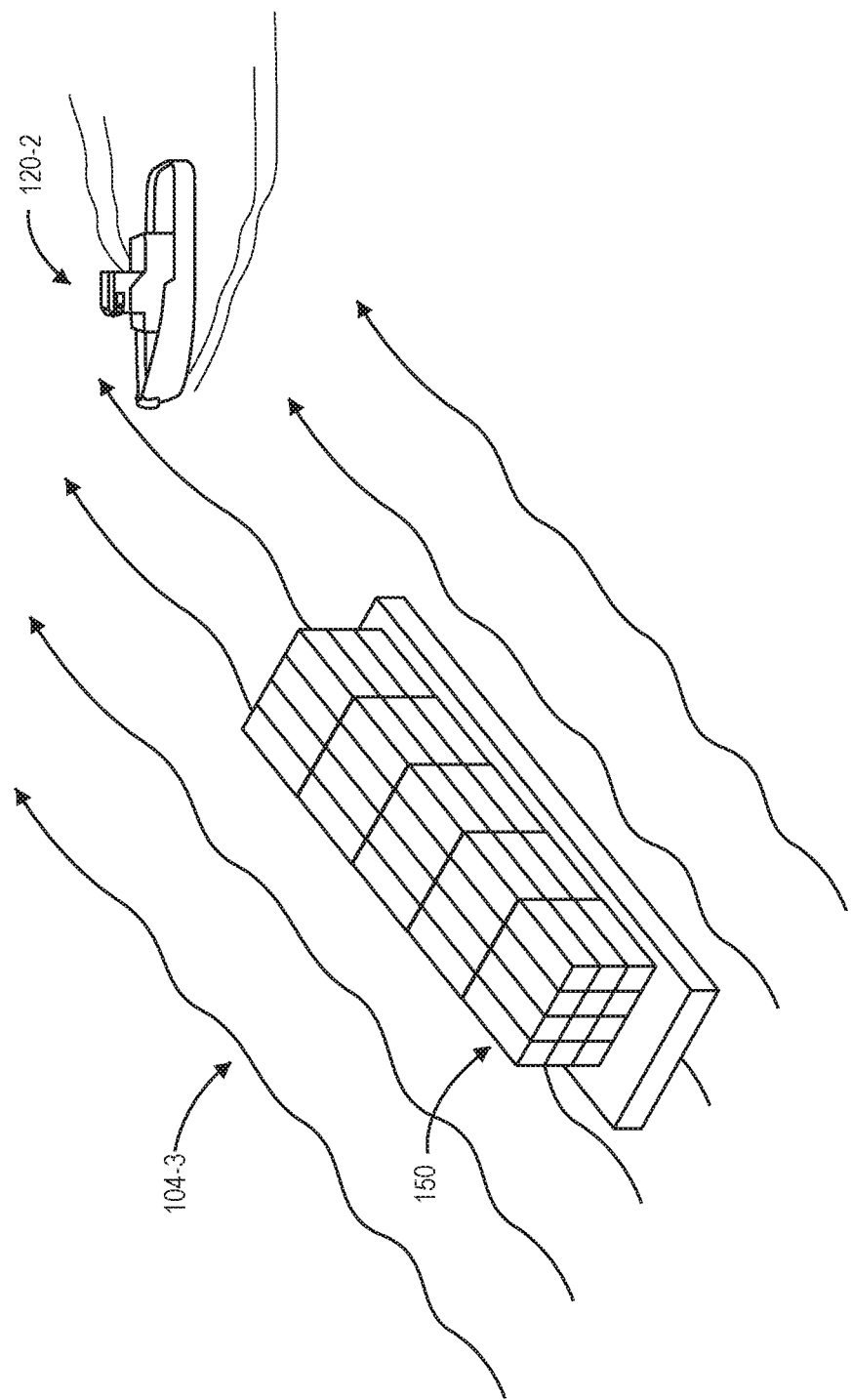
Figure 11:
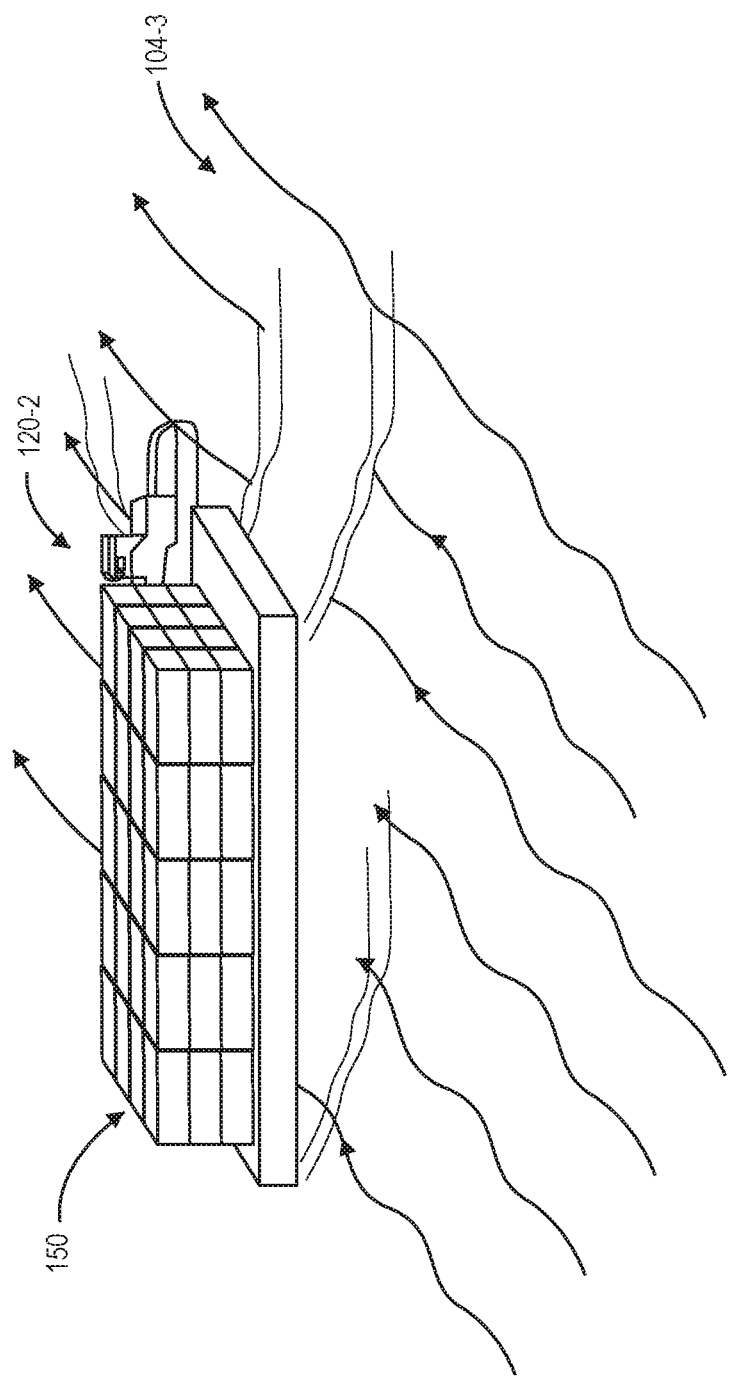
FIGS. 11A through 11E are views of aspects of one system for ocean-based storage and distribution of items in accordance with embodiments of the present disclosure.

As is shown in FIG. 1G, when an order for one or more items carried aboard the carrying vessel 150 is received from a customer 170 located near the port 130-2, viz., in Columbia, S.C., a support vessel 120-2 is dispatched from the port 130-2 to intercept the carrying vessel 150, or to otherwise engage with the carrying vessel 150, and to bring the carrying vessel 150 into the port 130-2. The customer 170 may have placed the order at any time with respect to the arrival of the carrying vessel 150 within a vicinity of the port 130-2, such as any number of hours or days. In some embodiments, the carrying vessel 150 may be a single source of the items carried onboard, and may transport any of such items from the port 130-1 to any number of other ports or shipping facilities, such as the port 130-2. As is shown in FIG. 1H, the support vessel 120-2 may be programmed to position or orient itself at a rendezvous point or an engagement point within the current 104-3 that may be selected on any basis.

Figure 1L:
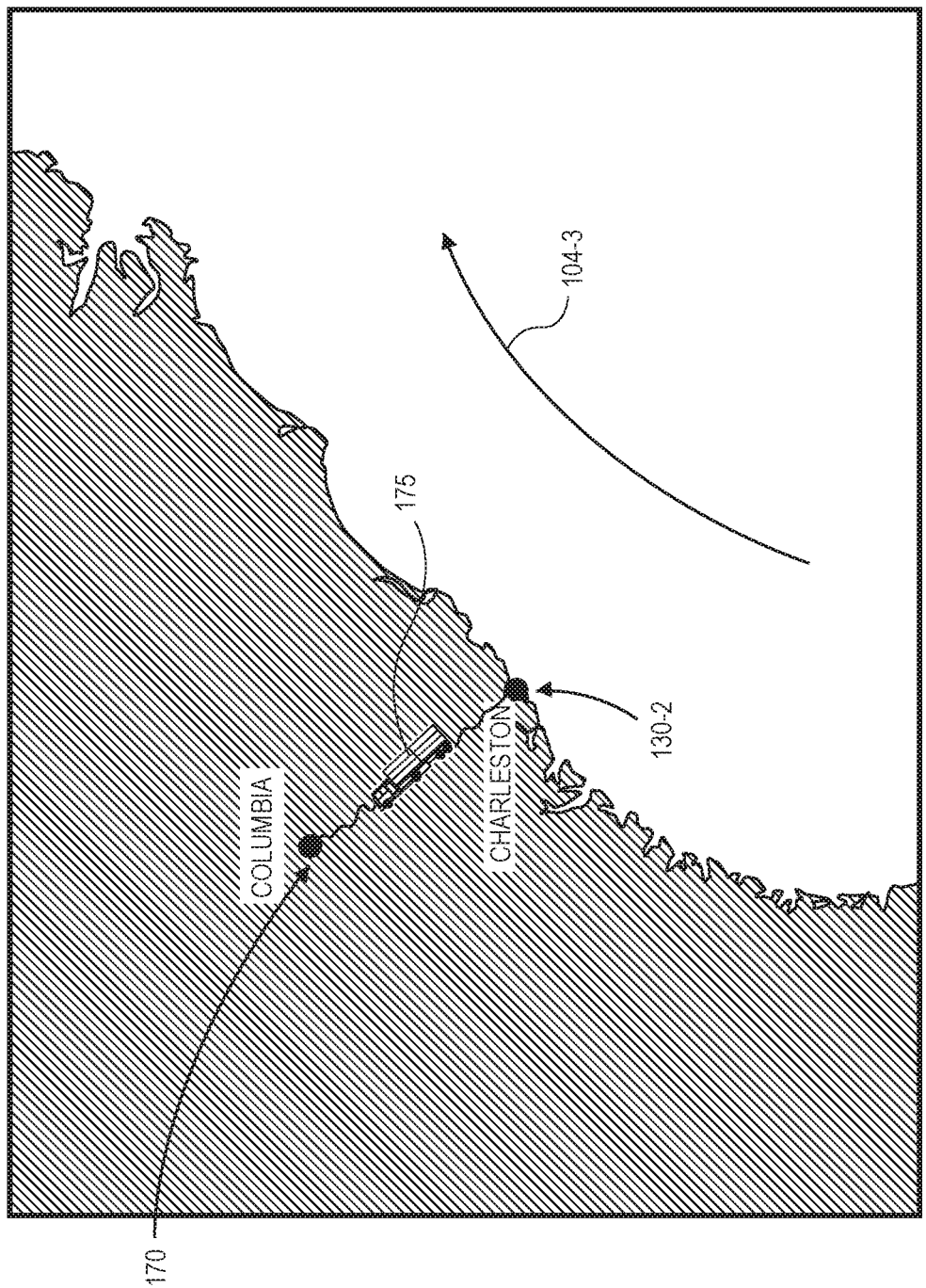

As is shown in FIG. 1I, upon engaging with the carrying vessel 150, the support vessel 120-2 transfers the carrying vessel 150 out of the current 104-3, and begins to return to the port 130-2. Alternatively, the support vessel 120-2 may transport the carrying vessel 150 to any location other than the port 130-2, or may transfer the carrying vessel 150 to one or more other support vessels (not shown), which may transport the carrying vessel 150 to the port 130-2 or another destination. As is shown in FIGS. 1J and 1K, upon arriving at the port 130-2, one or more containers of items are transferred from the carrying vessel 150, and onto a ground carrier 175 (e.g., a tractor-trailer or similarly sized or configured vehicle, such as a van, a car, a cart or the like). As is shown in FIG. 1L, the ground carrier 175 may fulfill the order placed by the customer 170 by transporting one or more items via ground from the port 130-2 to a location specified by the customer 170. The support vessel 120-2 and/or the carrying vessel 150 may then be subjected to further tasking, such as by transferring the carrying vessel 150 from the port 130-2 back into the current 140-3, or any other tasking.

Accordingly, the systems and methods of the present disclosure are directed to the use of naturally occurring aquatic flow paths, such as gyres, currents or eddies, or others, in the storage and distribution of items on the Earth's oceans. Barges or other carrying vessels may be loaded with items and transferred into such flow paths at selected locations, e.g., by one or more manned or autonomous support vessels, and permitted to travel at speeds and in directions defined by such flow paths. Where one or more of the items carried aboard a carrying vessel is desired at a given location, the carrying vessel may be transferred out of an aquatic flow path, e.g., by one or more manned or autonomous support vessels, and transported to a location, such as a port, where the items onboard the carrying vessel may be removed therefrom and delivered to a customer or another location or facility, such as a fulfillment center.

Carrying vessels or other carrier vehicles of the present disclosure may include one or more cargo bays or storage compartments for receiving and storing items, goods or materials that are being delivered from an origin to a destination by way of one or more naturally occurring flows of seawater. Such cargo bays or storage compartments may be used to securely maintain items, goods or materials therein at any desired temperature, pressure or alignment or orientation, and to protect such items, goods or materials against the elements. Furthermore, in some embodiments, a carrying vessel or another carrier vehicle may include various equipment or components for determining whether a cargo bay or other storage compartment is empty or includes one or more items, goods or materials, or for identifying specific items, goods or materials that are stored therein, along with equipment or components for engaging or interacting with such items, goods or materials. In some embodiments, the carrying vessels may have dimensions of approximately eighty feet in length, or approximately thirty feet in width. In some other embodiments, each of the carrying vessels may be configured or equipped to transport up to five hundred tons of goods. Furthermore, in some embodiments, the items, goods or materials being transported may be discretized, e.g., maintained in discrete quantities, such as in containers or packages of a discrete quantity. In some other embodiments, the items, goods or materials being transported may be non-discretized, e.g., maintained in bulk. Alternatively, a carrying vessel may have any length or width, and may be configured or equipped to transport loads of any mass or number of items, goods or materials of any type or form.

Moreover, barges or other carrying vessels of the present disclosure may include any number of sensors such as position sensors (e.g., Global Positioning Satellite, or GPS, receivers, or cellular transceivers configured to triangulate positions based on signals received from multiple cellular transmitters), imaging sensors (e.g., digital cameras or other imaging devices) or other sensors, including but not limited to compasses, speedometers, inclinometers, gyroscopes, accelerometers or magnetometers. Carrying vessels or other carrier vehicles of the present disclosure may also include communications equipment (e.g., wired or wireless means for communication such as components or systems operating Wireless Fidelity, or Wi-Fi, Bluetooth, near-field communications or cellular technologies or protocols), along with one or more power modules (e.g., batteries, generators, fuel cells, turbines, generators, solar cells or nuclear reactors), which may be rechargeable, refuelable or replaceable in nature. Information or data obtained or determined by such sensors or such communications equipment may be utilized in manually or automatically tracking a carrying vessel, or selecting a location at which a support vessel or other vessel engages with or disengages from a carrying vessel to insert the carrying vessel into a naturally occurring flow of seawater, e.g., in causing a carrying vessel to travel along one or more paths or routes within gyres, currents or eddies, or to identify one or more alternate paths or routes for the carrying vessel, in order to increase a likelihood that the carrying vessel arrives at a desired location by way of the gyres, currents or eddies. The carrying vessels or other carrier vehicles of the present disclosure may further include any number of computer components (e.g., processors, data stores, transceivers or input/output devices) for performing any of the tasks or executing any of the functions described herein.

Barges or other carrying vessels may be used to distribute items within one or more gyres, currents or eddies, or other naturally occurring flows of seawater, in any manner. For example, items of a single type or category may be loaded into and secured within carrying vessels on a homogenous basis, e.g., where a carrying vessel includes a common type of item. Alternatively, items may be loaded into and secured within carrying vessels on a heterogeneous basis, e.g., where a carrying vessel includes a variety of types or categories of items, within separate storage compartments, or within a common storage compartment. Items may also be loaded into and secured within carrying vessels or other carrier vehicles in storage compartments that are specifically tailored for such items, e.g., storage compartments that are configured to maintain items therein at any selected or desired temperatures or pressures or within selected or desired ranges or bands of temperatures or pressures for any durations, as well as storage compartments that are generally provided for multiple types of items.

Moreover, once items have been loaded into and secured within a carrying vessel, the carrying vessel may be delivered from a first location having direct or indirect access to an ocean to a second location that has direct or indirect access to an ocean and is selected based on levels of demand for the items within the carrying vessel at the second location, e.g., by traveling from the first location to the second location by way of one or more naturally occurring seawater flows. For example, in some embodiments, a carrying vessel may be loaded with items at a port or other location that is a known source of the items, and an optimal route or path to a location where demand for the items is known, observed or predicted may be derived. The optimal route or path may include one or more naturally occurring aquatic flows such as gyres, currents, or eddies, or other flows, and may be selected based on flow conditions throughout the gyres, currents or eddies, as well as an estimated or desired date of arrival, or on any other basis. The carrying vessel may then be transported from the source of the items to a point within a naturally occurring flow of seawater or freshwater within an optimal route or path, such as a gyre, a current or an eddy, where the support vessel may disengage from the carrying vessel, and permit the carrying vessel to travel at speeds and in directions defined by the naturally occurring flow. Upon arriving at a waypoint along the optimal route or path, the carrying vessel may be removed from the flow of seawater or freshwater, e.g., by a support vessel or another like system, and transported to a port or another destination for the items, or to another point within another naturally occurring flow of seawater or freshwater, where the carrying vessel may be permitted to travel thereon at speeds and in directions defined by the naturally occurring flow.

Barges or other carrying vessels may travel along naturally occurring flows of seawater or freshwater singly or in any number. For example, two or more carrying vessels may be coupled to one another, e.g., prior to a carrying vessel entering a gyre, a current or an eddy, or while the carrying vessel is within the gyre, the current or the eddy, or after the carrying vessel has been removed therefrom. A support vessel may, therefore, be configured to deposit any number of carrying vessels into a naturally occurring flow of seawater or freshwater, or to remove any number of carrying vessels from the naturally occurring flow of seawater or freshwater, subject to operational limitations and environmental conditions.

In some embodiments, support vessels may be strategically or proactively stationed in any desired location with respect to one or more gyres, currents, eddies or other naturally occurring flows of seawater or freshwater. For example, a support vessel may be stationed at a location within close proximity of two or more naturally occurring flows of seawater or freshwater, such that the support vessel may be repositioned to engage with a carrying vessel traveling along a first naturally occurring flow of seawater or freshwater, and to transport the carrying vessel to a second naturally occurring flow of seawater or freshwater, before disengaging with the carrying vessel and permitting the carrying vessel to travel along the second naturally occurring flow. Similarly, a support vessel may be selected for dispatch to engage with a carrying vessel on any basis, including but not limited to a distance to a rendezvous point, e.g., an engagement point, with the carrying vessel or a time required for the support vessel or the carrying vessel to arrive at the rendezvous point. After transferring one or more carrying vessels into or out of a naturally occurring seawater or freshwater flow path, a support vessel may be programmed or instructed to remain in a standby condition, such as a safe or lightly traveled location, or a location within a vicinity of one or more seawater or freshwater flow paths, to await further instructions.

Carrying vessels may be positioned in flow paths based on levels of known, observed or predicted demand at any location that is accessible to one or more oceans, which may be predicted or determined on any basis. Where demand in any given location has been determined or predicted, the demand may be compared to one or more thresholds or limits to determine whether the demand is sufficiently great, on an actual or relative basis, in order to justify distributing or forward-deploying items to the given region. For example, in some embodiments, a total-market prediction of demand may be determined by defining a market, identifying drivers of demand in each of the market, predicting how such drivers may be anticipated to change, and localizing the effects of such changes to a given region or location. In some other embodiments, a prediction of local demand in a region or location may be determined based on prior sales of items in the region or location, and determining whether such sales are expected to increase, decrease or remain constant. For example, where a metropolitan area includes a fixed number of homes, demand for specific items may be determined based on an analysis of demographics within the metropolitan area, as compared to demographics in the metropolitan area in previous years, or demographics in other similarly situated metropolitan areas.

Flow conditions within gyres, currents, eddies or other naturally occurring seawater or freshwater flows may be determined on any basis. For example, in some embodiments, flow conditions such as flows or directions at any given location may be determined from data obtained from intrinsic or extrinsic sources, such as satellites, aerial vehicles, seagoing vessels, or other sources. Alternatively, flow conditions within gyres, currents, eddies or other naturally occurring seawater or freshwater flows may be determined by machine learning, such as where positions of carrying vessels or other seagoing vessels are determined and tracked over time. Inputs including not only positions of carrying vessels or other vehicles and times associated with such positions but also attributes of the vehicles, including but not limited to dimensions of the vehicles, masses or weights of loads transported thereby, or other parameters affecting the seaworthiness of such vessels or their capacity to respond or be transported by naturally occurring seawater or freshwater flows. In some embodiments, positions, times and other parameters of a carrying vessel or other seagoing vessel may be provided as inputs to a machine learning system, and flow conditions within one or more gyres, currents or eddies may be determined based at least in part on outputs received from the machine learning system. Moreover, seawater or freshwater flows may vary in depth and are not two-dimensional in nature. Rather, seawater or freshwater flows may move in different directions, and at different flow rates, at different depths over the same location on the ocean floor.

Carrying vessels of the present disclosure may be configured to perform any function other than, or in addition to, the ocean-based storage and distribution of items. For example, in some embodiments, one or more of the carrying vessels described herein may be utilized to retrieve or extract garbage, trash or wastes within seawater or freshwater, where the garbage, the trash, or the wastes are encountered by a carrying vessel that is in transit. A carrying vessel may include any number of machines or systems for retrieving such materials, e.g., engagement systems such as robotic arms, and for storing such materials aboard the carrying vessel, e.g., compactors or containers.

Moreover, in some embodiments, carrying vessels may be outfitted or configured with one or more automated fabricators, e.g., 3D printers, having various types or forms of tooling equipment included therein. Such tooling equipment may include, but is not limited to, one or more filaments, heads, blades, nozzles, motors, rollers, heat sources, radiation sources or other elements for molding, shaping, forming, curing, solidifying or depositing layers of materials therein and forming such materials into an end product. For example, a carrying vessel that is outfitted or configured with automated fabricators and/or tooling equipment may be loaded with a variety of stock materials, and may be programmed to retrieve other raw materials (e.g., the raw materials themselves, or one or more items formed from such raw materials, which may be processed to extract the raw materials therefrom) from an ocean in one or more specified locations. The carrying vessels may be programmed or otherwise configured to fabricate a given item, e.g., in response to an order for the item, and to deliver the item to a predetermined location. In some embodiments, items may be fabricated while the carrying vessel is en route from a location from which stock materials or raw materials or items are retrieved to a location specified in the order. For example, where a given item is known to require a predetermined amount of time to be properly prepared from raw materials according to a known procedure, the raw materials may be loaded onto a carrying vessel in port, and an automated fabricator may be programmed to generate the given item from raw materials provided aboard the carrying vessel, or from one or more items or materials that may be obtained by the carrying vessel while in transit.

Figure 2A:
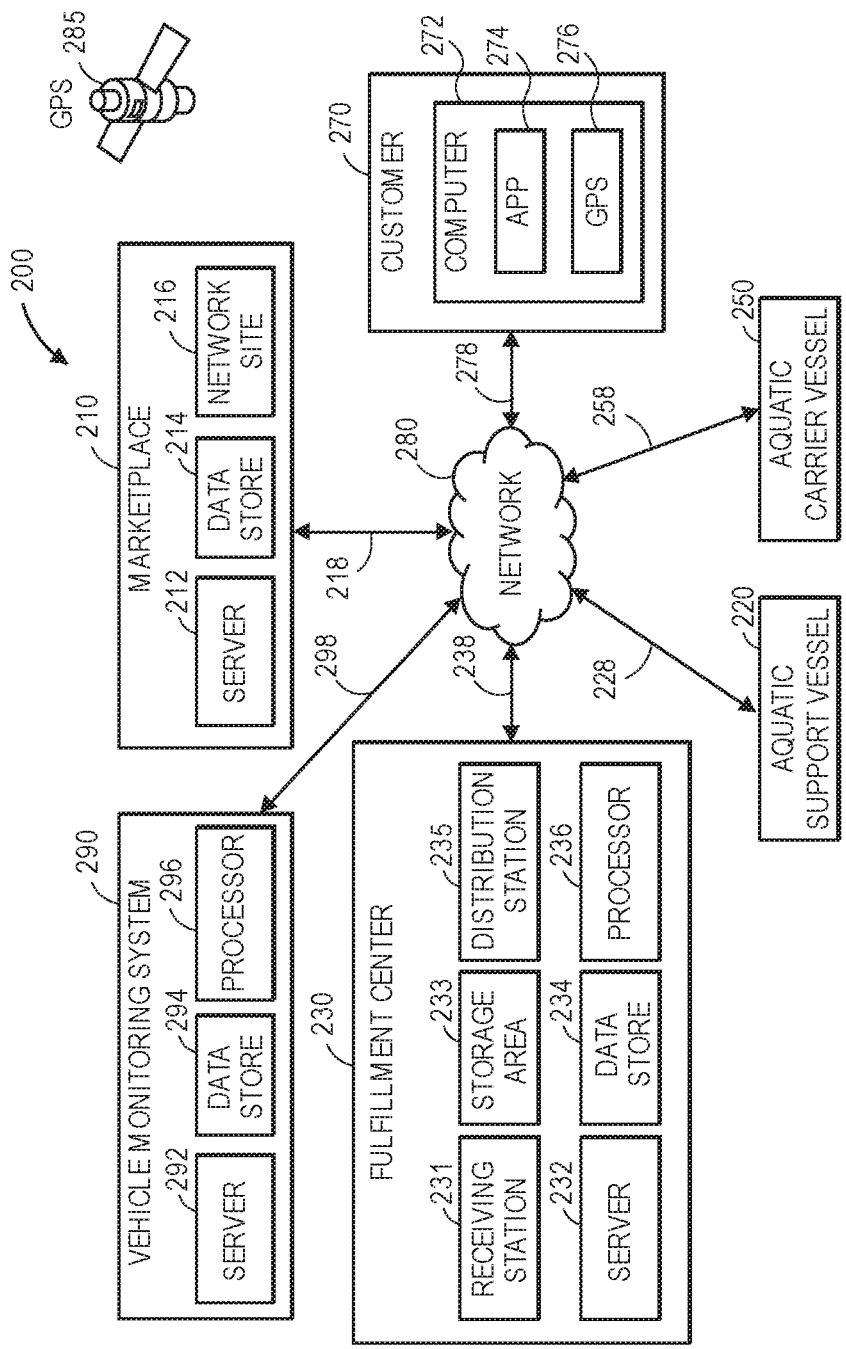
FIGS. 2A and 2B are block diagrams of components of one system for ocean-based storage and distribution of items in accordance with embodiments of the present disclosure.
Figure 2B:
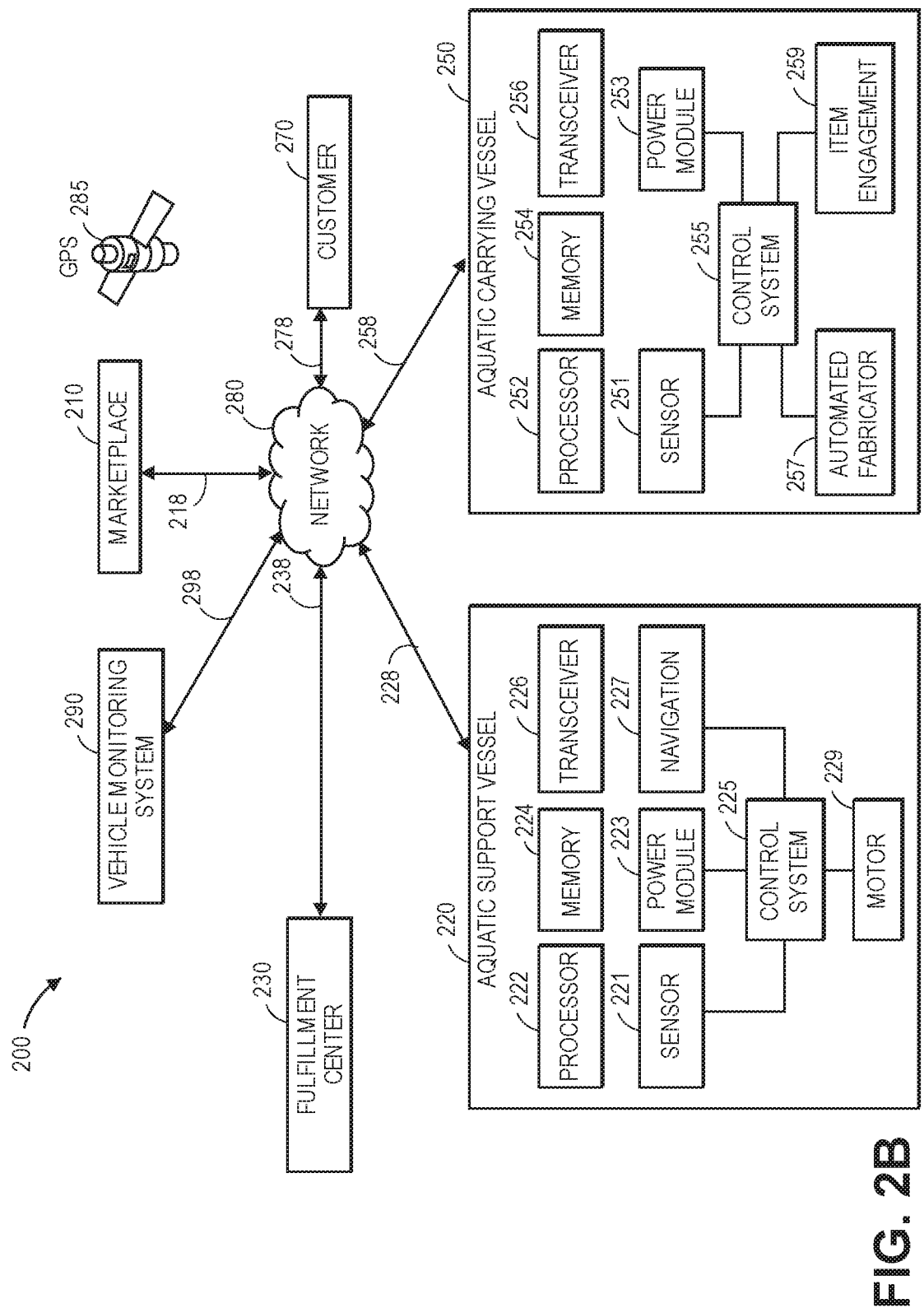

Referring to FIGS. 2A and 2B, a block diagram of components of one system 200 for ocean-based storage and distribution of items in accordance with embodiments of the present disclosure is shown. The system 200 includes a marketplace 210, an aquatic support vessel 220, a fulfillment center 230, an aquatic carrying vessel 250, a customer 270 and a vehicle monitoring system 290 that are connected to one another across a network 280, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1L.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data store 214 may include any type of information regarding items that have been made available for sale through the marketplace 210, or ordered by customers, such as the customer 270, from the marketplace 210, or any information or data regarding the delivery of such items to customers, e.g., by human carriers on foot, on bicycle, or by other means, or by one or more vehicles, such as cars, trucks, trailers, freight cars, container ships or cargo aircraft, as well as one or more of the tugboat 220 and/or the carrying vessel 250, or any other seagoing vessels.

The support vessel 220 may be any type or form of seagoing vessel or system that is configured to transport the carrying vessel 250 (or any number of carrying vessels), e.g., by pushing or pulling, from one location to one or more other locations. For example, the support vessel 220 may be configured to transport the carrying vessel 250 and any number of items thereon from a port or other station or facility associated with the fulfillment center 230 to one or more locations within seagoing flow paths that may carry flows of water within a vicinity of other locations where the items on the carrying vessel 250 are desired. For example, a support vessel 220 may be manually operated, or autonomously programmed or instructed, to transfer the carrying vessel 250 into a flow path that will cause the carrying vessel 250 to travel to or near a location where demand for one or more items on the carrying vessel 250 is known, observed or predicted, or to retrieve the carrying vessel 250 and any items thereon from such locations.

For example, the support vessel 220 may be configured to determine and/or travel on an optimal path or route between two locations within or near naturally occurring aquatic flow paths for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. The support vessel 220 may be further configured to control or direct the operations of the carrying vessel 250, or to select one or more paths to be traveled by the carrying vessel 250 between two or more locations while performing any number of tasks or executing any number of functions.

The support vessel 220 may include any type or form of component for safely coupling with the carrying vessel 250, including one or more lines, straps, latches, winches, cleats, brackets, restraints, or like features. The support vessel 220 may further include any equipment, material or supplies for maintaining the carrying vessel 250 in a serviceable condition, including equipment, material or supplies for charging batteries, refueling, repairing damage or performing any other operations on the carrying vessel 250.

As is shown in FIG. 2B, the support vessel 220 includes one or more computer components such as a processor 222, a memory 224 and a transceiver 226 in communication with one or more other computer devices that may be connected to the network 280, as indicated by line 228, in order to transmit or receive information in the form of digital or analog data, or for any other purpose. For example, the support vessel 220 may receive instructions or other information or data via the transceiver 226 regarding contents of the carrying vessel 250 (or any number of carrying vessels), as well as items that are to be delivered to the customer 270, from the marketplace server 212, the fulfillment center server 232 and/or the customer computing device 272, or from any other computing device over the network 280. The transceiver 226 may be configured to enable the support vessel 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 280 or directly.

The transceiver 226 may further include or be in communication with one or more input/output (or "I/O") interfaces, network interfaces and/or input/output devices, and may be configured to allow information or data to be exchanged between one or more of the components of the support vessel 220, or to one or more other computer devices or systems (e.g., other aerial vehicles, not shown) via the network 280. For example, in some embodiments, the transceiver 226 may be configured to coordinate I/O traffic between the processor 222 and one or more onboard or external computer devices or components. The transceiver 226 may perform any necessary protocol, timing or other data transformations in order to convert data signals from a first format suitable for use by one component into a second format suitable for use by another component. In some embodiments, the transceiver 226 may include support for devices attached through various types of peripheral buses, e.g., variants of the Peripheral Component Interconnect (PCI) bus standard or the Universal Serial Bus (USB) standard. In some other embodiments, functions of the transceiver 226 may be split into two or more separate components, or incorporated directly into the processor 222.

As is further shown in FIG. 2B, the support vessel 220 further comprises a control system 225 including one or more software applications or hardware components configured for controlling or monitoring operations of the support vessel 220, as well as a sensor 221, a power module 223, a navigation module 227 and a motor 229.

The control system 225 may control or monitor the operation of any number of systems aboard the support vessel 220, e.g., by receiving, generating, storing and/or transmitting one or more computer instructions to such components, and may communicate with the marketplace 210, the fulfillment center 230 and/or the customer 270 over the network 280, as indicated by line 228, through the sending and receiving of digital data.

The sensor 221 may be any type or form of system, device or component for capturing information or data. For example, the sensor 221 may be a position sensor such as a GPS receiver in communication with one or more orbiting satellites or other components of a GPS system 285, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the support vessel 220. Geolocations of the sensor 221 may be associated with the support vessel 220, where appropriate.

The sensor 221 may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the support vessel 220, or for any other purpose. For example, the sensor 221 may be configured to capture or detect reflected light if the reflected light is within a field of view of the sensor 221, which is defined as a function of a distance between an imaging sensor and a lens within the sensor 221, viz., a focal length, as well as a location of the sensor 221 and an angular orientation of the lens. Accordingly, where an object appears within a depth of field, or a distance within the field of view where the clarity and focus is sufficiently sharp, the sensor 221 may capture light that is reflected off objects of any kind to a sufficiently high degree of resolution using one or more sensors thereof, and store information regarding the reflected light in one or more data files.

The sensor 221 may also include manual or automatic features for modifying a field of view or orientation. For example, the sensor 221 may be a digital camera configured in a fixed position, or with a fixed focal length (e.g., fixed-focus lenses) or angular orientation. Alternatively, the sensor 221 may include one or more actuated or motorized features for adjusting a position of the sensor 221, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 221, or a change in one or more of the angles defining the angular orientation of the sensor 221.

For example, the sensor 221 may be an imaging device that is hard-mounted to a support or mounting that maintains the imaging device in a fixed configuration or angle with respect to one, two or three axes. Alternatively, however, the sensor 221 may be provided with one or more motors and/or controllers for manually or automatically operating one or more of the components, or for reorienting the axis or direction of the sensor 221, i.e., by panning or tilting the sensor 221. Panning the sensor 221 may cause a rotation within a horizontal plane or about a vertical axis (e.g., a yaw), while tilting the sensor 221 may cause a rotation within a vertical plane or about a horizontal axis (e.g., a pitch). Additionally, the sensor 221 may be rolled, or rotated about its axis of rotation, and within a plane that is perpendicular to the axis of rotation and substantially parallel to a field of view of the sensor 221.

Imaging data (e.g., still or moving images, as well as associated audio data or metadata) captured using the sensor 221 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 221 may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 221 may also be an item identification sensor that may include a bar code scanner, a radiofrequency identification (or RFID) reader, or other technology that is utilized to determine an identification of an item that is being retrieved or deposited, or has been retrieved or deposited, by the support vessel 220. In some embodiments, the sensor 221 may be provided within a cargo bay or other storage component of the support vessel 220, such as a presence detection sensor and/or a motion sensor for detecting the presence or absence of one or more objects within the cargo bay or storage compartment, or movement of objects therein.

The sensor 221 may be further configured to capture, record and/or analyze information or data regarding its positions, velocities, accelerations or orientations of the support vessel 220, and to analyze such data or information by one or more means, e.g., by aggregating or summing such data or information to form one or more qualitative or quantitative metrics of the movement of the sensor 221. For example, a net vector indicative of any and all relevant movements of the support vessel 220, including but not limited to physical positions, velocities, accelerations or orientations of the sensor 221, may be derived. Additionally, coefficients or scalars indicative of the relative movements of the support vessel 220 may also be defined.

The power module 223 may be any type of power source for providing electrical power, mechanical power or other forms of power in support of one or more electrical or mechanical loads aboard the support vessel 220. In some embodiments, the power module 223 may be another form of prime mover (e.g., electric, gasoline-powered, diesel-powered, or any other type of motor) capable of generating sufficient mechanical forces for the support vessel 220. In some embodiments, the power module 223 may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 223 may each have any cell voltages, peak load currents, charge times, specific energies, internal resistances or cycle lives, or other power ratings. Alternatively, the power module 223 may also be any type, size or form of other power source, e.g., other than a battery, including but not limited to one or more fuel cells, turbines, generators, solar cells or nuclear reactors.

The navigation module 227 may include one or more software applications or hardware components including or having access to information or data regarding aspects of the tugboat 220 or the carrying vessel 250, as well as locations (e.g., ports) for receiving the tugboat 220 and/or the carrying vessel 250 within a given region, including the locations, dimensions, flow capacities, conditions, statuses or other attributes of various aquatic flow paths across the Earth. For example, in some embodiments, the navigation module 227 may be an inertial measurement unit or an inertial navigation system having one or more gyroscopes, accelerometers, compasses, magnetometers or other components. The navigation module 227 may receive inputs from the sensor 221, e.g., from a GPS receiver, an imaging device or another sensor, and determine an optimal direction and/or an optimal speed of the support vessel 220 for travelling to one or more locations or on a given path or route based on such inputs. The navigation module 227 may select a path or route to be traveled upon by the support vessel 220, e.g., into a naturally occurring aquatic flow path, or out of a naturally occurring aquatic flow path, and may provide information or data regarding the selected path or route to the control system 225.

The motor 229 may be any type or form of motor or engine (e.g., electric, gasoline-powered, diesel-powered or any other type of motor) that is capable of providing sufficient forces to one or more axles, shafts and/or propellers or other systems for causing the support vessel 220 and any items therein to travel in a desired direction and at a desired speed. In some embodiments, the support vessel 220 may include one or more inboard or outboard motors that have any number of stators, poles and/or windings, or are coupled to any number of propellers, and have any speed rating, power rating or any other rating. In addition to the motor 229, the support vessel 220 may further include one or more steering systems for controlling a direction of travel of the support vessel 220. Such steering systems may include any number of automatically operable gears (e.g., racks and pinions), gear boxes, shafts, shaft assemblies, joints, servos, hydraulic cylinders, linkages or other features for operating one or more rudders or other control surfaces to cause the support vessel 220 to travel in a desired direction.

In some embodiments, the support vessel 220 may be programmed or configured to perform one or more missions or tasks in an integrated manner. For example, the control system 225 may be programmed to instruct the support vessel 220 to travel to an origin, e.g., a port associated with the fulfillment center 230, and to engage with the carrying vessel 250 (or any number of carrying vessels). The support vessel 220 may be further programmed to depart from a port or another location along a selected route (e.g., an optimal route), and to cause the motor 229 to operate at any predetermined speed or to orient the support vessel 220 in a predetermined direction or otherwise as necessary to travel along the selected route, e.g., based on information or data received from or stored in the navigation module 227. The control system 225 may further cause the sensor 221 to capture information or data (including but not limited to imaging data) regarding the support vessel 220 and/or its surroundings along the selected route. The control system 225 or one or more other components of the support vessel 220 may be programmed or configured as necessary in order to execute any actions associated with a given task, in accordance with the present disclosure.

The fulfillment center 230 may be any facility that is adapted to receive, store, process and/or distribute items. As is shown in FIG. 2A, the fulfillment center 230 includes a server 232, a data store 234, and one or more computer processors 236. The fulfillment center 230 also includes stations for receiving, storing and distributing items to customers, including but not limited to a receiving station 231, a storage area 233 and a distribution station 235.

The server 232 and/or the processors 236 may operate one or more order processing and/or communication systems and/or software applications having one or more user interfaces, or communicate with one or more other computing devices or machines that may be connected to the network 280, as indicated by line 238, for transmitting or receiving information in the form of digital or analog data, or for any other purpose. For example, the server 232 and/or the processors 236 may also operate or provide access to one or more reporting systems for receiving or displaying information or data regarding orders for items received by the marketplace 210, or positions or contents of the carrying vessel 250 (or any number of carrying vessels) at any given time, and may provide one or more interfaces for receiving interactions (e.g., text, numeric entries or selections) from one or more operators, users, workers or other persons in response to such information or data. The server 232, the data store 234 and/or the processor 236 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 232 and/or the processors 236 may be configured to determine an optimal path or route between two locations for the execution of a given mission or task to be executed by the support vessel 220 and/or the carrying vessel 250 on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 232 and/or the processors 236 may be configured to control or direct, or to recommend or suggest, collaboration between or among the support vessel 220 or the carrying vessel 250 and one or more other vehicles in the performance of one or more tasks or in the execution of one or more functions. For example, the server 232 and/or the processors 236 may be configured to identify levels of inventory on the carrying vessel 250 or distributed among any number of other vehicles or in other locations, or to identify an optimal path to be traveled by the carrying vessel 250 in order to transport such items to a port or another destination. Additionally, where a plurality of carrying vessels 250 are loaded with items and traveling along a naturally occurring aquatic flow path, the server 232 and/or the processor 236 may determine which of the carrying vessels 250 is best suited to deliver items to a selected destination on any relevant factor or basis. The server 232 and/or the processor 236 may identify appropriate locations or rendezvous points where the support vessel 220 or the carrying vessel 250, or any number of support vessels or carrying vessels, may meet for any purpose.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), as well as the support vessel 220 or the carrying vessel 250, and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to locations or destinations specified by customers or the marketplace 210, e.g., by way of the support vessel 220 or the carrying vessel 250, or any other vehicle of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geocoded identifiers (e.g., dwellings or businesses), as well as storage lockers or other temporary storage or receiving facilities. Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230 by any known wired or wireless means, or with the marketplace 210, the support vessel 220, the carrying vessel 250 or the customer 270 over the network 280, as indicated by line 238, through the sending and receiving of digital data.

Additionally, the fulfillment center 230 may include one or more systems or devices (not shown in FIG. 2A or FIG. 2B) for determining locations of one or more elements therein, such as cameras or other image recording devices. Furthermore, the fulfillment center 230 may also include one or more workers or staff members (not shown in FIG. 2A or FIG. 2B), who may handle or transport items within the fulfillment center 230. Such workers may operate one or more computing devices or machines for registering the receipt, retrieval, transportation or storage of items within the fulfillment center, or a general-purpose device such as a personal digital assistant, a digital media player, a smartphone, a tablet computer, a desktop computer or a laptop computer, and may include any form of input and/or output peripherals such as scanners, readers, keyboards, keypads, touchscreens or like devices.

The carrying vessel 250 may be any type or form of seagoing vessel that is capable of being transferred into a naturally occurring aquatic flow path and configured for travel between two points in routes having any number of aquatic flow paths, in furtherance of the performance of one or more missions or tasks, such as the delivery of items, based on one or more computer instructions. For example, the carrying vessel 250 may be loaded with one or more items and configured for travel on an optimal path or route between two locations for the execution of a given mission or task on any basis, such as according to one or more traditional shortest path or shortest route algorithms. Likewise, one or more of the carrying vessels 250 may be configured to determine whether an item may be manufactured or produced thereby, either using stock materials carried thereon, or any items, waste products generated by such items, or remnants or scraps of such items that may be located nearby, independently or in concert with one or more other carrying vessels 250. The carrying vessel 250 may be configured for surface operations, e.g., to transport items on a surface of a body of water, and also for submerged operations, e.g., to transport items below the surface of the body of water.

In some embodiments, the carrying vessel 250 may be configured to distribute, or forward-deploy, inventory from one or more fulfillment centers 230 to regions where demand for items is known, observed or predicted, in anticipation of one or more orders for such items, or to fulfill such orders, via naturally occurring aquatic flow paths. The carrying vessel 250 may be configured to transport items from one or more ports associates with the fulfillment center 230 to such regions autonomously by way of the support vessel 220, or by any other means. In some other embodiments, the carrying vessel 250 may be configured to return to a port associated with the fulfillment center 230 after fulfilling orders for some or all of the items carried thereby, e.g., by traveling to one or more ports associated with the fulfillment center 230 autonomously by way of the support vessel 220, or by any other means.

The carrying vessel 250 may include one or more computer components such as a processor 252, a memory 254 and a transceiver 256 in communication with one or more other computer devices that may be connected to the network 280, as indicated by line 258, in order to transmit or receive information in the form of digital or analog data, or for any other purpose. The processor 252, the memory 254 and the transceiver 256 may be identical to, or may include any number of features described above with regard to, the processor 222, the memory 224 or the transceiver 226, respectively, of the support vessel 220.

Additionally, as is shown in FIG. 2B, the carrying vessel 250 further includes a sensor 251, a power module 253, a control system 255, an automated fabricator 257 and an item engagement apparatus 259. Each of the sensor 251, the power module 253 and the control system 255 may include any of the features or attributes described above with respect to the sensor 221, the power module 223 or the control system 225 of the support vessel 220, and may be configured to execute any of the tasks or perform any of the functions described above with respect to the sensor 221, the power module 223 or the control system 225 of the support vessel 220.

Additionally, as is shown in FIG. 2B, the carrying vessel 250 may further include an automated fabricator 257 having tooling equipment and access to one or more materials (e.g., raw materials and/or stock materials). The automated fabricator 257 may be a 3D printer or any other device or component for automatically forming an end product according to one or more sets of computer instructions. For example, the automated fabricator 257 may include tooling equipment such as any machines or components for manipulating raw materials and/or stock materials to form an end product therefrom. The automated fabricator 257 may further include any number of computer processors, data stores, memory components or communications equipment for controlling the operation of tooling equipment or receiving instructions for the operation thereof. For example, in some embodiments, the automated fabricator 257 may include one or more filaments, heads, blades, nozzles, motors, rollers, heat sources, radiation sources or other elements for molding, shaping, forming, curing, solidifying or depositing layers of materials, or otherwise manipulating materials, and forming an end product therefrom.

Furthermore, the automated fabricator 257 may have access to any liquid, gaseous or solid materials that may be molded, shaped, formed, cured, solidified or deposited into an end product. Such materials may be maintained or stored aboard the carrying vessel 250 in one or more vats, vessels, tanks, bins, platforms or other storage spaces that are accessible to the automated fabricator 257 or accessible thereto. In some embodiments, such materials may include thermoplastic materials including but not limited to acrylonitrile-butadiene-styrene, nylon, high density polyethylene, polycarbonate, polyetherimide, polyether ether ketone, polylactic acid, poly(meth)acrylate, polyphenylene sulphone, polystyrene, as well as one or more polymers, copolymers or ionomers thereof, or combinations of any of such materials. In some embodiments, such materials may include aluminum, antimony, barium, bismuth, cesium, gold, lead, iodine, steel, tantalum, tin or tungsten, or one or more oxides, nitrides or alloys thereof. In some embodiments, such materials may include not only liquids, gases or solids but also gels, resins, plasmas or any other types or classes of materials. In some embodiments, the materials that are provided aboard the carrying vessel 250 and are accessible to the automated fabricator 257 may include both stock materials, or materials that have not yet been processed or formed into an end product, and are loaded onto the carrying vessel 250 for the purpose of ultimately being formed into one or more end products. Additionally, materials that are provided aboard the carrying vessel 250 and are accessible to the automated fabricator 257 may include materials extracted from an ocean in which the carrying vessel 250 has traveled.

The item engagement system 259 may be any mechanical component, e.g., a robotic arm, for engaging an item or for disengaging the item, as desired. For example, when the carrying vessel 250 tasked with delivering items or materials from an origin to a destination by way of one or more aquatic flow paths, the item engagement system 259 may be used to engage the items or materials at the origin and to deposit the items or materials in a cargo bay or other storage compartment of the carrying vessel 250 prior to departure. After the carrying vessel 250 has arrived at a destination, the item engagement system 259 may be used to retrieve the items or materials within the cargo bay or storage compartment, and deposit the items or materials in a desired location at the destination.

In some embodiments, the carrying vessel 250 may further include any number of features for maintaining the carrying vessel 250 at a desired freeboard, list, pitch, depth or other configuration or orientation. For example, the carrying vessel 250 may include any number of ballast tanks that may be selectively filled or emptied to vary a density of the carrying vessel 250, or to cause the carrying vessel 250 to rise or fall. Such tanks may include manual or automated operators that may be configured for operation using electrical, mechanical, pneumatic, hydraulic or any other source of energy, e.g., the power module 253, provided aboard the carrying vessel 250 in accordance with the present disclosure.

In some other embodiments, the carrying vessel 250 may be configured to receive items, rather than merely deliver items. For example, because garbage, trash or other natural or man-made items are known to collect within centers of gyres, such as the Sargasso Sea within the North Atlantic gyre, the carrying vessel 250 may be configured to retrieve such garbage, trash or other items from a body of water in which the carrying vessel 250 is located, e.g., by the item engagement system 259. In some other embodiments, one or more aspects of the carrying vessel 250, such as the automated fabricator 257, may be configured to manufacture or produce one or more other items using materials retrieved from one or more bodies of water while the carrying vessel 250 is in transit.

In some embodiments, the carrying vessel 250 may include any of the features or components of the support vessel 220 described herein. In some embodiments, the support vessel 220 may include any of the features or components of the carrying vessel 250 described herein. For example, the carrying vessel 250 may include one or more navigation systems 227, e.g., inertial measurement units or inertial navigation systems having one or more gyroscopes, accelerometers, compasses, magnetometers or other components. The carrying vessel 250 may further include one or more motors 229, e.g., propulsion motors, or, alternatively, auxiliary motors for maneuvering or repositioning the carrying vessel 250, such as outboard motors. Likewise, the support vessel 220 may include one or more automated fabricators 257, e.g., 3D printers, or one or more engagement systems 259, e.g., robotic arms or like features. In some embodiments, the attributes or features described herein with regard to the support vessel 220 and the carrying vessel may exist in a single vessel.

The customer 270 may be any entity or individual that wishes to download, purchase, rent, lease, borrow or otherwise obtain items (which may include goods, products, services or information of any type or form) from the marketplace 210. The customer 270 may utilize one or more computing devices 272 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 274, such as a web browser or a shopping application, and may be connected to or otherwise communicate with the marketplace 210 or the fulfillment center 230 through the network 280, as indicated by line 278, by the transmission and receipt of digital data.

The vehicle monitoring system 290 includes one or more physical computer servers 292 having a plurality of databases 294 associated therewith, as well as one or more computer processors 296 provided for any specific or general purpose. The servers 292 may be connected to or otherwise communicate with the databases 294 and the processors 296. The databases 294 may store any type of information or data, including but not limited to positions of vessels, e.g., the support vessel 220 and the carrying vessel 250, or any numbers of support vessels or carrying vessels, as well as times associated with such positions, and attributes of the support vessel 220 or the carrying vessel 250 such as dimensions (e.g., lengths, widths or heights), masses, velocities, or cargo carried, along with water temperatures, wind conditions, wave heights, freeboard distances, angular orientation data, or any other information or data regarding the operation of the support vessel 220 or the carrying vessel 250 within one or more naturally occurring seawater or freshwater flows.

The servers 292 and/or the computer processors 296 may also connect to or otherwise communicate with the network 280, as indicated by line 298, through the sending and receiving of digital data. For example, the vehicle monitoring system 290 may include any facilities, stations or locations having the ability or capacity to receive and store information or data in one or more data stores, e.g., data files received from the support vessel 220 or the carrying vessel 250, or from one or more other external computer systems (not shown) via the network 280. In some embodiments, the vehicle monitoring system 290 may be provided in a physical location. In other such embodiments, the vehicle monitoring system 290 may be provided in one or more alternate or virtual locations, e.g., in a "cloud"-based environment. In still other embodiments, the vehicle monitoring system 290 may be provided onboard one or more of the support vessels 220 or the carrying vessel 250.

For example, the vehicle monitoring system 290 of FIGS. 2A and 2B may be independently provided for the purpose of determining or predicting the demand for items in one or more locations, or comparing the demand to a predetermined threshold or limit, as well as distances between locations of known, observed or predicted demand and locations where such items are stored, e.g., locations of the fulfillment center 230 or the carrying vessel 250 having such items stored therein. The vehicle monitoring system 290 may also be provided for the purpose of determining the type of form of materials that may be available in one or more locations, e.g., locations of items, waste products generated by items, or remnants or scraps of items, and may be retrieved therefrom. The vehicle monitoring system 290 may also be provided for the purpose of determining whether one or more of the carrying vessels 250 may receive such items or materials, or is adequately configured or outfitted to receive, store, distribute or manufacture or produce one or more items in response to an order, or to deliver the manufactured or produced item to a specific location. The vehicle monitoring system 290 may be further configured to determine or predict flow rates or directions of flow of any number of naturally occurring aquatic flow paths, such as gyres, currents or eddies based on any available information or data, e.g., photographs, historical observations, or prevailing weather or environmental conditions. In some embodiments, the vehicle monitoring system 290 may be configured to execute any number of machine learning systems or techniques to determine or predict flow rates or directions, such as by providing any relevant information or data regarding the support vessel 220, the carrying vessel 250 or other vessels as inputs to a classifier or other technique, and determining or predicting the flow rates or the directions based on outputs received from the classifier or other technique.

In some embodiments, the vehicle monitoring system 290 of FIGS. 2A and 2B may also be provided for the purpose of receiving, tracking and/or otherwise monitoring the operations of one or more of the support vessels 220 or the carrying vessel 250, or any number of support vessels, carrying vessels or other vessels, including but not limited to any information or data regarding attributes of the support vessel 220 or the carrying vessel 250, or missions or tasks being performed by the support vessel 220 or the carrying vessel 250, as well as environmental conditions, sea traffic conditions, weather conditions, planned or ongoing construction or other events, or any other factors that may affect the capacity of the carrying vessel 250 to store or distribute items via naturally occurring aquatic flow paths such as gyres, currents, eddies or others.

The vehicle monitoring system 290 may also be configured to determine an optimal path or route over one or more naturally occurring aquatic flow paths for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. The vehicle monitoring system 290 may also be configured to determine whether a route being traveled by one or more of the support vessels 220 or the carrying vessel 250 is optimal or preferred for a given mission or task, or to communicate instructions for varying the route to the support vessel 220. The vehicle monitoring system 290 may also be configured to control or direct the operations of one or more the support vessels 220 or the carrying vessel 250, such as by identifying materials or tooling equipment that may be available to the carrying vessel 250, or by determining which of a plurality of support vessels or carrying vessels is best suited to perform a given task or execute a given function, as well as one or more paths to be traveled by the support vessel 220 or the carrying vessel 250 between two or more locations while performing the task or executing the function. The vehicle monitoring system 290 may further utilize any available information or data in determining a capacity of a given path or route, or whether such capacity may have increased or decreased. The number and/or type of information or data that may be received and/or processed or utilized by the vehicle monitoring system 290 are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "support vessel," a "fulfillment center" a "carrying vessel," a "customer," a "vehicle monitoring system" or like terms, may be automated steps performed by their respective computer systems, or implemented within software modules (or computer programs) executed by one or more general purpose computers. Moreover, process steps described as being performed by a "marketplace," a "support vessel," a "fulfillment center" a "carrying vessel," a "customer," a "vehicle monitoring system" may be typically performed by a human operator, but could, alternatively, be performed by an automated agent.

The marketplace 210, the support vessel 220, the fulfillment center 230, the carrying vessel 250, the customer 270, or the vehicle monitoring system 290 may use any web-enabled or Internet applications or features, or any other client-server applications, features or messaging techniques, to connect to the network 280 or to communicate with one another. For example, the fulfillment center 230 and/or the server 232 may be adapted to transmit information or data in the form of synchronous or asynchronous messages to the marketplace 210 and/or the server 212, the support vessel 220 and/or the processor 222, the carrying vessel 250 and/or the processor 252, the customer 270 and/or the computing device 272, or the vehicle monitoring system 290, or any other computer device in real time or in near-real time, or in one or more offline processes, via the network 280. Those of ordinary skill in the pertinent art would recognize that the marketplace 210, the support vessel 220, the fulfillment center 230, the carrying vessel 250, the customer 270, or the vehicle monitoring system 290 may operate any of a number of computing devices that are capable of communicating over the network 280. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, 292, the processors 222, 252, the computing devices 272, or any other computers or control systems utilized by the marketplace 210, the support vessel 220, the fulfillment center 230, the carrying vessel 250, the customer 270, or the vehicle monitoring system 290, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, the Earth's oceans are constantly in motion, and include gyres, currents, eddies and other naturally occurring seawater or freshwater flows. Referring to FIGS. 3A through 3F, aquatic flow paths on planet Earth are shown. Except where otherwise noted, reference numerals preceded by the number "3" in FIGS. 3A through 3F refer to elements that are similar to elements having reference numerals preceded by the number "2" in FIG. 2A or FIG. 2B or by the number "1" shown in FIGS. 1A through 1L.

Figure 3A:
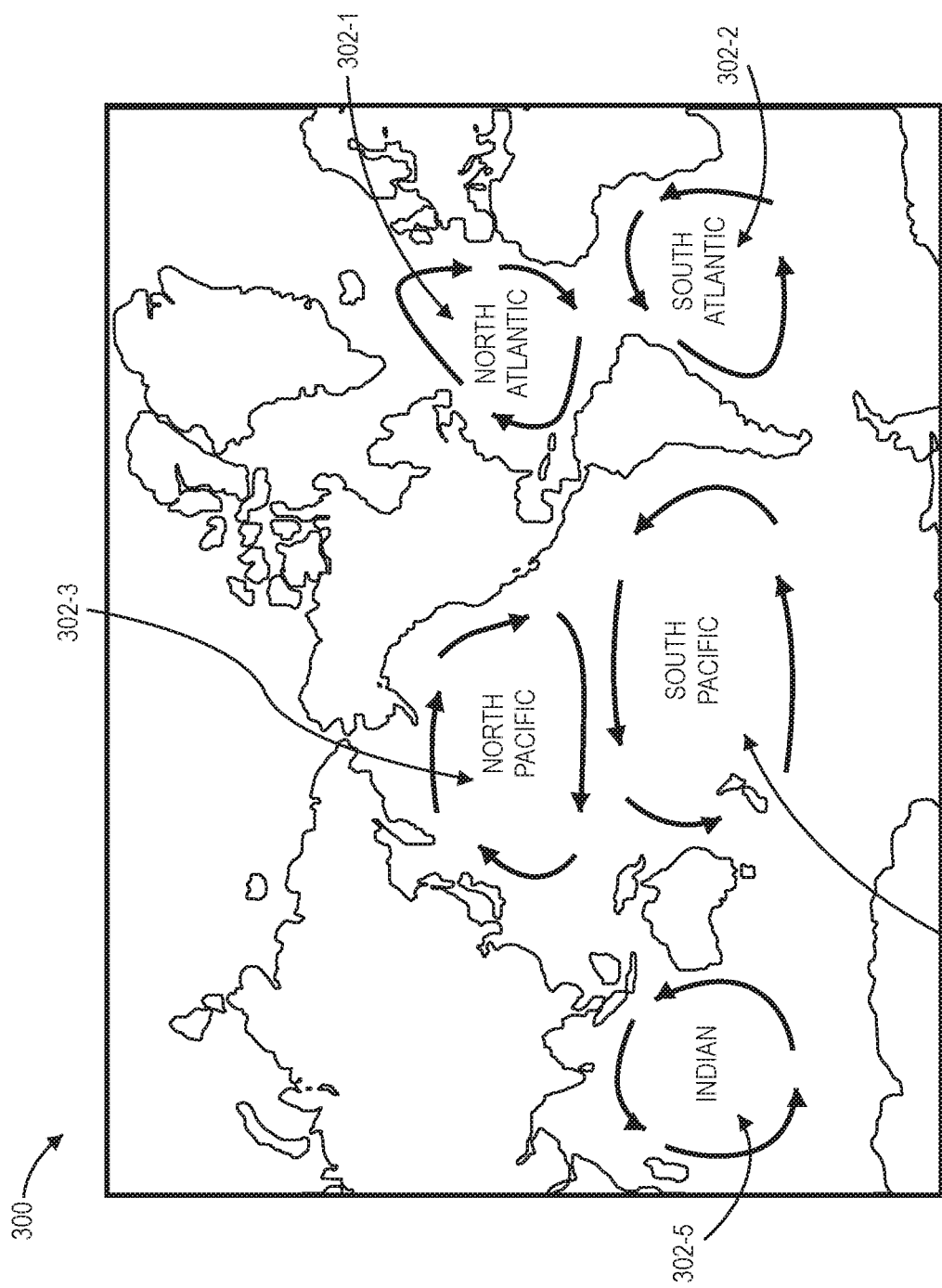
FIGS. 3A through 3F are views of some aquatic flow paths on planet Earth.

As is shown in FIG. 3A, the Earth's oceans form a system 300 that includes five gyres 302-1, 302-2, 302-3, 302-4, 302-5, each of which is recognized as having a strong, narrow western boundary current and a weak but broad eastern boundary current. Gyres that are located primarily in the Earth's northern hemisphere, viz., the North Atlantic gyre 302-1 and the North Pacific gyre 302-3, rotate generally in a clockwise direction, while gyres that are located primarily in the Earth's southern hemisphere, viz., the South Atlantic gyre 302-2, the South Pacific gyre 302-4 and the Indian gyre 302-5, rotate generally in a counterclockwise direction. Each of the gyres 302-1, 302-2, 302-3, 302-4, 302-5 is generally reliably clockwise or counterclockwise, respectively, but is subject to seasonal variations in flow rates and velocities.

Figure 3B:
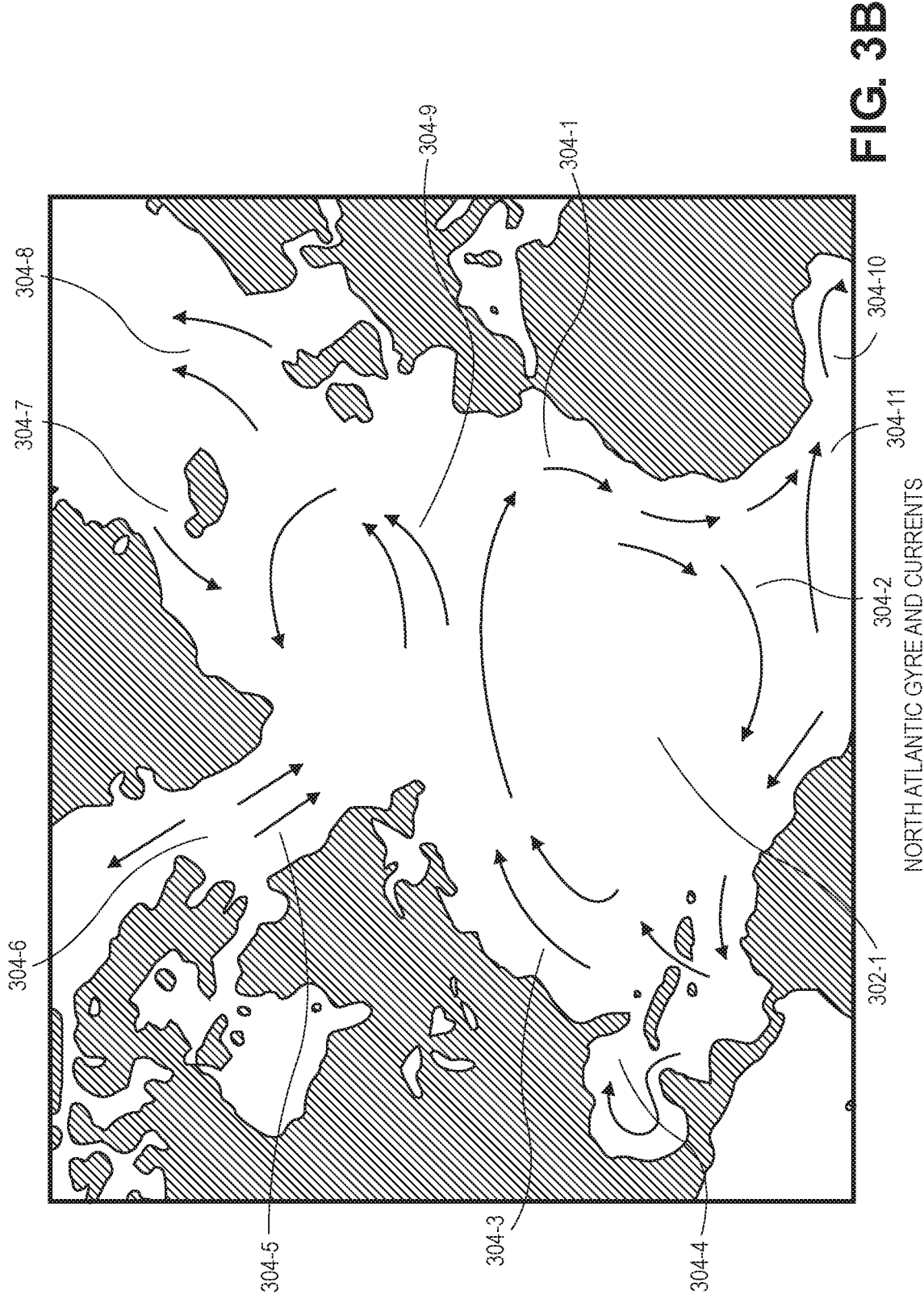

As is shown in FIG. 3B, the North Atlantic gyre 302-1 includes a clockwise system of currents that flow in a southwest direction along the coast of Africa before turning west and flowing parallel to the equator toward the Americas. The North Atlantic gyre 302-1 then flows toward and into the Gulf of Mexico before turning north along the east coast of the United States, and again turning easterly toward northern Europe before rotating downward along the coasts of France and Spain. In particular, the North Atlantic gyre 302-1 includes the Canary current 304-1, which is a wide current that is wind-driven southwesterly along Portugal, Spain and Morocco, and through the Canary Islands, as well as a North Atlantic equatorial current 304-2 that flows westerly and north of the equator, from western Africa to northeastern South America. The North Atlantic gyre 302-1 further includes the Gulf Stream current 304-3, which is formed in part and fed by the Florida current 304-4, and flows upward along the eastern seaboard. The North Atlantic currents 304-9, which are formed by the Gulf Stream current 304-3 flowing northeast and the Labrador current 304-5 flowing southwest between Canada and Greenland, complete the North Atlantic gyre 302-1 and flow easterly and both north and south between Labrador and the British Isles. The West Greenland current 304-6 flows north and west, along the west coast of Greenland, while the East Greenland current 304-7 flows north and east, along the east coast of Greenland, and the Norwegian current 304-8 also flows north and east, between Iceland and Scandinavia. Additionally, the Guinea current 304-10 flows along the southern and western coasts of western Africa, and an Atlantic equatorial countercurrent 304-11 flows along the equator, parallel to the North Atlantic equatorial current 304-2 and in an opposite direction.

Figure 3C:
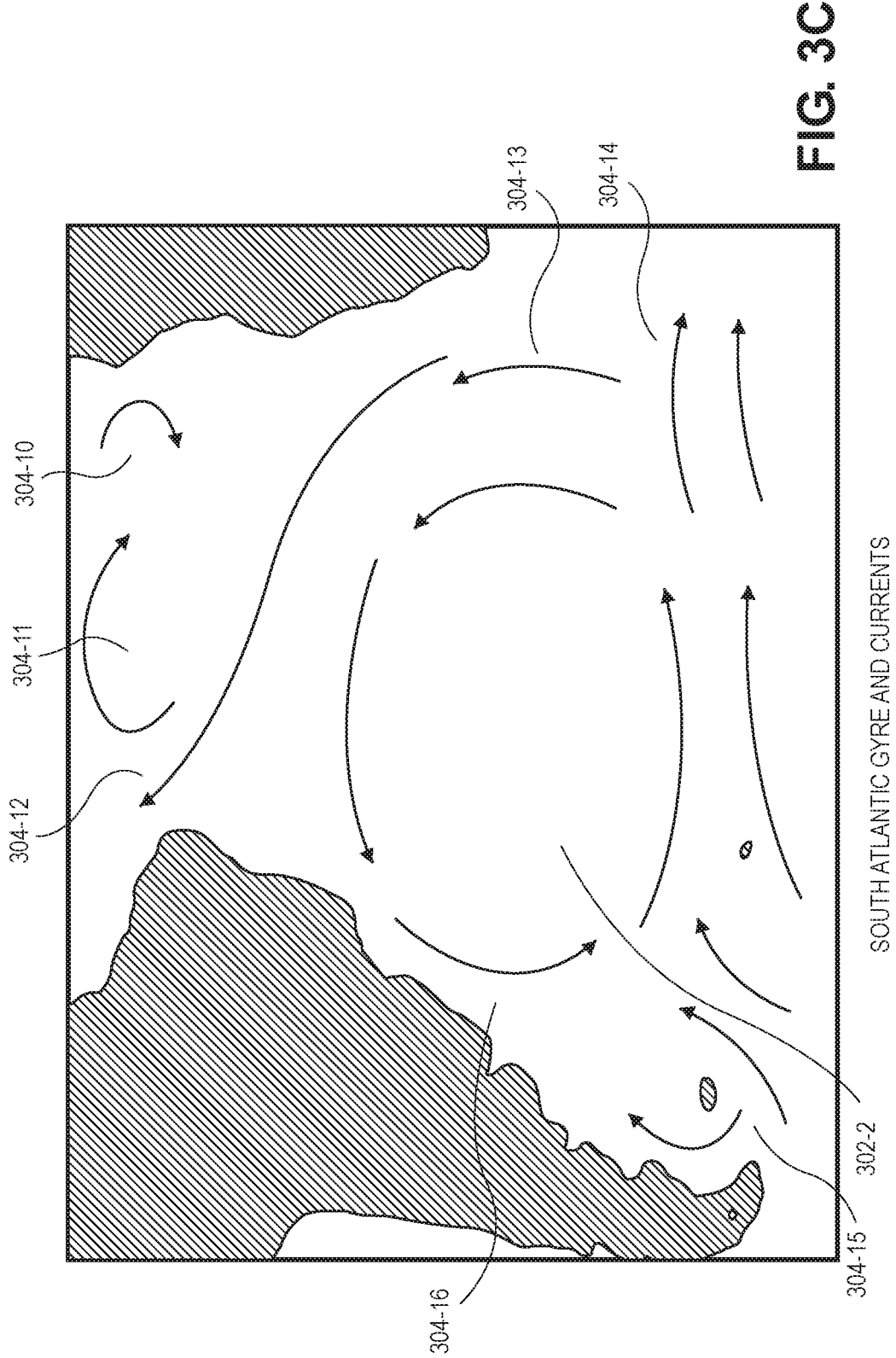

As is shown in FIG. 3C, the South Atlantic gyre 302-2 includes a counterclockwise system of currents that flow south and west along the eastern coasts of Brazil, Uruguay and Argentina, before turning east and eventually north along the western coast of Africa. In particular, the South Atlantic gyre 302-2 includes the South Atlantic equatorial current 304-12, which flows westerly from western Africa to northeastern South America, and the Benguela current 304-13, which flows north along the western coast of Africa. The Brazilian current 304-16 flows south and west along the coasts of Brazil, Uruguay and Argentina before turning east and running parallel to the Antarctic circumpolar current 304-14, which encircles *Antarctica* and runs in an easterly direction. The Falklands current 304-15 flows in an opposite direction, between the Falkland Islands and Argentina.

Figure 3D:
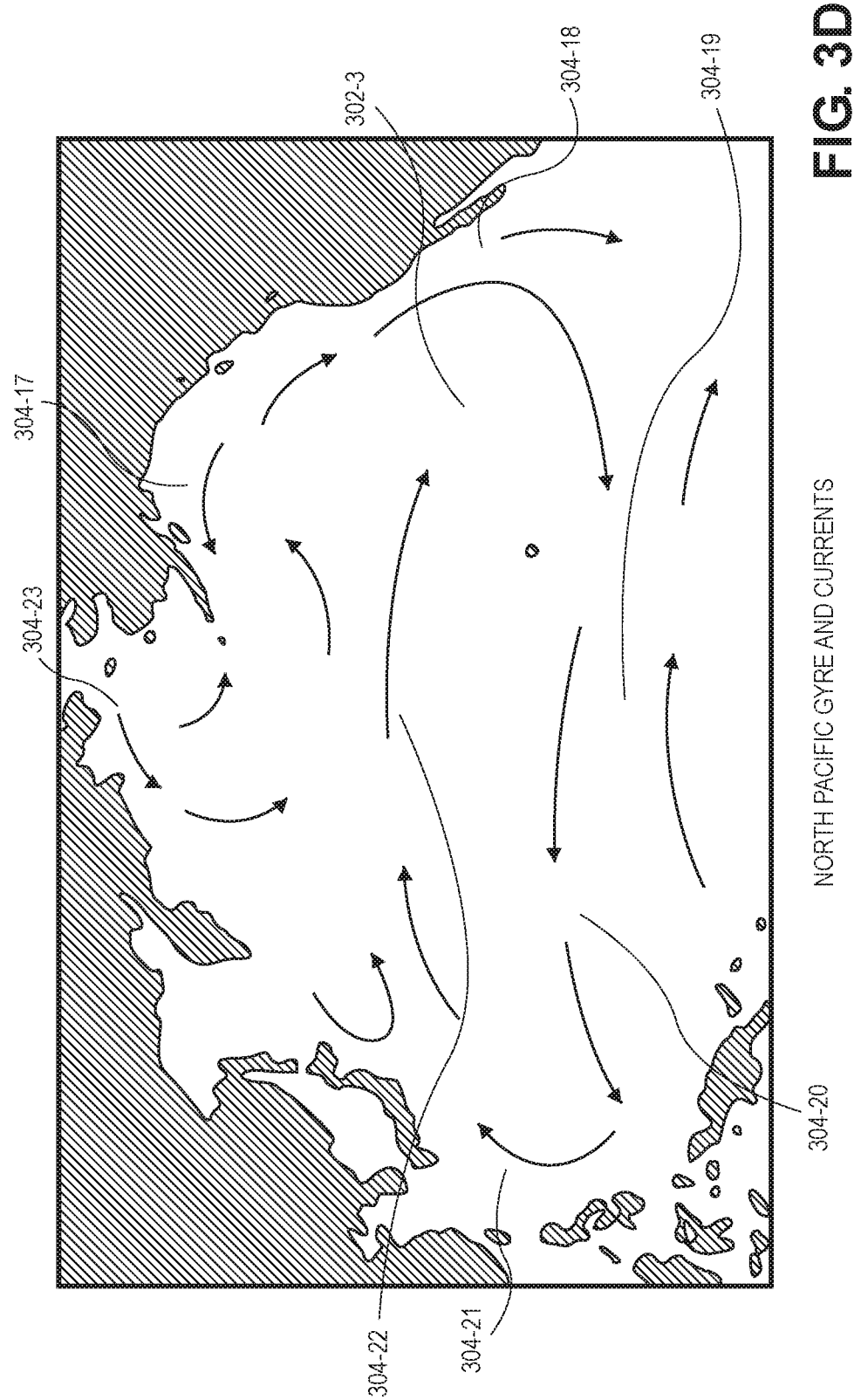

As is shown in FIG. 3D, the North Pacific gyre 302-3 includes a clockwise system of currents that flow in a westward direction, parallel to and above the equator, before turning north and flowing along the eastern coasts of China and Japan. The North Pacific gyre 302-3 then flows in an easterly direction along eastern Russia and the Aleutian Islands, before turning south and flowing along the Yukon Territory, the western states of the United States, and the Baja California peninsula. In particular, the North Pacific gyre 302-3 includes the California current 304-18, the North Equatorial current 304-20, the Kuroshio current 304-21 and the North Pacific current 304-22. The Kamchatka current 304-23 flows south through the Bering Straits and along the eastern coast of the Kamchatka Peninsula before joining the North Pacific Current 304-22. Additionally, the Alaska current 304-17 runs in a westerly direction along the southern coast of mainland Alaska and the Aleutian Islands, while the Pacific equatorial countercurrent 304-19 runs in an easterly direction between the currents of the North Pacific gyre 302-3 and the currents of the South Pacific gyre 302-4.

Figure 3E:
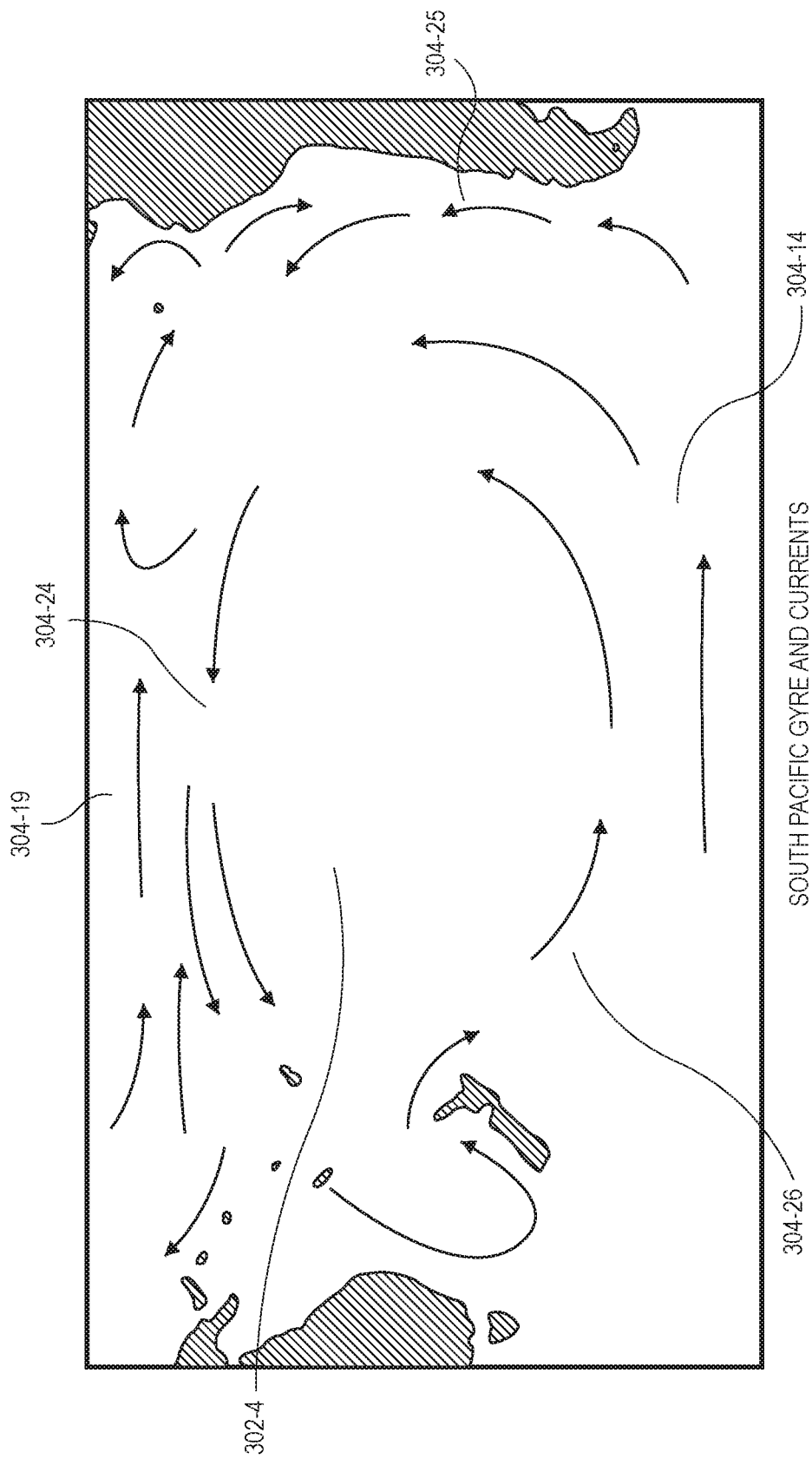

As is shown in FIG. 3E, the South Pacific gyre 302-4 includes a counterclockwise system of currents that also flow in a westward direction, parallel to but below the equator, before turning south and flowing along the eastern coasts of Papua New Guinea and Australia, between and around the islands of New Zealand. The South Pacific gyre 302-4 then flows in an easterly direction before turning north along the Chilean coast. In particular, the South Pacific gyre 302-4 includes the Peru current 304-25, which flows north along the coasts of Chile, Peru, Ecuador and Colombia, and the South Pacific equatorial current 304-24, which runs westerly, parallel to and in an opposite direction from the Pacific countercurrent 304-19. The East Australia current 304-26 flows from the South Pacific equatorial current 304-24 and flows southeasterly along Australia and New Zealand before turning east and running parallel to the Antarctic circumpolar current 304-14.

Figure 3F:
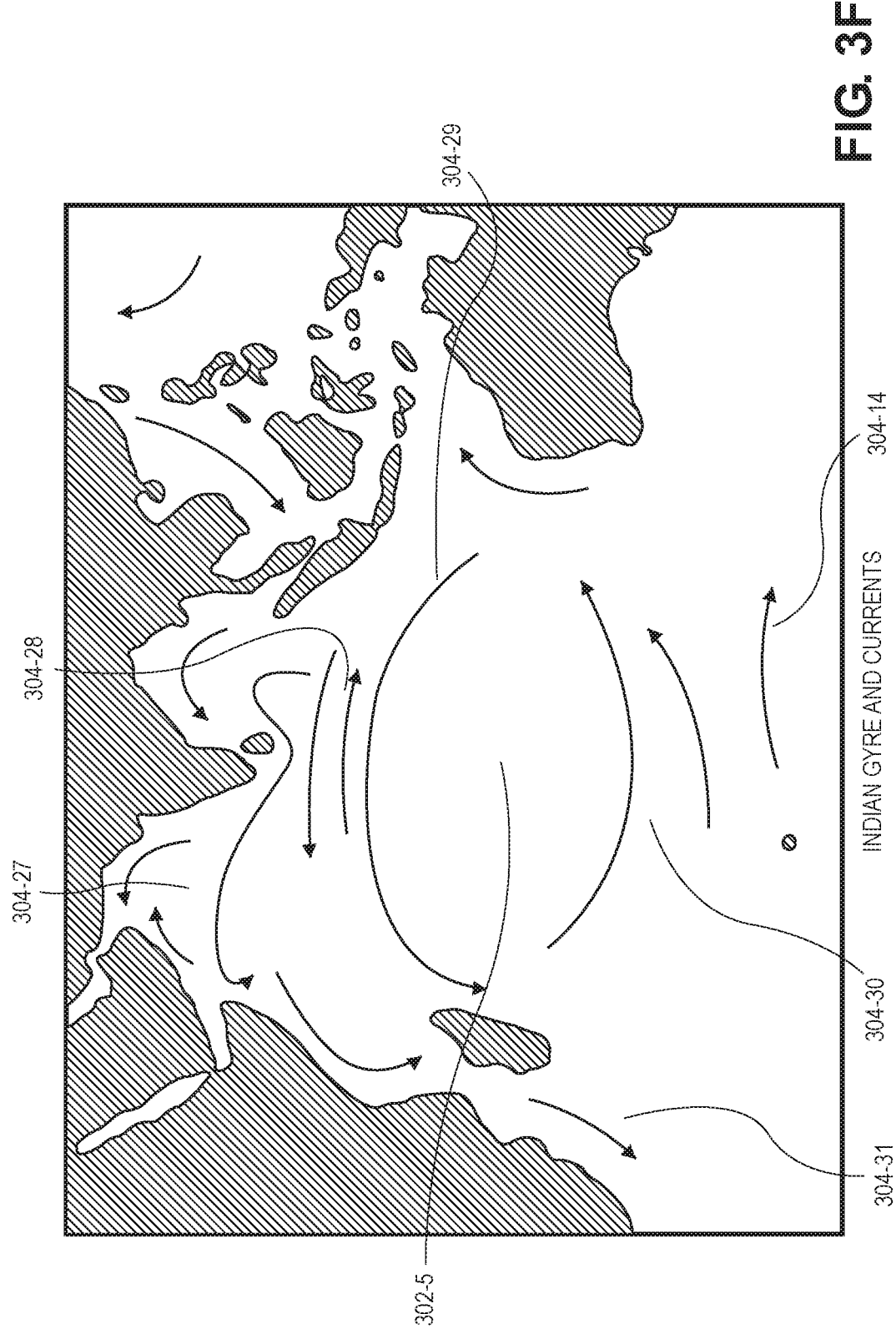

As is shown in FIG. 3F, the Indian gyre 302-5 includes a counterclockwise system of currents that flow in a westward direction below the Indian subcontinent before turning south and flowing along the eastern coasts of Africa and Madagascar. The Indian gyre 302-5 then flows in an easterly direction before turning north along the western coast of Australia and the southern coasts of Indonesia. In particular, the Indian gyre 302-5 includes the South Indian equatorial current 304-29, which flows south of India and Sri Lanka in a westerly direction, before turning south along the coast of Madagascar, and the West Australia current 304-30, which flows in an easterly direction, parallel to the Antarctic circumpolar current 304-14.

Additionally, the North Indian Equatorial current 304-27, which also flows south of India and Sri Lanka, in a counterclockwise direction, further turns northwesterly along the coasts of India, Pakistan, and the Arabian Peninsula. The Agulhas current 304-31 flows from the South Indian equatorial current 304-29, between the African coast and Madagascar. Additionally, the Indian equatorial countercurrent 304-28 runs in an easterly direction between the currents of the North Indian Equatorial current 304-27 and the currents of the South Indian equatorial current 304-29.

While FIG. 3A generally describes the flows of the Earth's five primary gyres 302-1, 302-2, 302-3, 302-4, 302-5, FIGS. 3B through 3F depict only some of the Earth's naturally occurring flows of water. The systems and methods of the present disclosure are not limited to the storage and distribution of items or other operations via the gyres and currents shown in FIGS. 3A through 3F, and may instead be utilized in connection with the storage of items in, and the distribution of items from, any naturally occurring flows of freshwater or salt water, including but not limited to the gyres 302-1 through 302-5 or the currents 304-1 through 304-31 shown in FIGS. 3A through 3F. Moreover, the representations of flows of the gyres 302-1 through 302-5 or the currents 304-1 through 304-31 are generally depicted for demonstration only. Those of ordinary skill in the pertinent arts will recognize that the storage and distribution of items in accordance with the present disclosure is not limited to the locations or directions of flow represented by the arrows shown in FIGS. 3A through 3F, and that the storage and distribution of items as described herein may occur in any location on or below a surface of a body of water where naturally occurring flows exist. Rather, seawater or freshwater flows may move in different directions, and at different flow rates, at different depths over the same location. Accordingly, in some embodiments, a carrier vessel and/or a support vessel may be configured for travel on a surface of a body of water. In some embodiments, however, one or more of a carrier vessel or a support vessel may be a submersible, or configured for surfaced or submerged operations, such as within a current or other naturally occurring flow of water that is located below a surface of a body of water.

Figure 4:
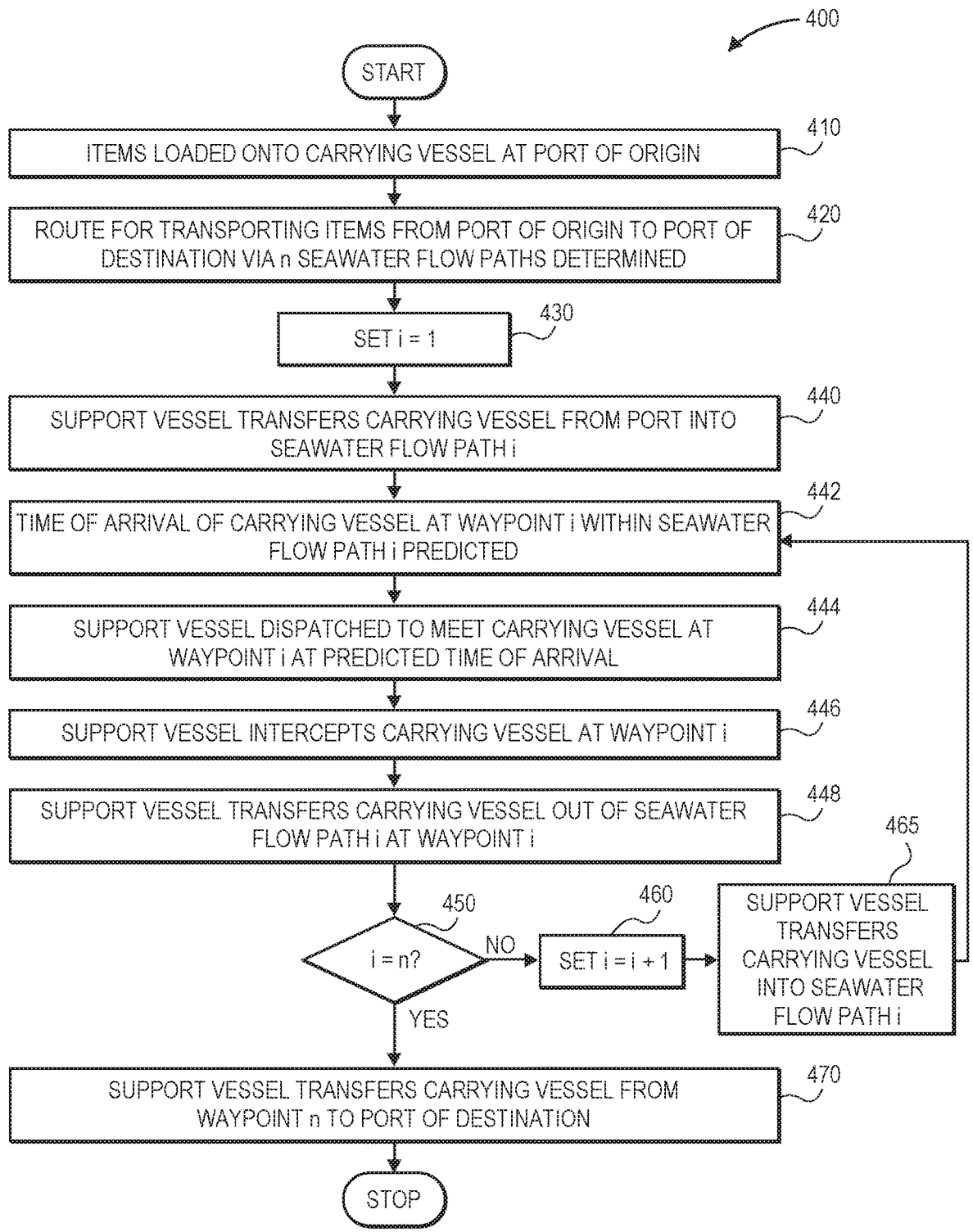
FIG. 4 is a flow chart of one process for ocean-based storage and distribution of items in accordance with embodiments of the present disclosure.

As is discussed above, barges or other carrying vessels may be transported into natural occurring seawater or freshwater flows and permitted to travel at speeds and directions provided by such flows, before being removed from such flows and transported to their intended destinations. Referring to FIG. 4, a flow chart 400 of one process for ocean-based storage and distribution of items in accordance with embodiments of the present disclosure is shown. At box 410, items are loaded onto a carrying vessel at a port of origin. The carrying vessel may have any dimensions and be configured to receive the items in any manner. For example, the carrying vessel may be a long, substantially narrow seagoing vessel having a hull with a substantially flat bottom or a hull having any other shape. For example, the hull may be defined with any number of trusses, stanchions or bulkheads, as well as any numbers of knuckles, frames or other structures. Additionally, the carrying vessel may include any number of decks for receiving items thereon, or any number of cargo bays or other storage compartments for receiving items therein. The carrying vessel may also include any cranes, elevators or other systems for receiving items thereon or unloading items therefrom. Alternatively, the carrying vessel may have a hull with any other shape or form, and may be configured for operation on or below a surface of a body of water. Moreover, in some embodiments, the carrying vessel may be loaded with items while the carrying vessel is at sea, such as by transferring the items onto the carrying vessel from another vessel or other source, where the carrying vessel or the other vessel is configured with a crane or other system for transferring items therebetween.

At box 420, a route for transporting the items from the port of origin to a port of destination via one or more seawater flow paths, viz., n flow paths, is determined. The route may be determined according to any number of optimal route or optimal path techniques, such as according to one or more traditional shortest path or shortest route algorithms such as Dijkstra's Algorithm, Bellman-Ford Algorithm, Floyd-Warshall Algorithm, Johnson's Algorithm or a hub labeling technique, where timely and relevant information regarding the gyres, currents and/or eddies or other seawater flow paths within a vicinity of the port of origin, the port of destination or therebetween is known. The route may include any number of waypoints, and any number of paths between such waypoints.

At box 430, a value of a step variable i is set to equal one, or i=1. At box 440, a support vessel transfers the carrying vessel from the port of origin into a seawater flow path i in accordance with the route determined at box 420. The support vessel may be selected on any basis, including proximity to the port of origin or to the seawater flow path i, or any relationship with the port of origin or the seawater flow path i, as well as a capacity to transport the carrying vessel from the port of origin to the seawater flow path i. The support vessel may engage with the carrying vessel at the port of origin in any manner, e.g., by any number of lines, chains or any other connections, or by direct contact, and may transfer the carrying vessel into the seawater flow path i by pushing or pulling the carrying vessel from the port of origin into the seawater flow path i at a desired location. Alternatively, the carrying vessel may be transferred into the seawater flow path i by a single support vessel, or by multiple support vessels, which may operate in tandem (e.g., together) or separately, e.g., by transferring control of the carrying vessel therebetween, to push or pull the carrying vessel into the seawater flow path i. Additionally, a location within the seawater flow path i into which the carrying vessel is to be transferred may be selected on any basis.

At box 442, a time of arrival of the carrying vessel at a waypoint i is predicted. For example, where a flow rate of the seawater flow path i is known or predicted, a time of arrival of the carrying vessel at the waypoint i may be calculated based on a distance from the point at which the carrying vessel is inserted into the seawater flow path i to the waypoint i, and the known or predicted flow rate.

At box 444, a support vessel is dispatched to meet the carrying vessel at the waypoint i and at the time of arrival predicted at box 442. For example, the support vessel may be selected on any basis, including but not limited to its proximity to the waypoint i, or any relationship with the waypoint i, as well as a capacity to transfer the carrying vessel out of the seawater flow path i at the waypoint i. At box 446, the support vessel intercepts the carrying vessel at the waypoint i. For example, the support vessel may approach the carrying vessel to within a suitable range, or contact the carrying vessel, and engage with the carrying vessel in the same manner that a support vessel transferred the carrying vessel into the seawater flow path i at box 440 or in a different manner.

At box 448, the support vessel transfers the carrying vessel out of the seawater flow path i at the waypoint i. For example, the support vessel may push or pull the carrying vessel out of the seawater flow path i, by direct contact or by one or more connectors (e.g., lines).

At box 450, whether the selected flow path i is the final path of the n paths in the route determined at box 420, or whether i=n, is determined. If the selected flow path i is not the final flow path of the route, or if i does not equal n, then the process advances to box 460, where the value of the step variable i is incremented by one, or i=i+1, and to box 465, where the support vessel transfers the carrying vessel into another seawater flow path i, before returning to box 442, where a time of arrival of the carrying vessel at a waypoint i within the seawater flow path i into which the carrying vessel was transferred is predicted.

If the selected flow path i is the final flow path of the route, or if i=n, then the process advances to box 470, where the support vessel transfers the carrying vessel from waypoint n to the port of destination, and the process ends.

Referring to FIGS. 5A through 5H, views of aspects of one system 500 for ocean-based storage and distribution of items in accordance with embodiments of the present disclosure are shown. Except where otherwise noted, reference numerals preceded by the number "5" in FIGS. 5A through 5H refer to elements that are similar to elements having reference numerals preceded by the number "3" in FIGS. 3A through 3F, by the number "2" in FIG. 2A or FIG. 2B or by the number "1" shown in FIGS. 1A through 1L.

Figure 5A:
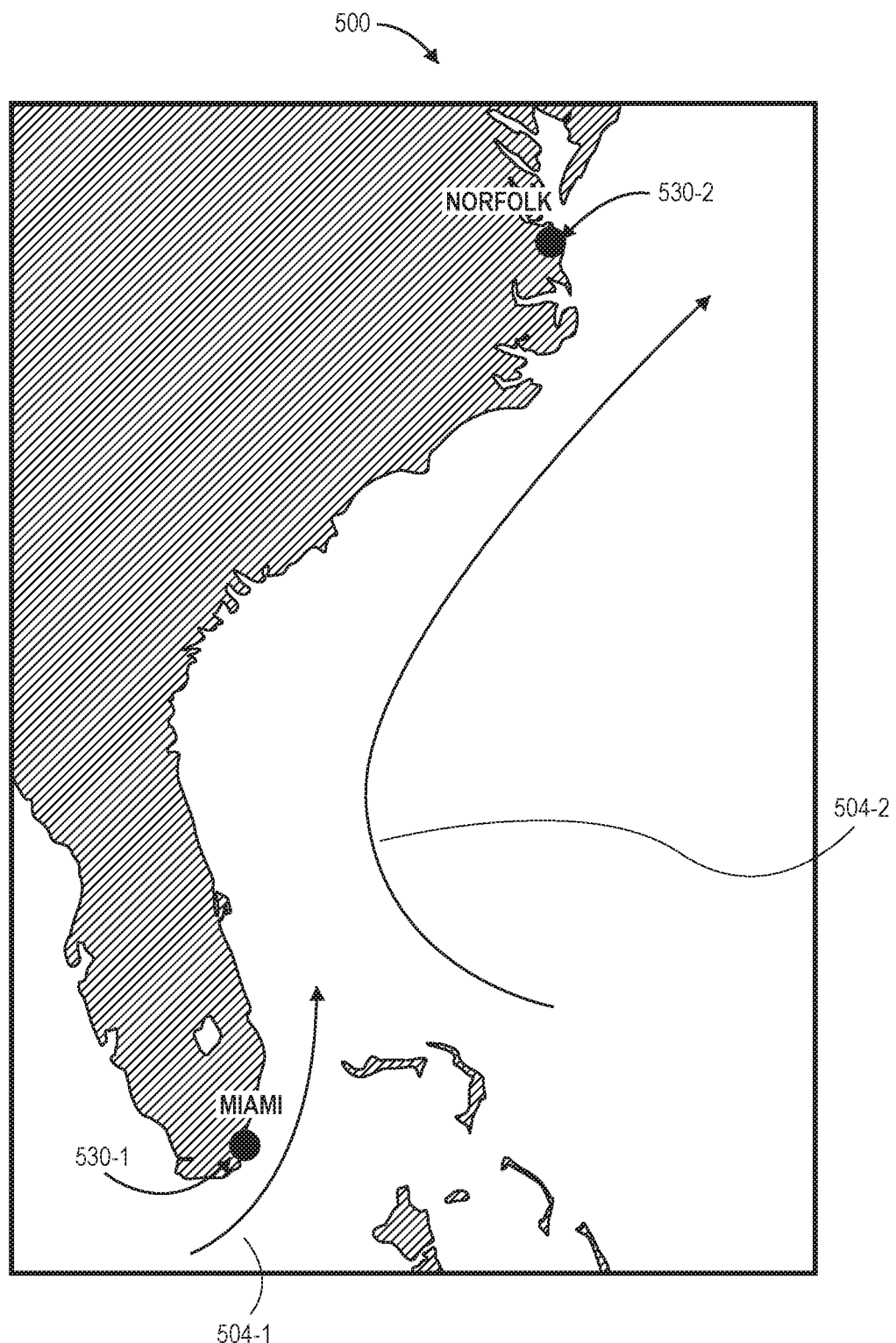

As is shown in FIG. 5A, a pair of ports 530-1, 530-2, including Miami, Fla., 530-1 and Norfolk, Va., 530-2 are shown. Each of the ports 530-1, 530-2 has direct access to an ocean, or an ocean-accessible body of water. Within the ocean, a pair of currents 504-1, 504-2, viz., the Florida current 504-1, and the Gulf Stream current 504-2, are naturally occurring seawater flow paths that pass within a vicinity of the ports 530-1, 530-2.

Figure 5B:
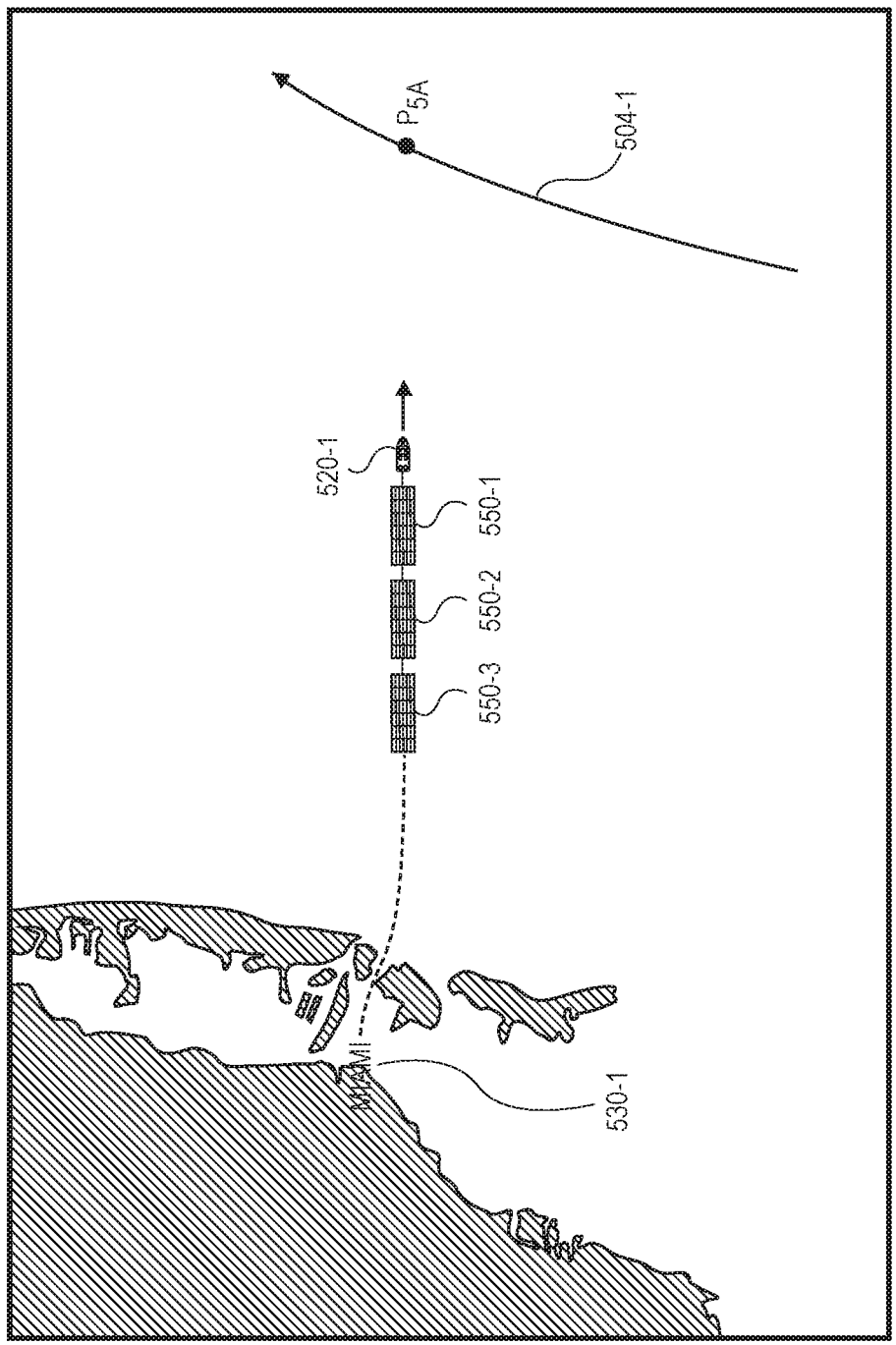

As is shown in FIG. 5B, a support vessel 520-1 engages with a plurality of carrying vessels 550-1, 550-2, 550-3 and departs from the port 530-1, such as by way of the Government Cut or the Norris Cut between Biscayne Bay and the Straits of Florida, toward a disengagement point $P_{5A}$ within the current 504-1. The support vessel 520-1 may engage with the carrying vessels 550-1, 550-2, 550-3 in tension, e.g., by way of a plurality of lines or other connectors joining the support vessel 520-1 to one or more of the carrying vessels 550-1, 550-2, 550-3, or in direct contact with one another. In some embodiments, the carrying vessels 550-1, 550-2, 550-3 may contain the same item, and each of such items may be intended for a common destination. Alternatively, in some embodiments, the carrying vessels 550-1, 550-2, 550-3 may each contain different items, or be intended for different destinations.

Figure 5C:
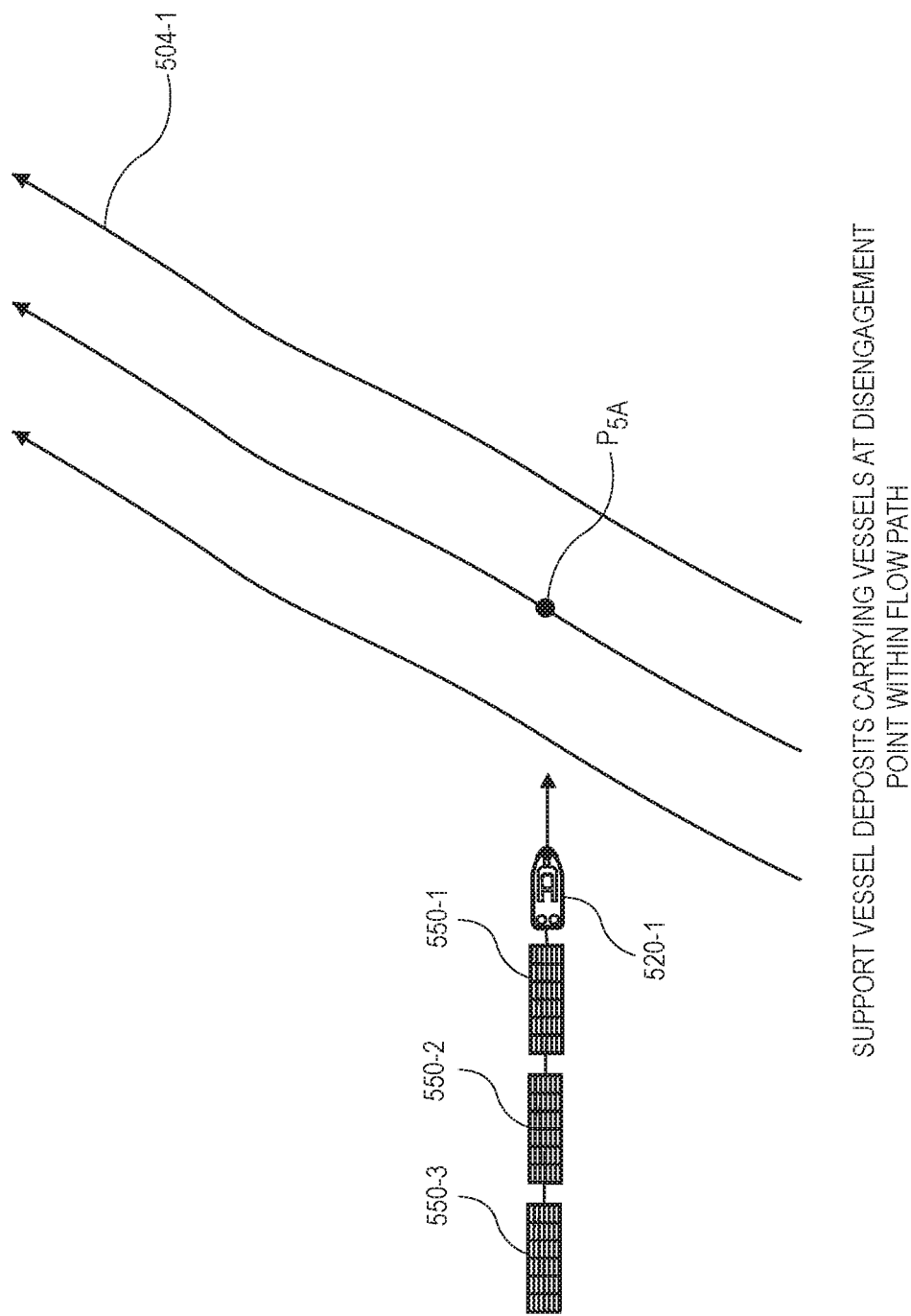
Figure 5D:
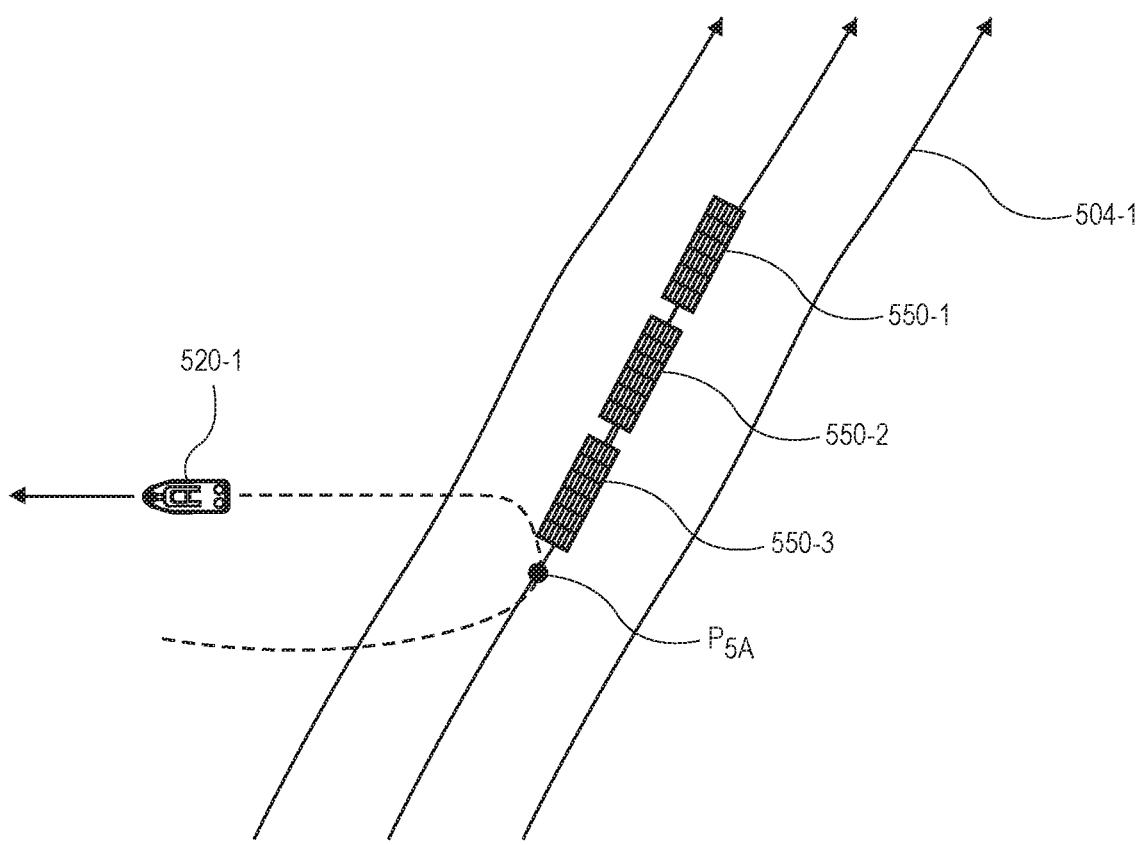

As is shown in FIG. 5C, the support vessel 520-1 and the carrying vessels 550-1, 550-2, 550-3 approach the disengagement point $P_{5A}$. In some embodiments, the support vessel 520-1 may execute any number of maneuvers to align the carrying vessels 550-1, 550-2, 550-3 with a direction of travel of the current 504-1, or to otherwise prepare or position the support vessel 520-1 for disengagement within the current 504-1. As is shown in FIG. 5D, upon disengaging from the carrying vessels 550-1, 550-2, 550-3, the support vessel 520-1 may return to the port 530-1, or travel to another location, as the carrying vessels 550-1, 550-2, 550-3 begin to drift within the current 504-1.

Figure 5E:
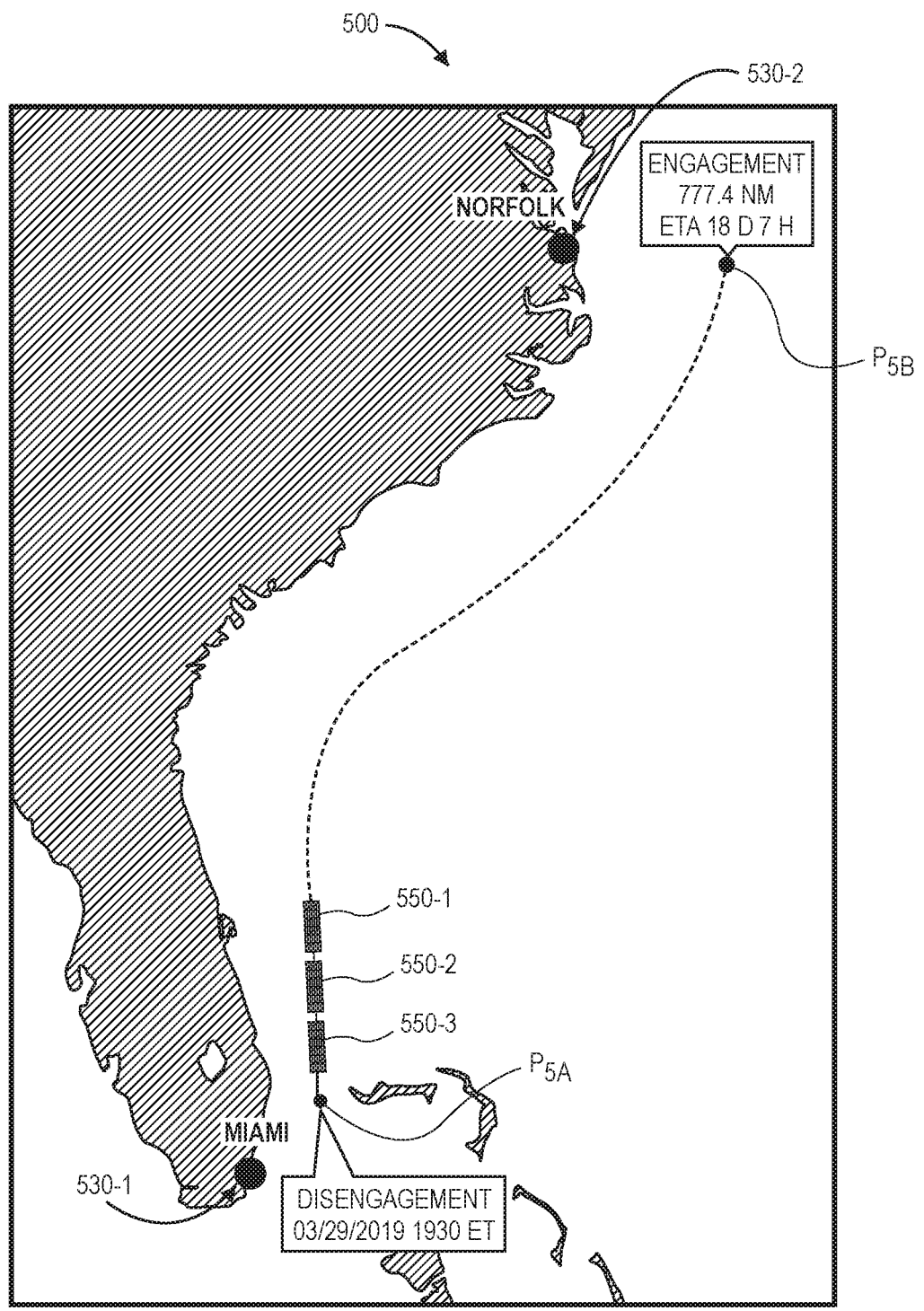

As is shown in FIG. 5E, a time at which the carrying vessels 550-1, 550-2, 550-3 are scheduled to arrive at an engagement point $P_{5B}$ within the current 504-1 that is associated with the port 530-2 may be predicted based on the flow conditions of the currents 504-1, 504-2, as well as any prevailing or anticipated weather conditions between the ports 530-1, 530-2. For example, as is shown in FIG. 5E, a distance to the engagement point $P_{5B}$ may be predicted, and an estimated time of arrival at the engagement point $P_{5B}$, e.g., eighteen days and seven hours, may be determined where the flow rate of the currents 504-1, 504-2 is known or reasonably predictable, e.g., based on aerial imagery, machine learning models, previously observed conditions, or any other factors. In some embodiments, when a carrying vessel or vessels is determined to be ahead of or behind schedule, or to have deviated from a track associated with a naturally occurring aquatic flow path, a time of arrival or a route of the carrying vessel may be updated accordingly. Alternatively, a support vessel may be dispatched to reposition the carrying vessel with respect to a naturally occurring flow path, or into a new natural occurring flow path, as necessary.

Figure 5F:
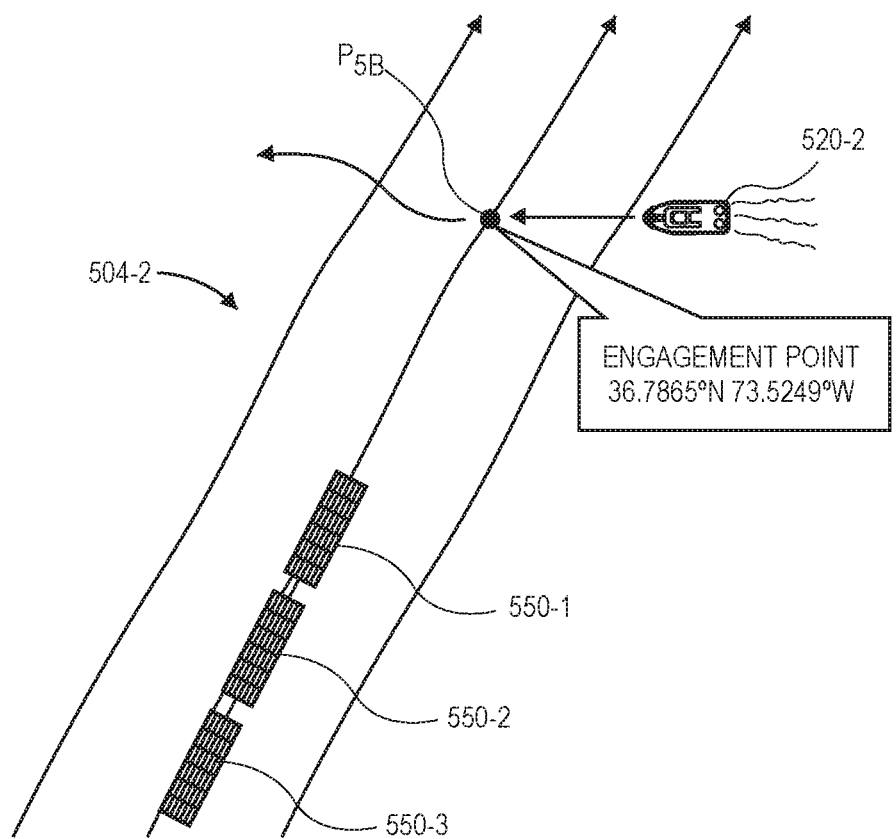
Figure 5G:
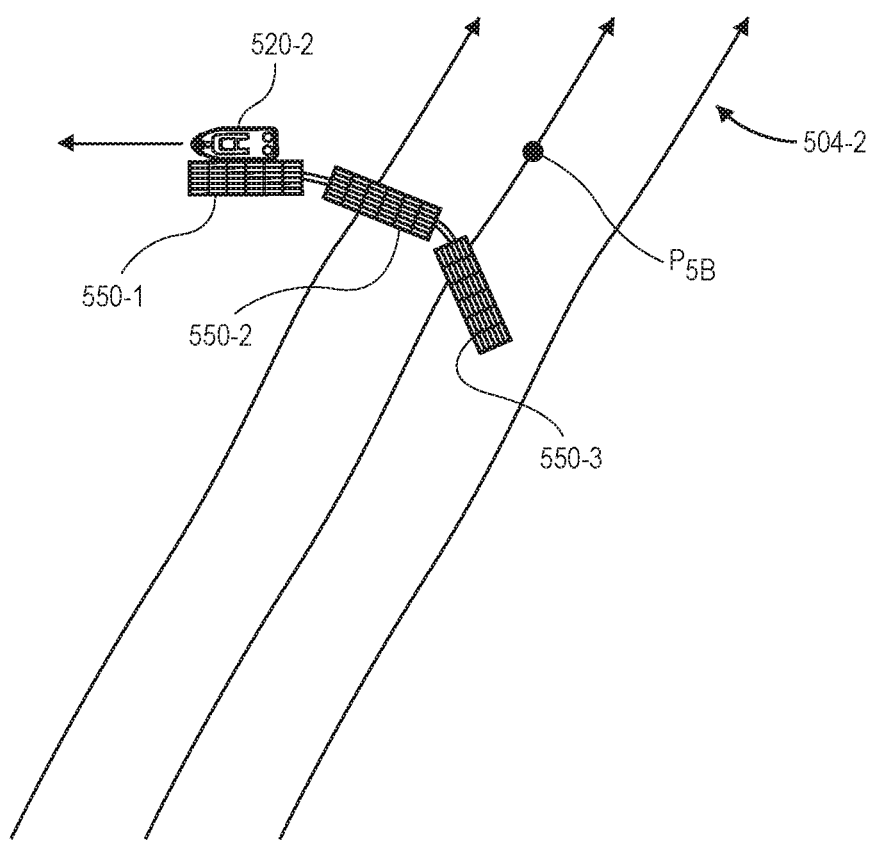

As is shown in FIG. 5F, a support vessel 520-2 is positioned within a vicinity of the engagement point $P_{5B}$. The support vessel 520-2 may be stationed at a land-based location, e.g., the port 530-2, or at any other location with respect to the current 504-2. For example, in some embodiments, the support vessel 520-2 may be a selected one of a plurality of support vessels that is particularly suited to arrive at the engagement point $P_{5B}$ at the same time as the carrying vessels 550-1, 550-2, 550-3, or prior to their arrival. As is shown in FIG. 5G, upon the arrival of the carrying vessels 550-1, 550-2, 550-3 at the engagement point $P_{5B}$, the support vessel 520-2 may engage with one or more of the carrying vessels 550-1, 550-2, 550-3, e.g., by direct contact, or with one or more lines or other connectors. As is shown in FIG. 5H, after engaging with the carrying vessels 550-1, 550-2, 550-3, the support vessel 520-2 departs from the engagement point $P_{5B}$ and begins to transit to the port 530-2.

In addition to transferring a carrying vessel from a port into a naturally occurring aquatic flow path, or transferring a carrying vessel out of a naturally occurring aquatic flow path and to a port, a support vessel may transfer a plurality of carrying vessels from one naturally occurring aquatic flow path to another naturally occurring aquatic flow path. In this regard, a carrying vessel may travel around the Earth on various naturally occurring aquatic flow paths, by transferring the carrying vessel between such flow paths, until the carrying vessel is adjacent or sufficiently near an intended destination. Referring to FIGS. 6A through 6E, views of aspects of one system for ocean-based storage and distribution of items in accordance with embodiments of the present disclosure are shown. Except where otherwise noted, reference numerals preceded by the number "6" in FIGS. 6A through 6E refer to elements that are similar to elements having reference numerals preceded by the number "5" in FIGS. 5A through 5H, by the number "3" in FIGS. 3A through 3F, by the number "2" in FIG. 2A or FIG. 2B or by the number "1" shown in FIGS. 1A through 1L.

As is shown in FIG. 6A, a system 600 includes a carrying vessel 650 in transit on an ocean current 604-1, and a port 630 within a vicinity of an ocean eddy 604-2. For example, the carrying vessel 650 may travel at any flow rates and in directions that are defined naturally by the ocean current 604-1, e.g., subject to any environmental, atmospheric or planetary factors. The current 604-1 flows in a generally southeastern direction, away from the port 630, while the eddy 604-2 flows in a generally northeastern direction, toward the port 630.

As is discussed above, a carrying vessel may be transferred from one naturally occurring aquatic flow path to another naturally occurring aquatic flow path, in order to cause the carrying vessel to travel in a desired direction or according to a desired route. One or more support vessels may intercept the carrying vessel and cause the carrying vessel to be transferred from one naturally occurring aquatic flow path to another. As is shown in FIG. 6B, where one or more of the items that are stored on or being transported by the carrying vessel 650 are desired at the port 630, a support vessel 620 may be used to transfer the carrying vessel 650 from the current 604-1 to the eddy 604-2, which will transport the carrying vessel 650 to a vicinity of the port 630.

Figure 6B:
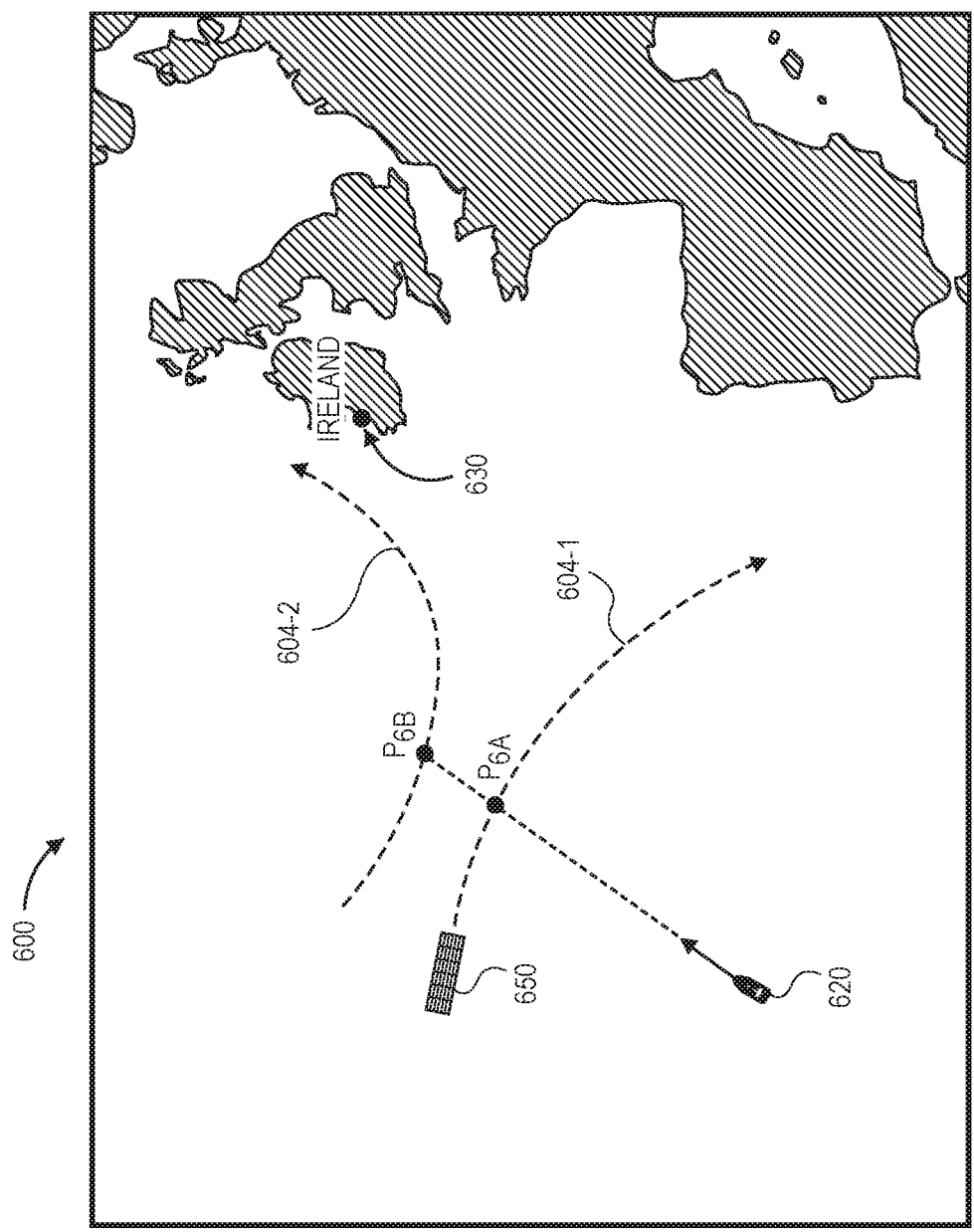

For example, as is shown in FIG. 6B, the support vessel 620 is programmed to proceed to a first intercept point $P_{6A}$ along a path of the carrying vessel 650 within the current 604-1 and to intercept the carrying vessel 650 there. A location of the first intercept point $P_{6A}$ may be selected on any basis, including but not limited to a distance from the support vessel 620 to the first intercept point $P_{6A}$, a flow rate or velocity of the current 604-1 at the first intercept point $P_{6A}$, an estimated time of arrival of the carrying vessel 650 at the first intercept point $P_{6A}$, a distance from the first intercept point $P_{6A}$ to another flow path or other destination, or any other factor. Likewise, the support vessel 620 may be further programmed to proceed from the first intercept point $P_{6A}$ to a second intercept point $P_{6B}$ within the eddy 604-2. A location of the second intercept point $P_{6B}$ may be selected on any basis, including but not limited to a distance from the first intercept point $P_{6A}$ to the second intercept point $P_{6B}$, a flow rate or velocity of the eddy 604-2 at the second intercept point $P_{6B}$, an estimated time of arrival of the carrying vessel 650 at the second intercept point $P_{6B}$, or a distance from the second intercept point $P_{6B}$ to the port 630 or another destination.

Figure 6D:
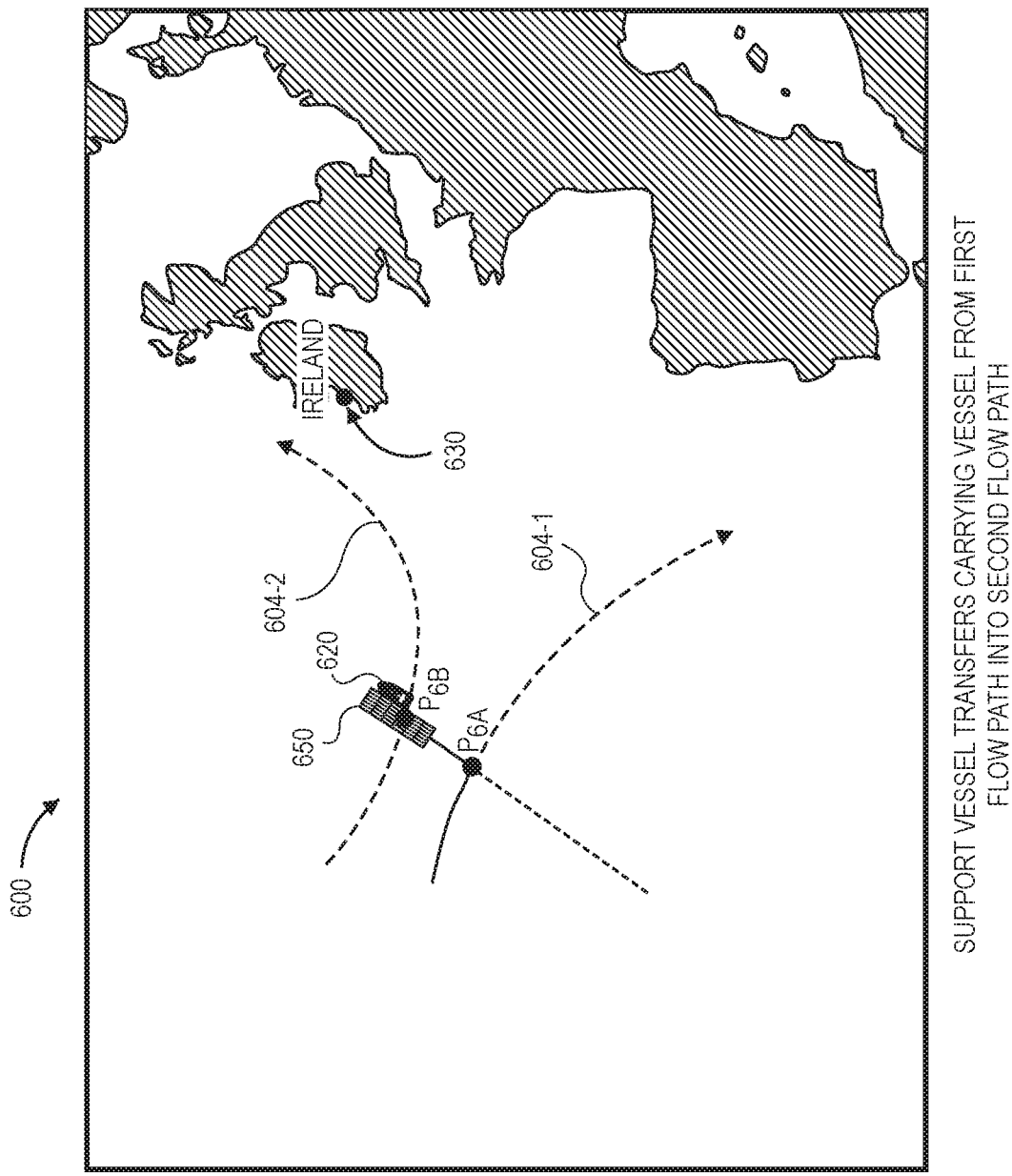
Figure 6E:
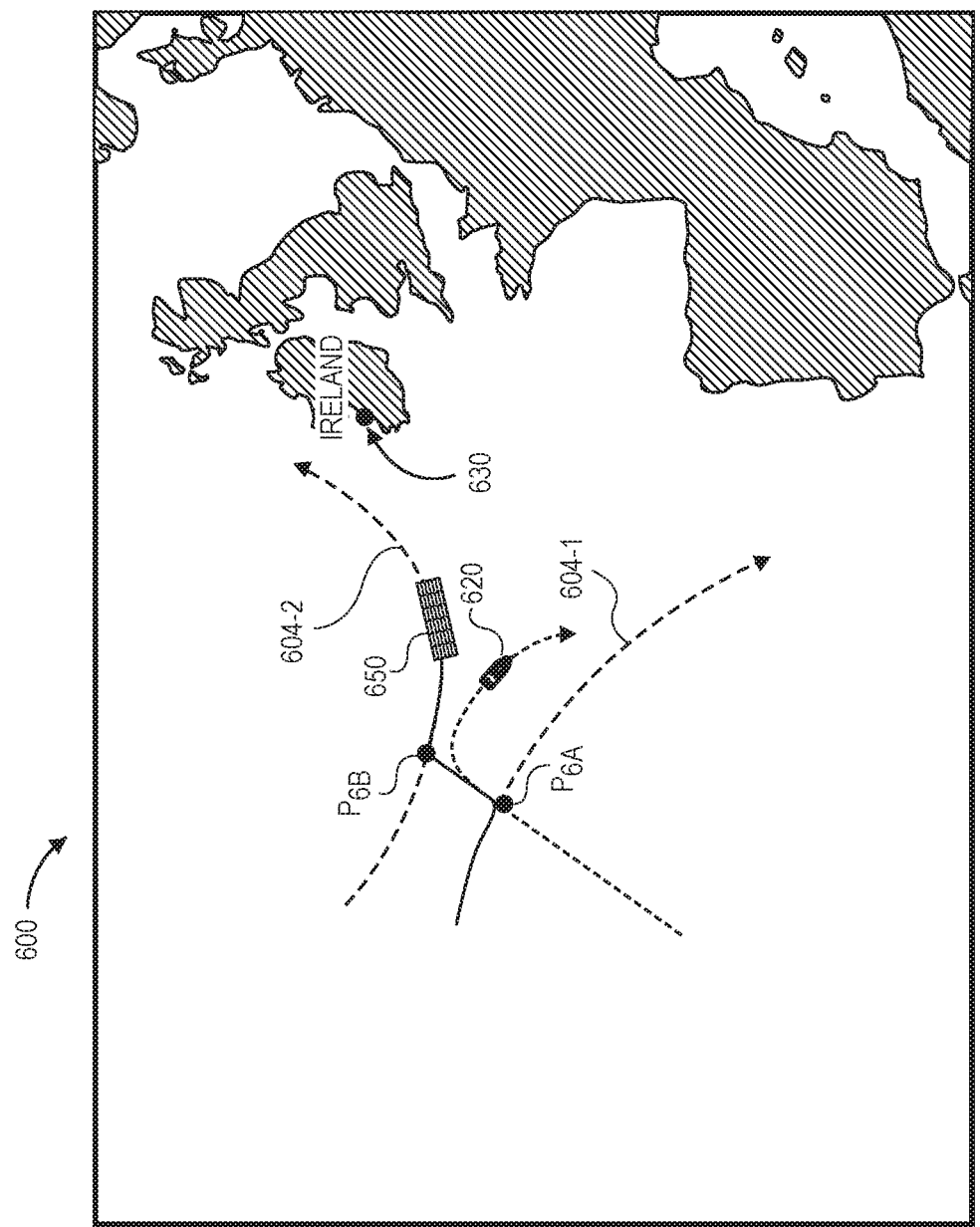

As is shown in FIG. 6C, upon the arrival of the carrying vessel 650 at the first intercept point $P_{6A}$, the support vessel 620 engages with the carrying vessel 650 and transfers the carrying vessel 650 out of the current 604-1. As is shown in FIG. 6D, the support vessel 620 then transports the carrying vessel 650 into the flow of the eddy 604-2 by traveling toward the second intercept point $P_{6B}$. As is shown in FIG. 6E, with the carrying vessel 650 within the eddy 604-2, the support vessel 620 disengages from the carrying vessel 650, and departs from the eddy 604-2. The support vessel 620 then proceeds out of the eddy 604-2, while the carrying vessel 650 is permitted to travel at flow rates and in directions that are defined naturally by the eddy 604-2, e.g., toward the port 630, where another support vessel (not shown) may be stationed and configured to remove the carrying vessel 650 from the eddy 604-2, and to transfer the carrying vessel 650 from the eddy 604-2 to the port 630.

As is discussed above, the carrying vessels of the present disclosure may be outfitted with any number of sensors for capturing information or data while the carrying vessels travel on one or more naturally occurring aquatic flow paths. For example, flow rates and directions of naturally occurring aquatic flows may be determined in any manner and based on any information or data, such as images captured using aerial vehicles or satellites, historically observed flow rates, or any other information or data. In some embodiments, flow rates may be determined using one or more machine learning systems or techniques. For example, where a plurality of carrying vessels or other vessels are traveling along gyres, currents, eddies or other naturally occurring aquatic flows, objective information or data such as positions of such carrying vessels and times associated with such positions, as well as subjective data such as carrying vessel dimensions, net masses of items carried, and others may be determined. Alternatively, a carrying vessel may be outfitted to take bathymetric readings (e.g., bottom soundings) to determine depth below a keel of the carrying vessels, or to capture imaging data from which plant life, aquatic life, or other seagoing vessels may be identified.

Referring to FIGS. 7A through 7E, views of aspects of one system for ocean-based storage and distribution of items in accordance with embodiments of the present disclosure are shown. Except where otherwise noted, reference numerals preceded by the number "7" in FIGS. 7A through 7E refer to elements that are similar to elements having reference numerals preceded by the number "6" in FIGS. 6A through 6E, by the number "5" in FIGS. 5A through 5H, by the number "3" in FIGS. 3A through 3F, by the number "2" in FIG. 2A or FIG. 2B or by the number "1" shown in FIGS. 1A through 1L.

Figure 7A:
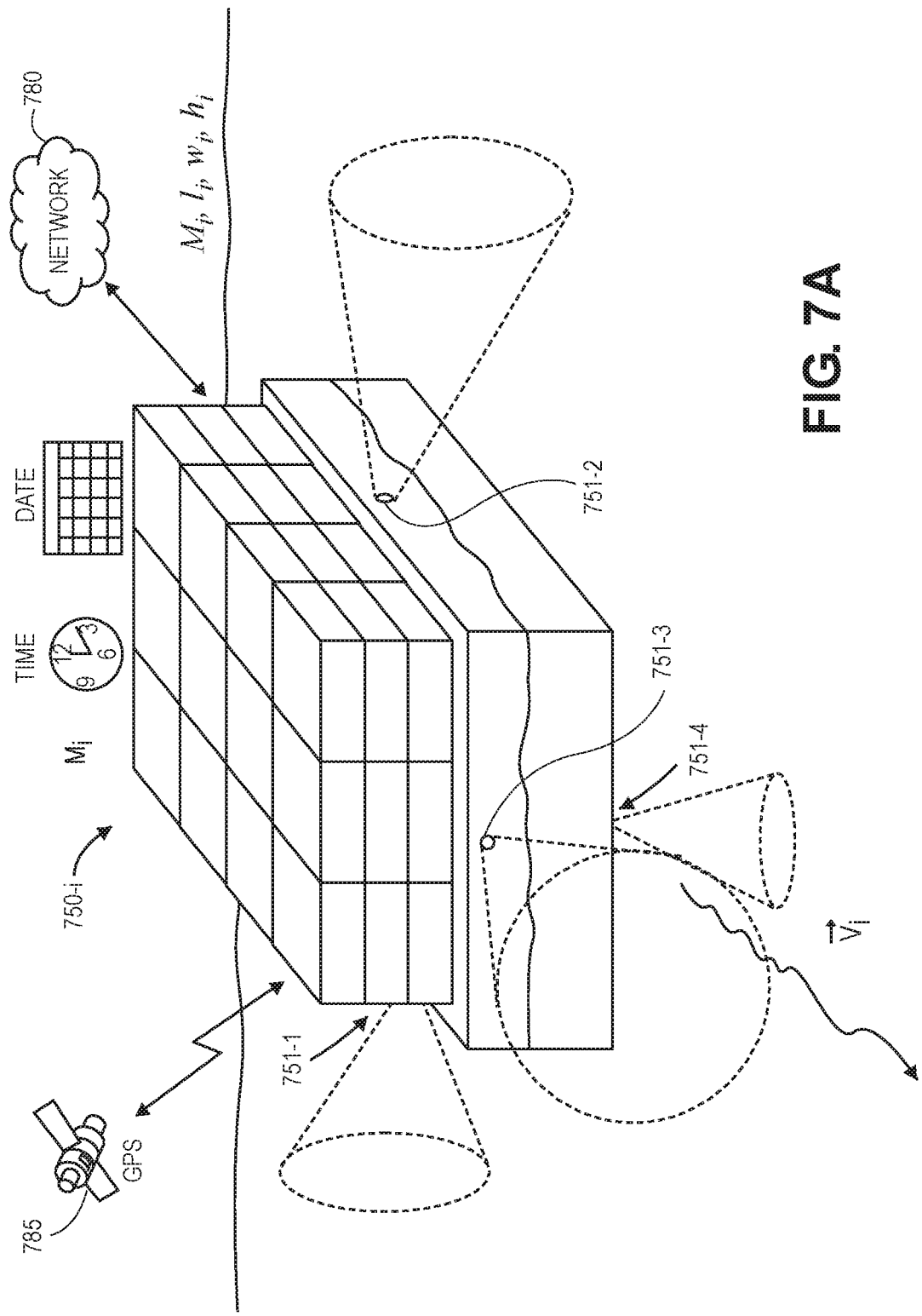
FIGS. 7A through 7E are views of aspects of one system for ocean-based storage and distribution of items in accordance with embodiments of the present disclosure.

As is shown in FIG. 7A, a carrying vessel 750-$i$ having a mass $M_i$, a length $l_i$, a width $w_i$, and a height $h_i$ is shown. The carrying vessel 750-$i$ includes a plurality of imaging devices 751-1, 751-2, 751-3 and a bottom sounder (or echo sounder) 751-4. The carrying vessel 750-$i$ is traveling at a velocity Vi and is configured to receive and interpret signals from one or more GPS satellites 785. The carrying vessel 750-$i$ is further configured to determine a position based on such signals, and report the position, as well as its mass $M_i$, its length $l_i$, its width $w_i$, its height $h_i$ and its velocity $V_i$ on any given date and at any given time to one or more external computer systems, e.g., over a network 780, on a synchronous or asynchronous basis. The carrying vessel 750-$i$ may be configured to capture imaging data, e.g., by the imaging devices 751-1, 751-2, 751-3, and to process such imaging data to recognize any objects (such as plant life, aquatic life, or other vessels). The carrying vessel 750-$i$ may also be configured to determine a sounding, or a measurement of a depth of water below the hull of the carrying vessel 750-$i$, e.g., by the bottom sounder 751-4, as well as water temperatures, wind conditions, wave heights, freeboard distances, angular orientation data, or any other information or data regarding the motion of the carrying vessel 750-$i$ within one or more naturally occurring aquatic flows.

Figure 7B:
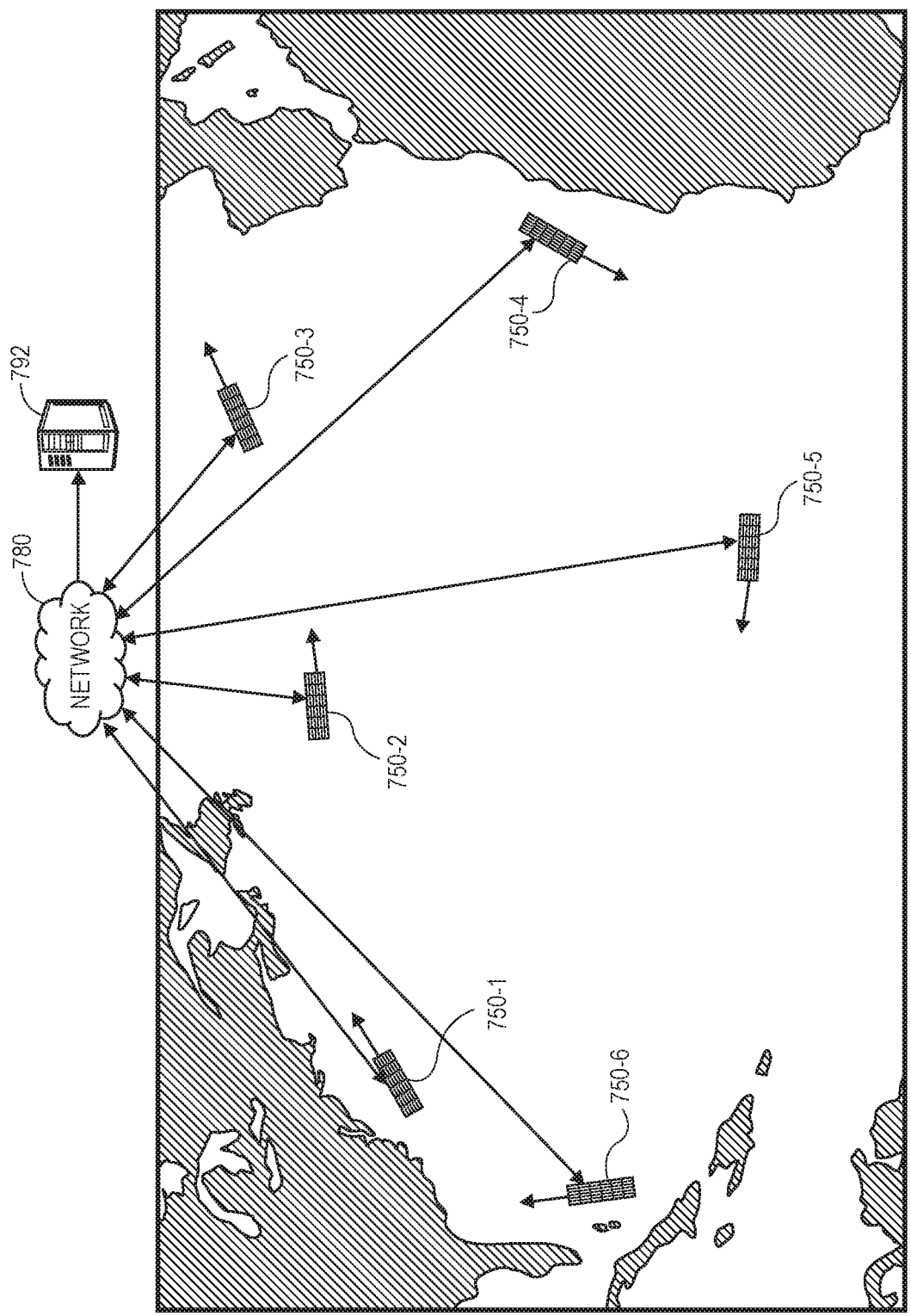

As is shown in FIG. 7B, a plurality of carrying vessels 750-1, 750-2, 750-3, 750-4, 750-5, 750-6 may be configured to transmit information or data regarding their respective operations to a server 792 associated with a vehicle monitoring system or other system over the network 780. In particular, each of the carrying vessels 750-1, 750-2, 750-3, 750-4, 750-5, 750-6 or any support vessels or other vessels (not shown) may be configured to transmit information regarding their respective positions at selected times or on selected dates, as well as any other information or data regarding their operations, including but not limited to their respective dimensions, masses, or velocities, as well as conditions affecting travel on the water, such as soundings, temperatures, wind speeds and directions, wave heights, and other information or data.

Figure 7C:
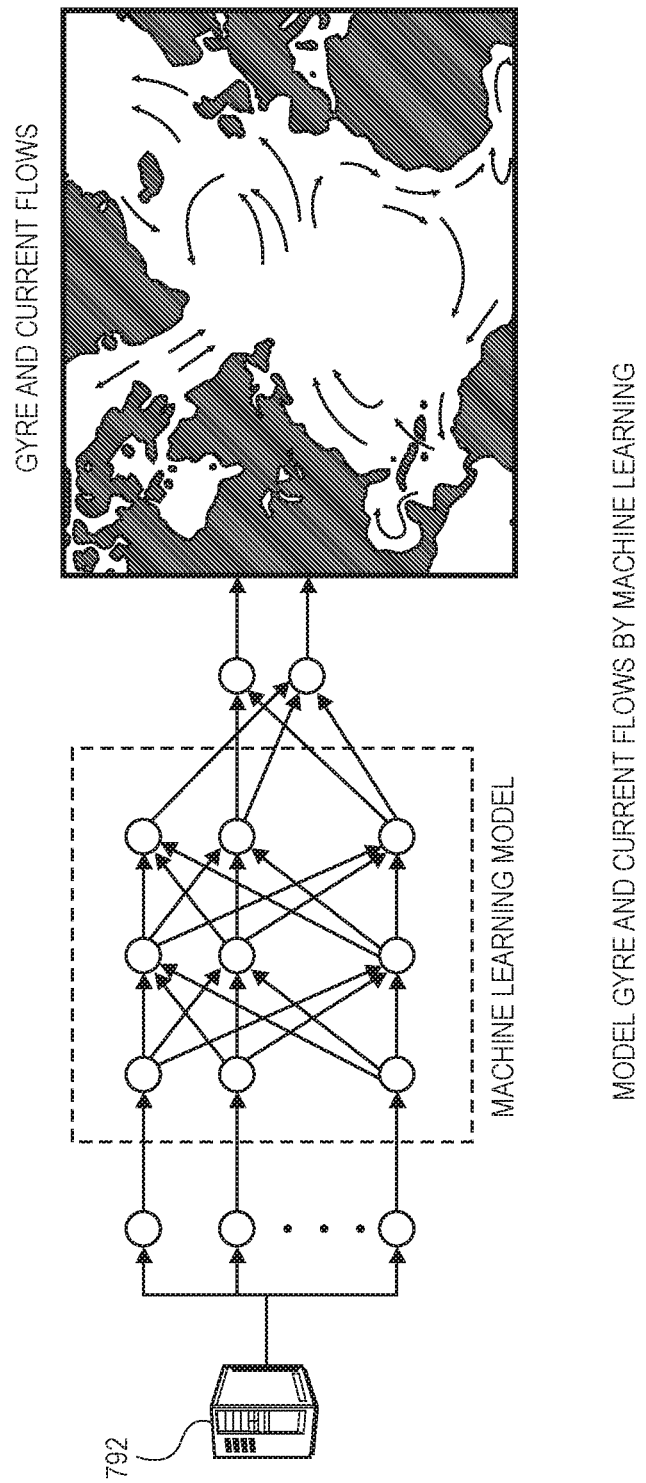

As is shown in FIG. 7C, upon receiving the information or data from the various carrying vessels 750-1, 750-2, 750-3, 750-4, 750-5, 750-6, the server 792 is configured to execute one or more machine learning systems or techniques on such information or data, and to determine flow conditions of one or more gyres or currents, or any other naturally occurring aquatic flow paths, based on outputs received from such systems or techniques. In some embodiments, the machine learning systems or techniques may include one or more artificial neural networks that are trained to map inputted data to desired outputs by adjusting strengths of connections between one or more neurons, which are sometimes called synaptic weights. Such artificial neural networks may have any number of layers, including an input layer, an output layer, and any number of intervening hidden layers. Each of the neurons in a layer within an artificial neural network may receive an input and generate an output in accordance with an activation or energy function, with parameters corresponding to the various strengths or synaptic weights.

In some embodiments, an artificial neural network may be a heterogeneous neural network, and each of the neurons within the network may be understood to have different activation or energy functions. The artificial neural network may be trained by redefining or adjusting strengths or weights of connections between neurons in the various layers of the network, in order to provide an output that most closely approximates or associates with the input to the maximum practicable extent. In some embodiments, an artificial neural network may be characterized as either feedforward neural networks or recurrent neural networks, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

An artificial neural network may be trained in any manner, such as by supervised or unsupervised learning, or by backpropagation, or in any other manner. Once a neural network has been trained to recognize dominant characteristics of an input of a training set, e.g., to associate a point or a set of data such as an image with a label to within an acceptable tolerance, an input in the form of a data point may be provided to the trained network, and a label may be identified based on the output thereof.

Figure 7D:
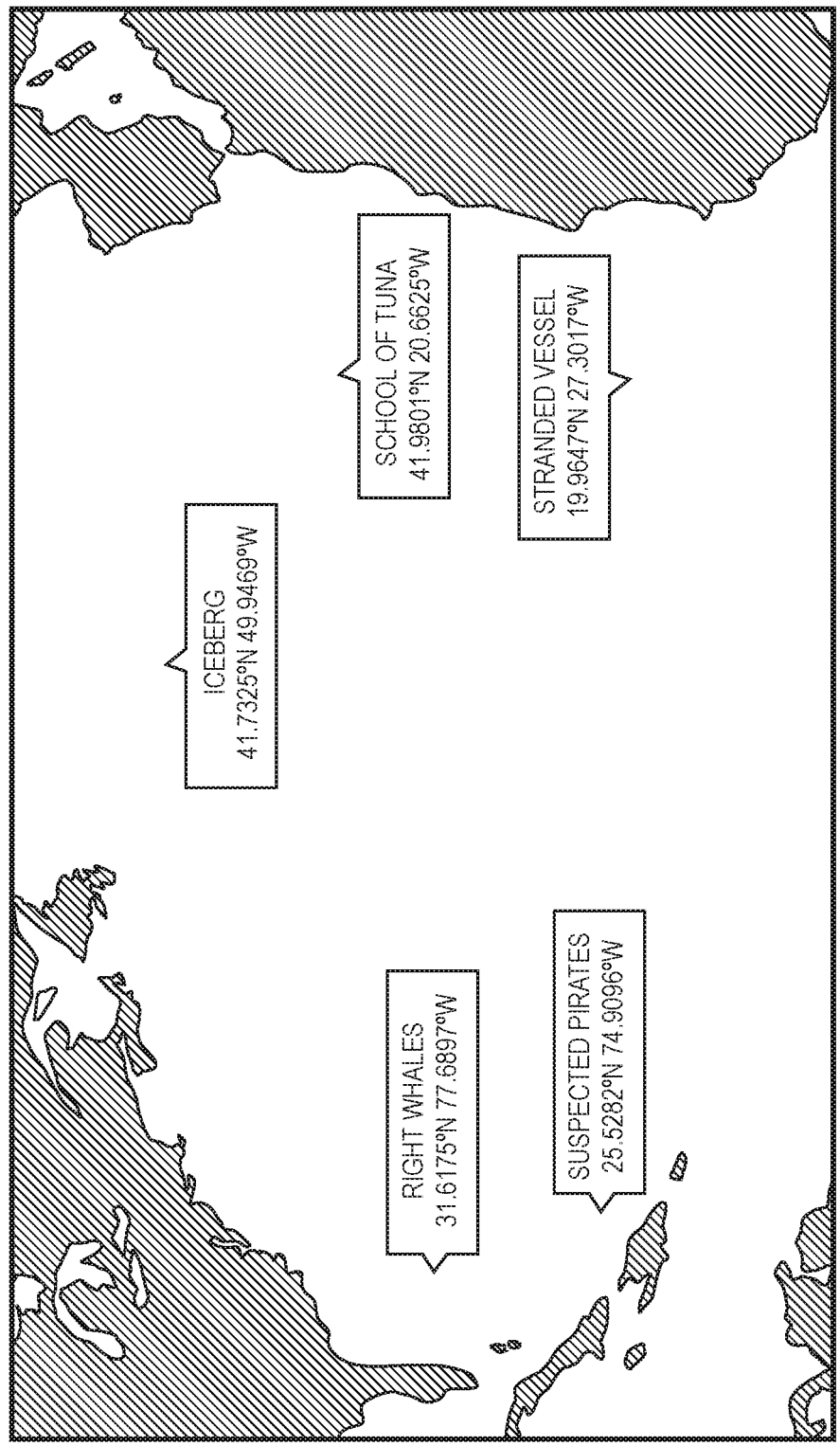

As is shown in FIG. 7D, the carrying vessels 750-1, 750-2, 750-3, 750-4, 750-5, 750-6 or any support vessels or other vessels (not shown) may further report information or data regarding locations of objects observed or otherwise detected in imaging data or other information or data. For example, as is shown in FIG. 7D, one or more of the carrying vessels 750-1, 750-2, 750-3, 750-4, 750-5, 750-6 may report positions of an iceberg, schools of fish, vessels that are stranded or otherwise restricted in their ability to maneuver, illicit activity (e.g., at-sea piracy), or protected animal species. Information regarding positions of such events or circumstances may be used for any purpose, such as collision avoidance, law enforcement, ecological protection, fishing, or any other purpose.

Figure 7E:
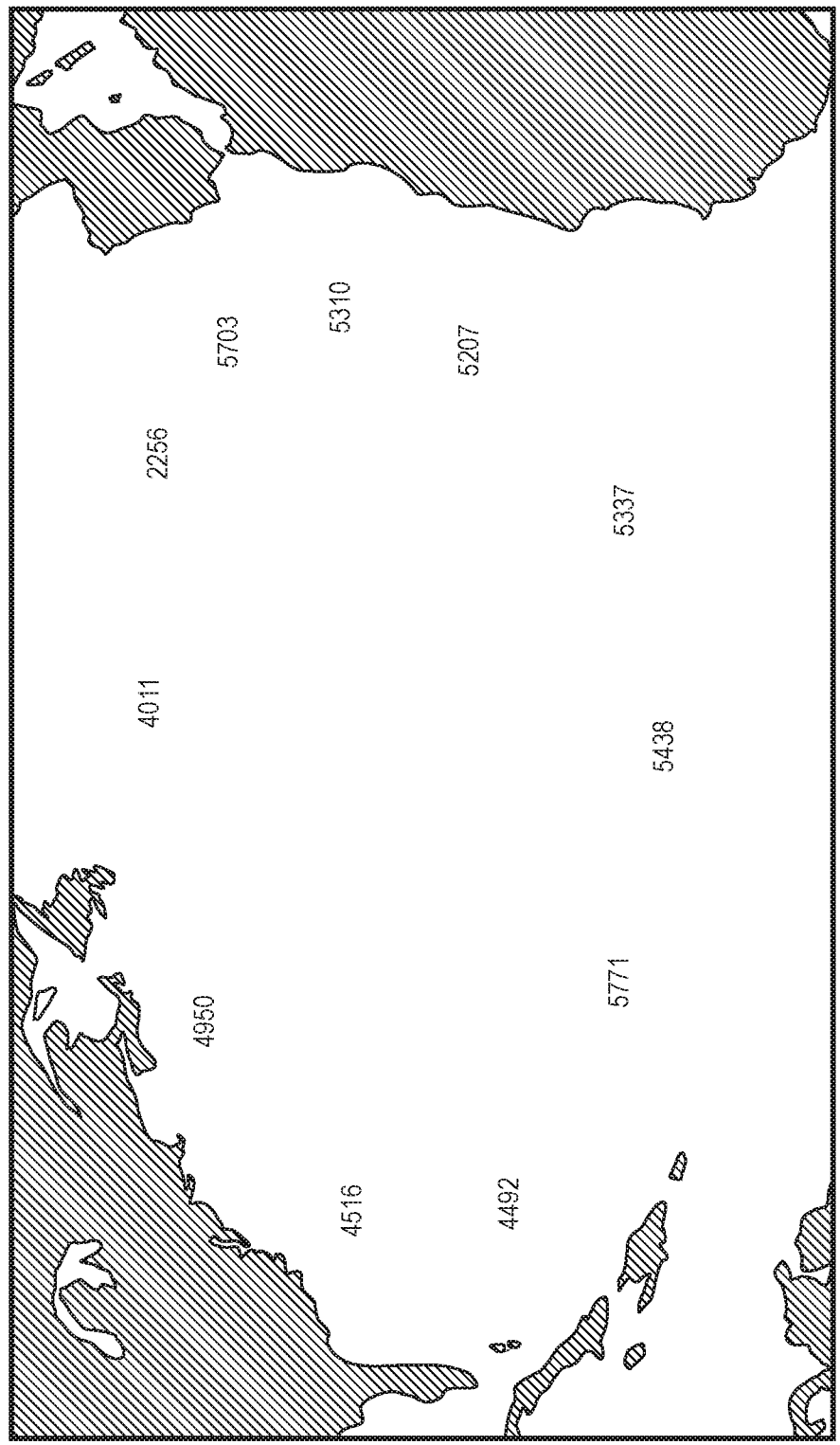

As is shown in FIG. 7E, the carrying vessels 750-1, 750-2, 750-3, 750-4, 750-5, 750-6 may also capture and report bathymetric readings (e.g., bottom soundings) regarding locations within a vicinity of their respective routes on one or more naturally occurring aquatic flow paths. Such bathymetric readings may be used for any purpose, including but not limited to the safe navigation of the oceans by the carrying vessels 750-1, 750-2, 750-3, 750-4, 750-5, 750-6, or any support vessels or any other vessels (not shown).

As is discussed above, where an optimal route including one or more naturally occurring aquatic flow paths is selected for one or more carrying vessels, positions of the carrying vessels may be monitored to determine whether the carrying vessels remain on tracks (e.g., sets of expected positions) associated with such flow paths, or whether the carrying vessels have veered, strayed, drifted or otherwise moved off such tracks. Where a carrying vessel is not located in an expected position, e.g., on an expected track associated with a naturally occurring flow path, a support vessel may be dispatched to retrieve the carrying vessel or otherwise position the carrying vessel within a naturally occurring aquatic flow path. Additionally, a track or other set of positions associated with a naturally occurring aquatic flow path may be adjusted accordingly, or a new route or path may be selected for the carrying vessel.

Figure 8:
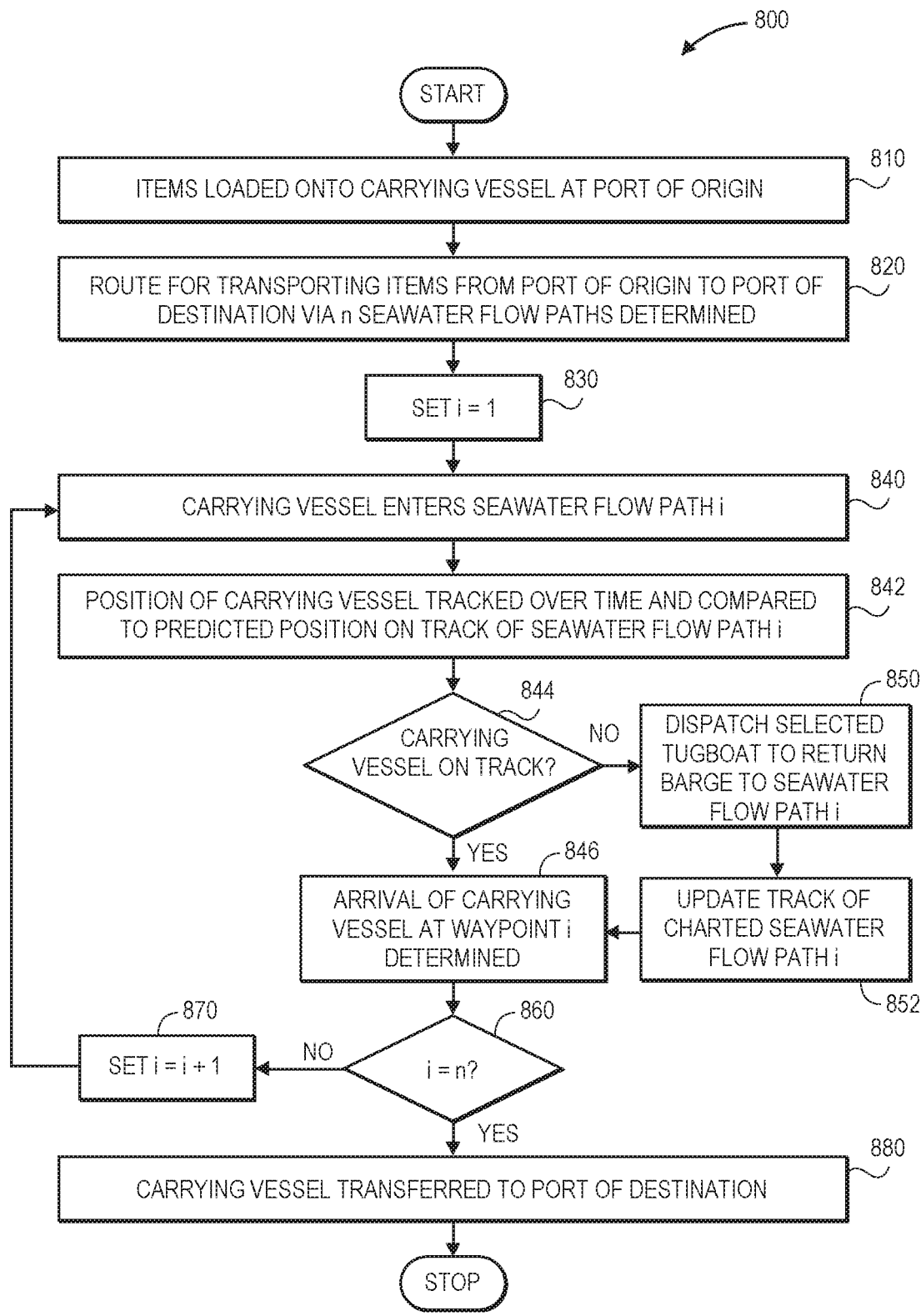
FIG. 8 is a flow chart of one process for ocean-based storage and distribution of items in accordance with embodiments of the present disclosure.

Referring to FIG. 8, a flow chart 800 of one process for ocean-based storage and distribution of items in accordance with embodiments of the present disclosure is shown.

At box 810, items are loaded onto a carrying vessel at a port of origin, and at box 820, a route for transporting the items from the port of origin to a port of destination via n seawater flow paths is determined. The carrying vessel may be any type or form of seagoing vessel that is configured to receive items thereon, and the route may be determined according to any number of optimal route or optimal path techniques, based on timely and relevant information regarding gyres, currents and/or eddies or other seawater flow paths within a vicinity of the port of origin, the port of destination or therebetween.

At box 830, a value of a step variable i is set to equal one, or i=1. At box 840, the carrying vessel enters a seawater flow path i, e.g., by one or more support vessels, which may be selected on any basis, and may engage with the carrying vessel in any manner, such as by any number of lines, chains or any other connections, or by direct contact. At box 842, positions of the carrying vessel are tracked over time and compared to predicted positions on a track of the seawater flow path i. For example, where a speed and a direction of flow are predicted for a gyre, a current or an eddy, a position of a vessel, such as a carrying vessel, within the gyre, the current or the eddy may be predicted by dead reckoning or another technique. An actual position of the vessel may also be determined at a given time, e.g., by one or more sensors, such as a GPS receiver, and compared to the predicted position at that time.

At box 844, whether the carrying vessel is on the track associated with the seawater flow path i is determined. If the carrying vessel is not on the track, then the process advances to box 850, where a support vessel is dispatched to return the carrying vessel to the seawater flow path i. For example, the support vessel may travel to a rendezvous point, or an engagement point, and engage with the carrying vessel by one or more lines, by direct contact, or in any other manner. Alternatively, the support vessel may be dispatched to transfer the carrying vessel into a different seawater flow path, or to return to port with the carrying vessel.

At box 852, the track of the seawater flow path i is updated, e.g., based on the difference between the predicted position of the carrying vessel and the actual position of the carrying vessel. For example, the difference in the respective positions may imply that that actual flow rates of the seawater flow path i are different from previously predicted flow rates, or that actual flow directions are different from previously predicted flow directions, due to any number of temporary or long-term factors.

At box 846, after the carrying vessel is determined to be on the track of the seawater flow path i, or after the carrying vessel has been returned to the track of the seawater flow path i, the arrival of the carrying vessel at a waypoint i is determined. For example, the arrival may be determined using the one or more sensors that tracked the position of the carrying vessel at box 842, or any other sensors.

At box 860, whether the value of i is equal to n, or whether the seawater flow path i is the final flow path of the route determined at box 820, is determined. If the value if i is not equal to n, then the process advances to box 870, where the value of i is incremented by one, or is set to equal i+1, before returning to box 840, where the carrying vessel enters the seawater flow path i. If the value if i is equal to n, such that the seawater flow path i is the final flow path of the route determined at box 820, then the process advances to box 880, where the carrying vessel is transferred to the port of destination, e.g., by one or more support vessels, and the process ends.

As is discussed above, positions of carrying vessels within naturally occurring seawater flow paths may be monitored and, if necessary, the carrying vessels may be repositioned or tracks associated with such flow paths may be adjusted where the carrying vessels are not located in their predicted locations. Referring to FIGS. 9A through 9F, views of aspects of one system for ocean-based storage and distribution of items in accordance with embodiments of the present disclosure are shown. Except where otherwise noted, reference numerals preceded by the number "9" in FIGS. 9A through 9F refer to elements that are similar to elements having reference numerals preceded by the number "7" in FIGS. 7A through 7E, by the number "6" in FIGS. 6A through 6E, by the number "5" in FIGS. 5A through 5H, by the number "3" in FIGS. 3A through 3F, by the number "2" in FIG. 2A or FIG. 2B or by the number "1" shown in FIGS. 1A through 1L.

As is shown in FIG. 9A, a support vessel 920-1 delivers a carrying vessel 950 from a port 930-1, viz., Cape May, N.J., to a flow path 904 within the Atlantic Ocean. As is shown in FIG. 9B, the support vessel 920-1 disengages from the carrying vessel 950 with the carrying vessel 950 within the flow path 904.

Figure 9C:
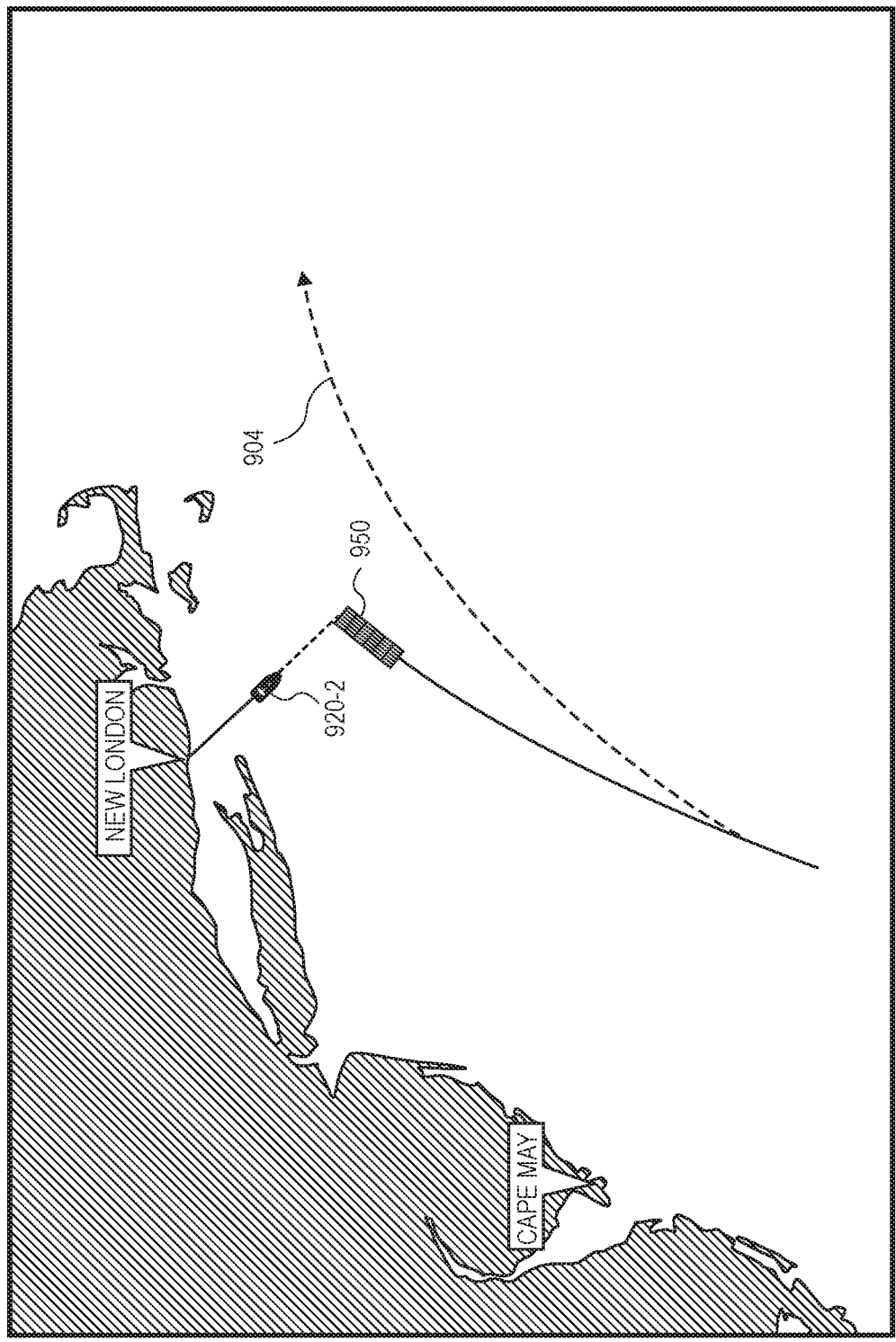

As is shown in FIG. 9C, the carrying vessel 950 deviates from an expected track within the flow path 904, e.g., by veering, drifting or otherwise straying off course, and a support vessel 920-2 is dispatched from another port 930-2, viz., New London, Conn., to rendezvous with the carrying vessel 950. For example, the carrying vessel 950 may have deviated from the expected track for any reason, including but not limited to temporary (e.g., unexpected or seasonal) variations in surface conditions, or due to errors in models or other techniques by which the track of the flow path 904 was determined, or any other reason.

Figure 9E:
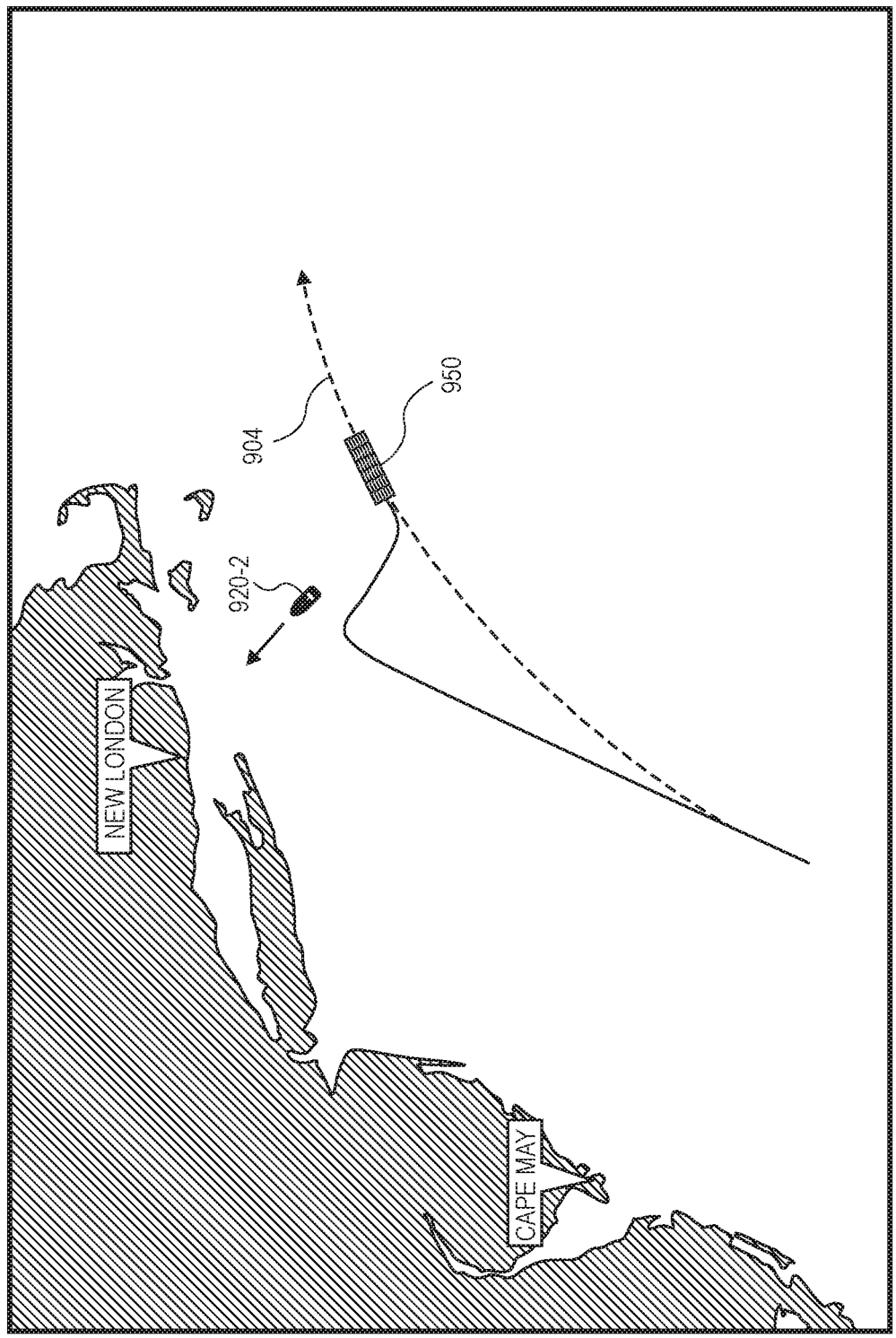

As is shown in FIG. 9D, the support vessel 920-2 repositions the carrying vessel 950 to a location closer to the track of the flow path 904. As is shown in FIG. 9E, the support vessel 920-2 disengages from the carrying vessel 950, with the carrying vessel 950 located along the track of the flow path 904. In some embodiments, the support vessel 920-2 or the carrying vessel 950 may transmit information or data regarding positions at which the support vessel 920-2 engaged with the carrying vessel 950, or disengaged from the carrying vessel 950, to one or more external computer devices or systems, e.g., over a network.

As is shown in FIG. 9F, the track of the flow path 904 may be updated to a new flow path 904' based on the drifting of the carrying vessel 950, and the repositioning of the carrying vessel 950 by the support vessel 920-2.

Figure 10:
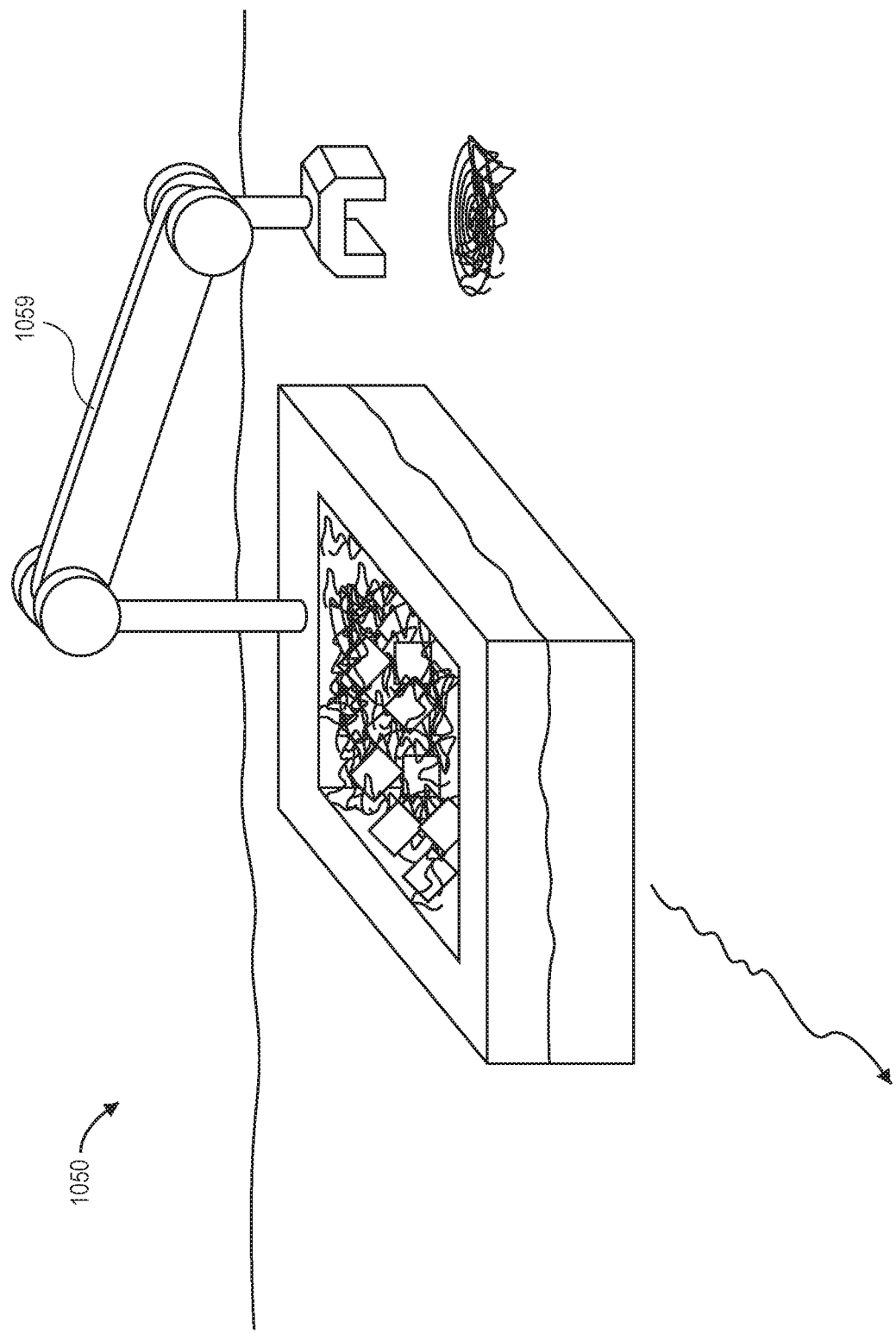
FIG. 10 is a view of aspects of one system for ocean-based storage and distribution of items in accordance with embodiments of the present disclosure.

As is discussed above, one or more carrying vessels of the present disclosure may be configured to remove items from bodies of water, e.g., by one or more engagement systems, as the carrying vessels travel along a naturally occurring flow path or in any other location. Referring to FIG. 10, views of aspects of one system for ocean-based storage and distribution of items in accordance with embodiments of the present disclosure are shown. Except where otherwise noted, reference numerals preceded by the number "10" in FIG. 10 refer to elements that are similar to elements having reference numerals preceded by the number "9" in FIGS. 9A through 9F, by the number "7" in FIGS. 7A through 7E, by the number "6" in FIGS. 6A through 6E, by the number "5" in FIGS. 5A through 5H, by the number "3" in FIGS. 3A through 3F, by the number "2" in FIG. 2A or FIG. 2B or by the number "1" shown in FIGS. 1A through 1L.

As is shown in FIG. 10, a carrying vessel 1050 includes an engagement system 1059, e.g., a robotic arm, having a length or other operating range that is sufficiently long to reach into a body of water on which the carrying vessel 1050 travels. For example, the engagement system 1059 may include one or more controllers, arms, end effectors, joints, drive units, support units or other systems that enable the engagement system 1059 to contact, grasp and raise any number of objects floating within the water, or to deposit such items into one or more storage compartments or cargo bays aboard the carrying vessel 1050. Such objects may include garbage, trash, rubbish or the like that is more appropriately disposed of on land or in other locations. Alternatively, the objects may include plant life, aquatic life, or any other objects that are identified as floating within the body of water in accordance with the present disclosure.

For example, in some embodiments, after a barge or another carrying vessel has delivered one or more items to a port by way of one or more gyres, currents, eddies or other naturally occurring aquatic flow paths, the carrying vessel may be returned to one or more naturally occurring flow paths, and may travel along such flow paths to return to a port from which the barge or the other carrying vessel originated. While traveling along such paths, the barge or other carrying vessel may capture information or data regarding conditions within such flow paths, including but not limited to imaging data, bathymetric readings, or any other data. The carrying vessel may be configured to capture such information or data as a primary function, e.g., where the carrying vessel is not carrying any materials or other items, or as a secondary function, e.g., while the carrying vessel is carrying materials or other items.

As is discussed above, the carrying vessels of the present disclosure may be outfitted with one or more automated fabricators, e.g., 3D printers, or tooling equipment that may be configured to manufacture or otherwise create one or more objects from materials aboard the carrying vessels. Because transportation on gyres, currents, eddies or other naturally occurring aquatic flow paths may take days, weeks or months, depending on the distances traveled, outfitting a carrying vessel with one or more automated fabricators or other tooling equipment enables items to be manufactured from raw materials during substantial lead times prior to the carrying vessel's arrival at one or more intended destinations.

Referring to FIGS. 11A through 11E, views of aspects of one system for ocean-based storage and distribution of items in accordance with embodiments of the present disclosure are shown. Except where otherwise noted, reference numerals preceded by the number "11" in FIGS. 11A through 11E refer to elements that are similar to elements having reference numerals preceded by the number "10" in FIG. 10, by the number "9" in FIGS. 9A through 9F, by the number "7" in FIGS. 7A through 7E, by the number "6" in FIGS. 6A through 6E, by the number "5" in FIGS. 5A through 5H, by the number "3" in FIGS. 3A through 3F, by the number "2" in FIG. 2A or FIG. 2B or by the number "1" shown in FIGS. 1A through 1L.

Figure 11A:
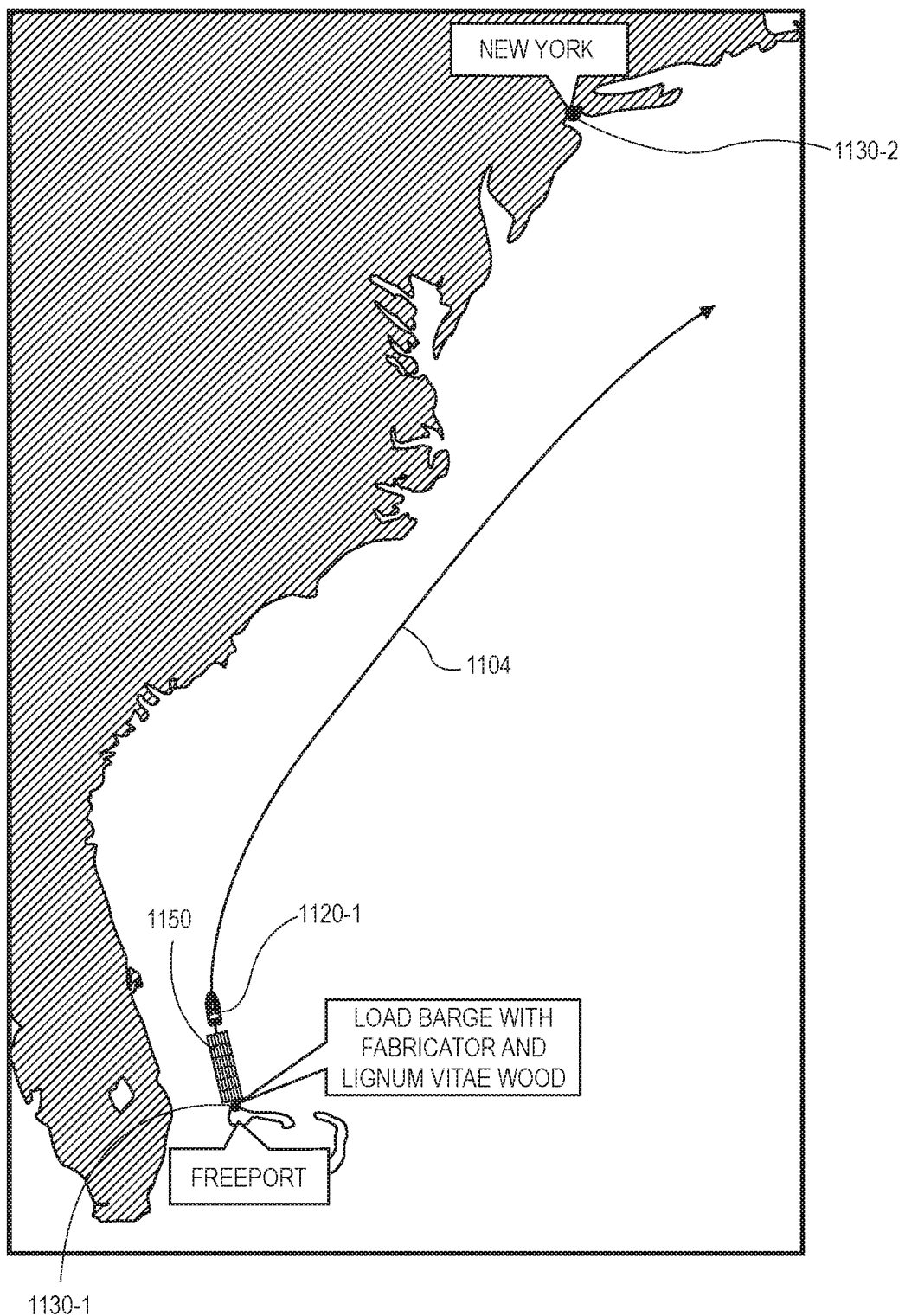

As is shown in FIG. 11A, a barge (or another carrying vessel) 1150 is loaded with an automated fabricator and lignum vitae wood 11-1 at a port 1130-1, viz., Freeport, the Bahamas, near a current 1104, viz., the Gulf Stream. The barge 1150 is towed into the current 1104 by one or more towboats 1120-1 or other support vessels, and is configured for travel to a port 1130-2, viz., New York, N.Y., by way of the current 1104.

Figure 11B:
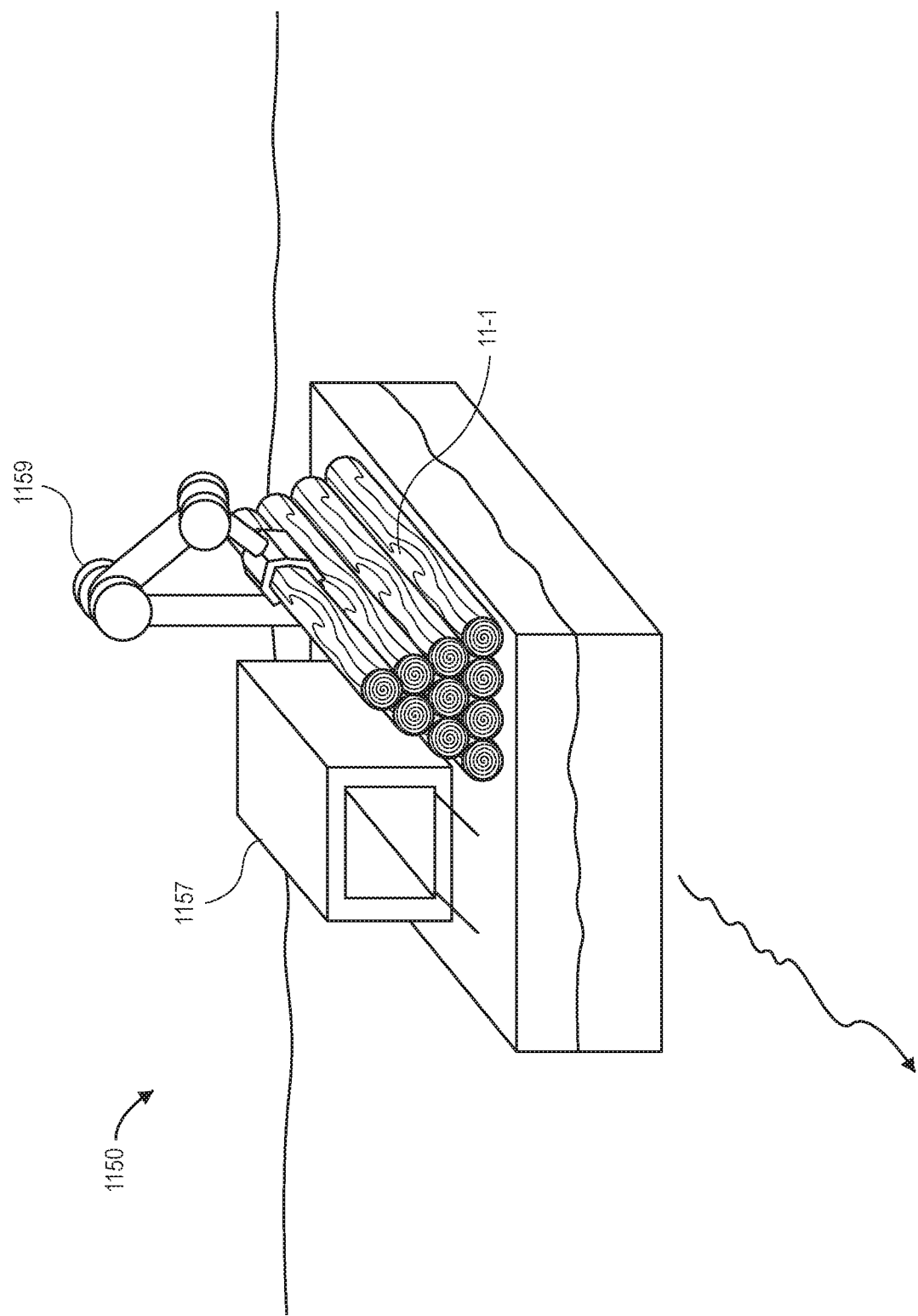
Figure 11C:
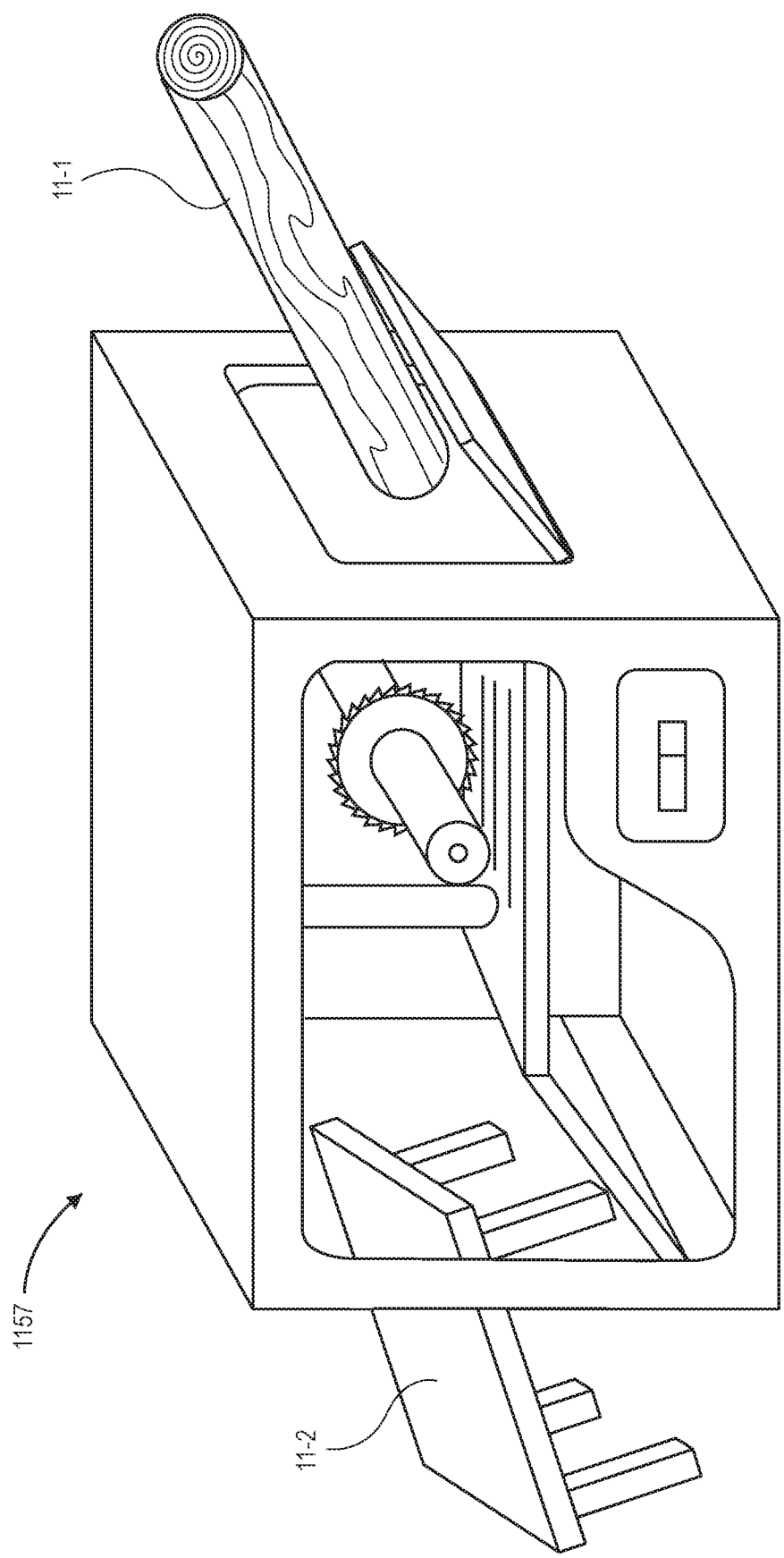

As is shown in FIG. 11B, the barge 1150 further includes an automated fabricator 1157 and an engagement system 1159. The automated fabricator 1157 may be programmed to execute any functions or processes for manufacturing items from the wood 11-1, using one or more filaments, heads, blades, nozzles, motors, rollers, heat sources, radiation sources or other elements. For example, as is shown in FIG. 11C, the automated fabricator 1157 may be programmed to manufacture one or more articles, e.g., furniture 11-2, using the wood 11-1 and any fasteners, paints or stains, or other materials or substances that may also be carried aboard the barge 1150. The engagement system 1159 may include one or more robotic arms for engaging with the wood 11-1, such as to select one or more pieces of the wood 11-1, and to orient or position the wood 11-1 within the automated fabricator 1157 in accordance with one or more operations to be performed therein.

Figure 11D:
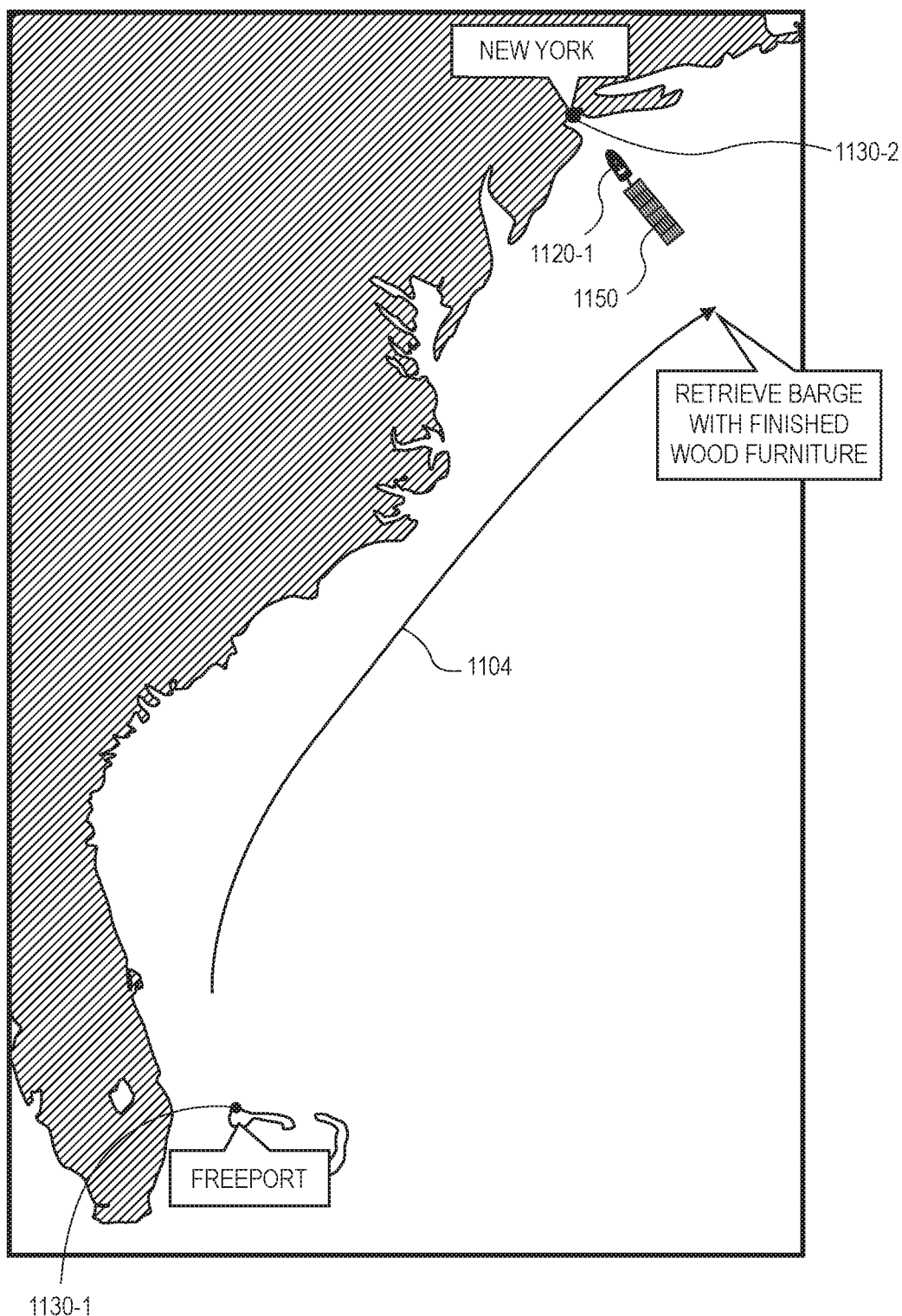
Figure 11E:
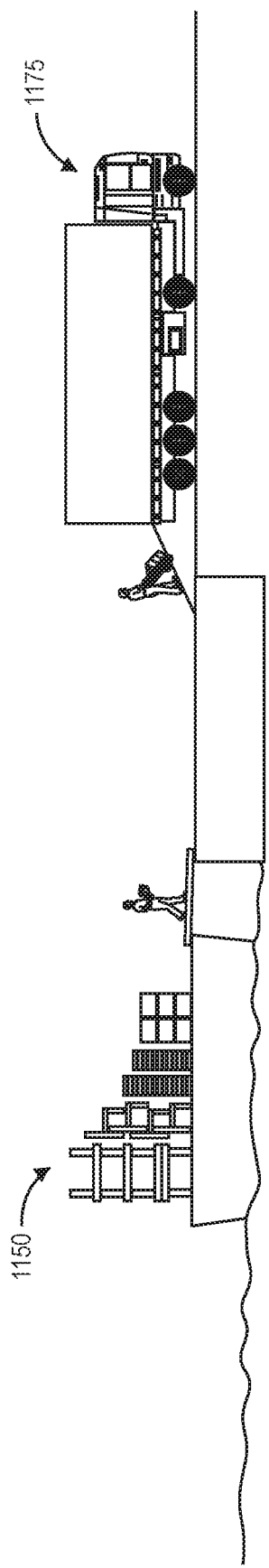

As is shown in FIG. 11D, the barge 1150 is retrieved by one or more towboats 1120-1 or other support vessels within a vicinity of the port 1130-2 after the furniture 11-2 has been manufactured from the wood 11-1. As is shown in FIG. 11E, upon arriving at the port 1130-2, the furniture 11-2 is offloaded from the barge 1150 and transported to one or more destinations, e.g., by a ground vehicle 1175.

As is also discussed above, the carrier vehicles of the present disclosure may be barges or other surface vessels that are configured for travel on surfaces of bodies of water, and also submersibles that are configured for travel below surfaces of the bodies of water, such as where gyres, currents, eddies or other naturally occurring aquatic flow paths reside below such surfaces and may readily transport one or more items underwater, if conditions are more advantageous underwater than on such surfaces. Referring to FIGS. 12A through 12E, views of aspects of one system for ocean-based storage and distribution of items in accordance with embodiments of the present disclosure are shown. Except where otherwise noted, reference numerals preceded by the number "12" in FIGS. 12A through 12E refer to elements that are similar to elements having reference numerals preceded by the number "11" in FIGS. 11A through 11E, by the number "10" in FIG. 10, by the number "9" in FIGS. 9A through 9F, by the number "7" in FIGS. 7A through 7E, by the number "6" in FIGS. 6A through 6E, by the number "5" in FIGS. 5A through 5H, by the number "3" in FIGS. 3A through 3F, by the number "2" in FIG. 2A or FIG. 2B or by the number "1" shown in FIGS. 1A through 1L.

Figure 12A:
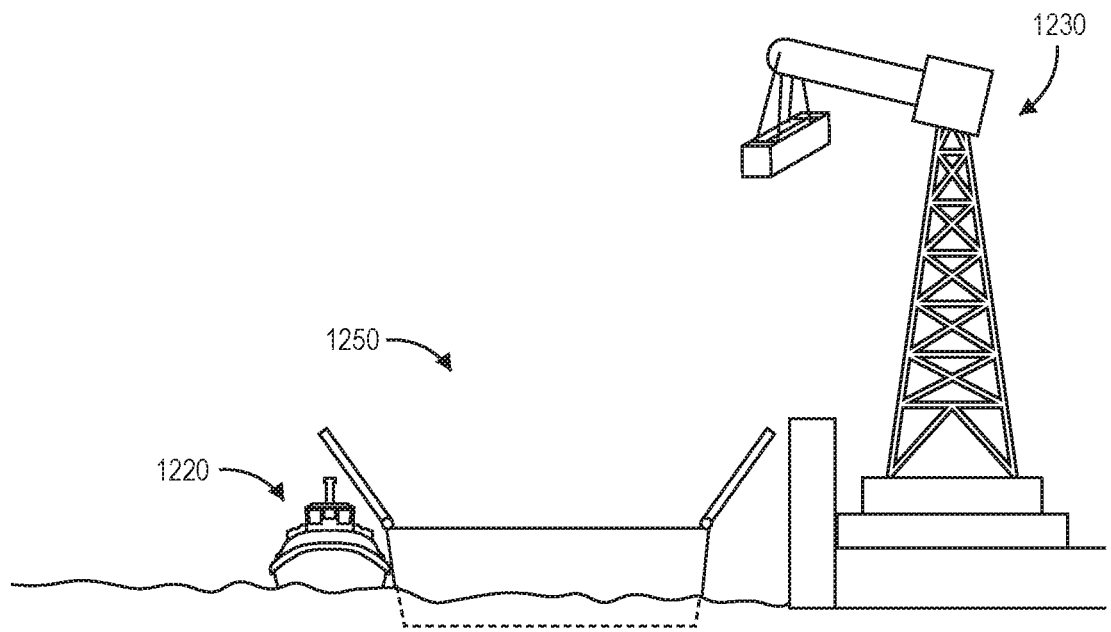
FIGS. 12A through 12E are views of aspects of one system for ocean-based storage and distribution of items in accordance with embodiments of the present disclosure.

As is shown in FIG. 12A, views of aspects of one system for ocean-based storage and distribution of items in accordance with embodiments of the present disclosure are shown. As is shown in FIG. 12A, a support vessel 1220 (e.g., a towboat, a tugboat, a pusher or a puller) is aligned alongside a carrying vessel 1250 at a port 1230. The support vessel 1220 may be any manned or autonomous seagoing vessels that are sufficiently capable of pulling or pushing other vessels, such as the carrying vessel 1250, while traveling on or below the surfaces of the Earth's oceans or other bodies of water. The port 1230 may include any number of systems for loading items onto, or providing services to, the support vessel 1220 or the carrying vessel 1250, and may be associated with a fulfillment center, a warehouse, or any other like facility.

The carrying vessel 1250 may be any seagoing vessel that is configured to travel on or below surfaces of one or more bodies of water, and to carry one or more items therein. In some embodiments, the carrying vessel 1250 may be a submersible having a hull resistant to pressures that may be anticipated at any depth within which the carrying vessel 1250 is expected to operate, along with one or more ballast tanks that may be filled with water or emptied, as necessary, to increase or decrease a weight of the carrying vessel 1250 accordingly. The carrying vessel 1250 may further include, within the hull, any number of trusses, stanchions or bulkheads, as well as any number of decks, cargo bays or other storage compartments for receiving and storing items therein, or distributing items therefrom. The carrying vessel 1250 may further include any releasably sealable hatches that may be operated to open or close the hull, as necessary, to receive items therein or to remove items therefrom, and to ensure that the hull may withstand pressures on or below a surface of water.

Figure 12B:
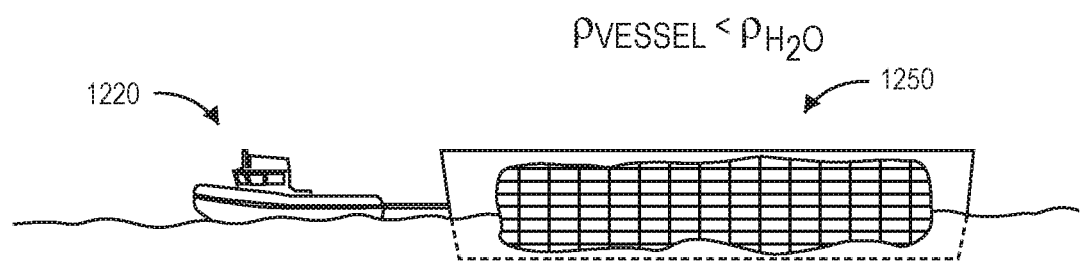

As is shown in FIG. 12B, after loading the carrying vessel 1250 with items and sealing the hatches, the support vessel 1220 transports the carrying vessel 1250 from the port 1230 to a sufficiently deep portion of a body of water, such as where one or more naturally occurring flow paths are known or believed to exist below a surface of the body of water. As is further shown in FIG. 12B, with a density $\rho_{VESSEL}$ of the carrying vessel 1250 less than a density $\rho_{H2O}$ of water, the carrying vessel 1250 will float on the surface of the water.

Figure 12C:
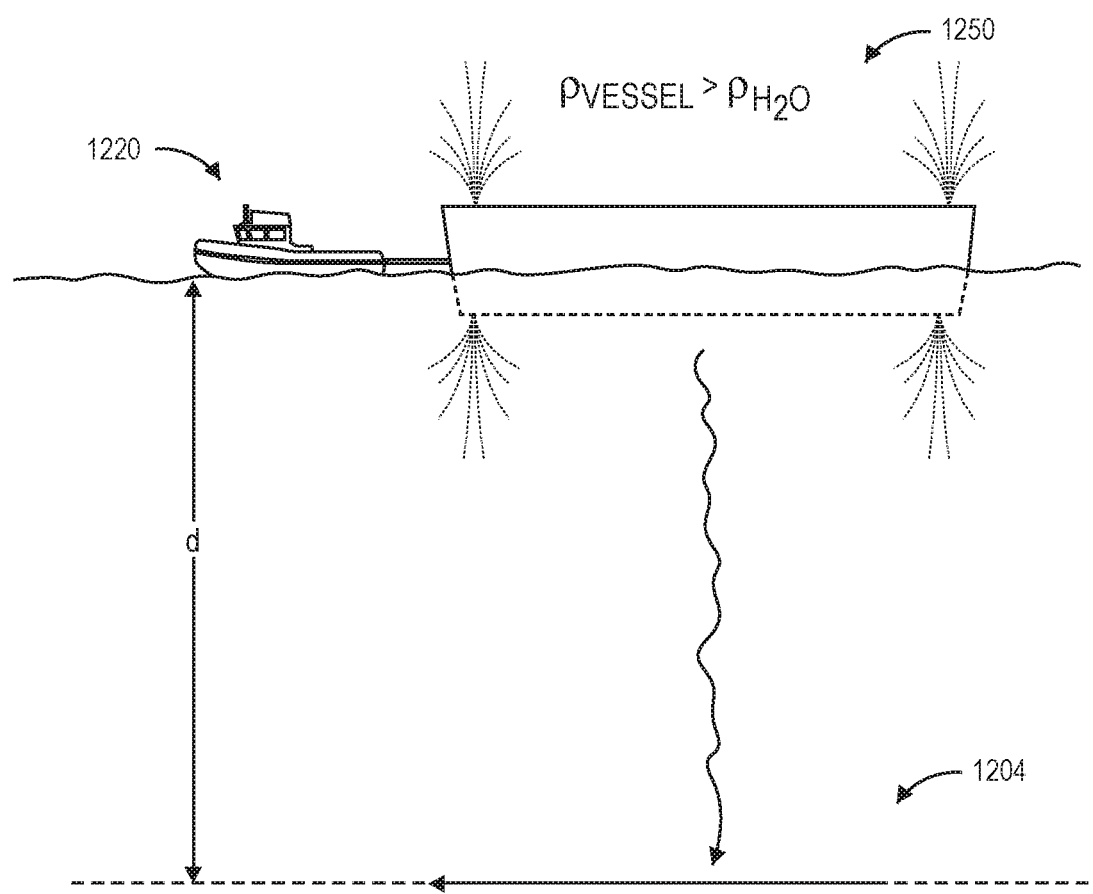
Figure 12D:
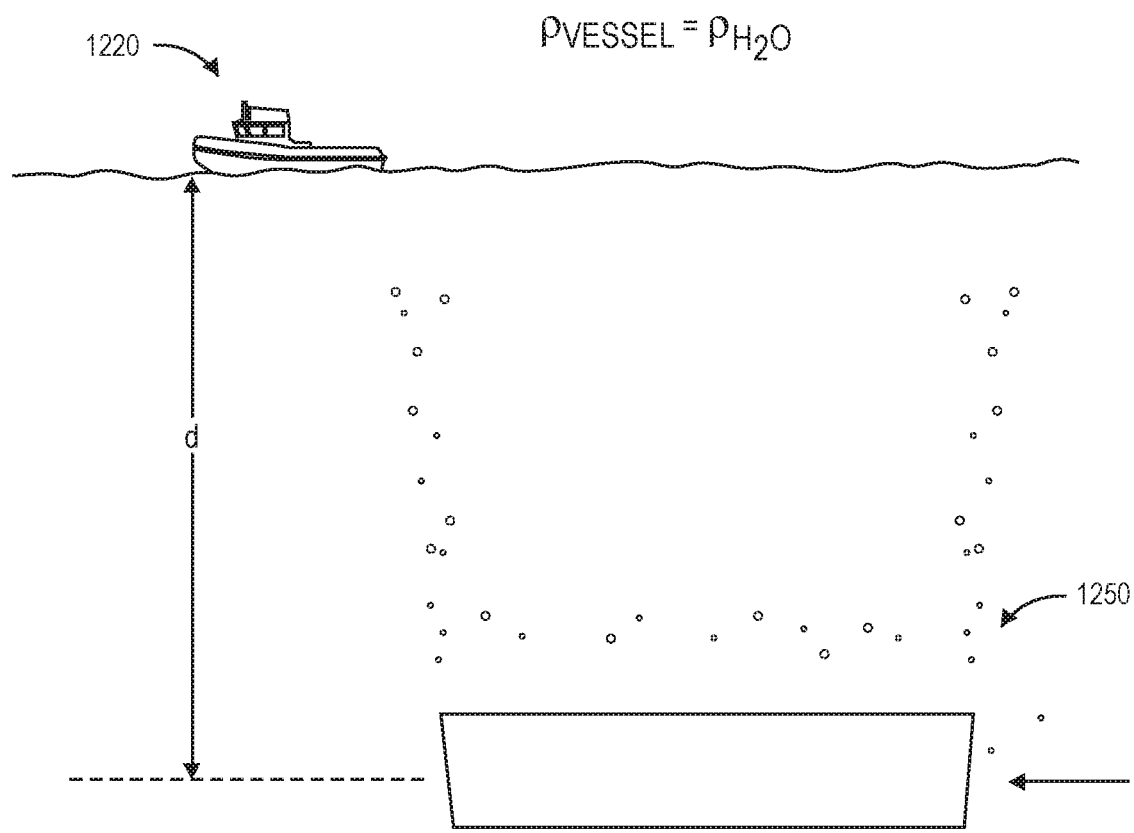
Figure 12E:
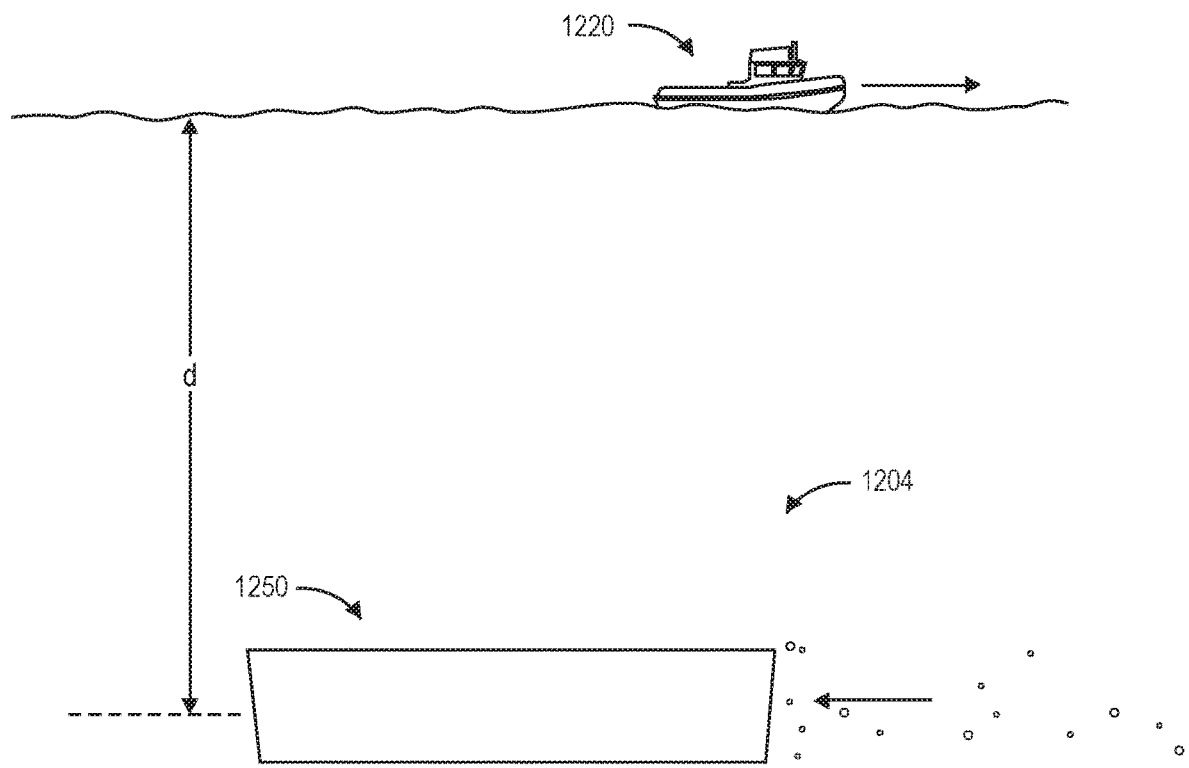

As is shown in FIG. 12C, upon arriving at a location above a naturally occurring aquatic flow path 1204 at a depth d below the surface, the carrying vessel 1250 may open one or more ballast tank valves to release air pressure from ballast tanks, and to receive water therein, thereby increasing the mass of the carrying vessel 1250 until the density $\rho_{VESSEL}$ of the carrying vessel 1250 exceeds the density $\rho_{H2O}$ of water, and the carrying vessel 1250 begins to descend. As is shown in FIG. 12D, when the carrying vessel 1250 reaches the depth d of the naturally occurring aquatic flow path 1204, water may be discharged from the carrying vessel 1250 until the density $\rho_{VESSEL}$ of the carrying vessel 1250 substantially equals the density $\rho_{H2O}$ of water, such that the carrying vessel 1250 is neutrally buoyant. As is shown in FIG. 12E, with the carrying vessel 1250 neutrally buoyant, the carrying vessel 1250 flows along with the naturally occurring aquatic flow path 1204. Upon arriving at a rendezvous point, e.g., with a support vessel (not shown) awaiting on a surface above, the carrying vessel 1250 may pump or blow water from the ballast tanks, thereby causing the density $\rho_{VESSEL}$ of the carrying vessel 1250 to fall below the density $\rho_{H2O}$ of water. When the carrying vessel 1250 rises to a surface of the water, the support vessel may engage with the carrying vessel 1250, and transfer the carrying vessel 1250 to a port, to a location of another naturally occurring aquatic flow path, or to any other location.

Although some of the embodiments of the present disclosure described herein depict the use of carrying vessels or other seagoing vessels in the distribution or forward-deployment of inventory of items that are made available to customers through online marketplaces, those of ordinary skill in the pertinent arts will recognize that the systems and methods of the present disclosure are not so limited. Rather, carrying vessels or other seagoing vessels may be used to distribute or forward-deploy inventory that may be made available through traditional commercial channels, e.g., by telephone or in one or more bricks-and-mortar stores, and delivered to customers or designated locations rapidly in response to orders for such items. Moreover, although some of the embodiments of the present disclosure depict carrying vessels of standard sizes, shapes or capacities, those of ordinary skill in the pertinent arts will recognize that the systems and methods of the present disclosure are not so limited. Rather, autonomous vehicles may be of any size, shape or capacity, and may be configured or outfitted with features that enable the distribution, delivery, retrieval or manufacture of items of any type or kind, and of any size or shape, in accordance with the present disclosure.

Moreover, although some embodiments of the present disclosure reference the storage and distribution of discretized items aboard carrying vessels at sea, those of ordinary skill in the pertinent arts will recognize that the carrying vessels disclosed herein may be used to store and/or distribute not only discretized items but also non-discretized items, goods, commodities, ores or any other substances or materials in accordance with the present disclosure.

Although some embodiments of the present disclosure show the distribution or forward deployment of items to one or more locations based on known, observed or predicted demand using carrying vessels or like vessels, the systems and methods of the present disclosure are not so limited. Rather, the systems and methods of the present disclosure may be utilized in any environment where the improved distribution of items is desired.

Furthermore, although some embodiments of the present disclosure show the distribution and storage of items via the Earth's oceans, those of ordinary skill in the pertinent arts will recognize that such systems and methods are not so limited. For example, one or more of the embodiments disclosed herein may be operated in connection with carrying vessels or other vessels traveling on not only seawater but also freshwater, e.g., rivers, lakes, streams or ponds, such as where flow rates or directions of paths of the freshwater are known. In particular, one or more of the embodiments disclosed herein may be utilized in connection with a river or other body of water that empties into an ocean or other body of water. For example, a route for transporting items from a fulfillment center or other source that is located at or near a river having a known flow path may include the river, at least in part, as well as one or more gyres, currents or eddies of an ocean into which the river empties. One or more items that are placed onto a carrying vessel at the source on the river may be transported throughout the world, where the carrying vessel is configured to travel along the known flow path of the river and into an ocean having gyres, currents or eddies with known flow rates.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 8, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A a method comprising:
    loading a plurality of items onto a first barge at a first port having access to an ocean, wherein the first barge is one of a plurality of barges of a distribution system;
    selecting a first location within the ocean, wherein the first location is located within a vicinity of the first port, and wherein the first location is within a flow path of a first current of the ocean;
    transporting, by a first support vessel, the first barge from the first port to the first location, wherein the first support vessel is one of a plurality of support vessels of the distribution system;
    causing the first support vessel to release the first barge at approximately the first location at a first time;
    selecting a second location within the ocean, wherein the second location is within the flow path of the first current;
    determining a first flow rate associated with the flow path of the first current;
    predicting a second time at which the first barge will arrive at the second location based at least in part on the first time and the first flow rate;
    causing a second support vessel to travel to approximately the second location not later than the second time; and
    transferring, by the second support vessel, the first barge from the second location to a third location outside of the flow path of the first current.

2. The method of claim 1, further comprising:
receiving an order for at least one of the plurality of items, wherein the order specifies a fourth location for a delivery of the one of the plurality of items, wherein the first barge is transferred from the second location to the third location outside of the flow path of the first current in response to receiving the order, and wherein the third location is associated with a second port having access to the ocean; and
transporting the at least one of the plurality of items from the third location to the fourth location by at least one ground vehicle.

3. The method of claim 1, further comprising:
selecting the third location within the ocean, wherein the third location is within a flow path of a second current of the ocean;
determining a second flow rate associated with the flow path of the second current;
selecting a fourth location within the ocean, wherein the fourth location is within the flow path of the second current;
predicting a third time at which the first barge will arrive at the fourth location based at least in part on the second flow rate;
causing a third support vessel to travel to approximately the fourth location not later than the third time; and
transferring, by the third support vessel, the first barge from the fourth location to a fifth location outside of the flow path of the second current.

4. The method of claim 1, wherein determining the first flow rate associated with the flow path of the first current comprises:
determining velocities of each of the plurality of barges, wherein each of the velocities is determined at one of a plurality of times, and wherein each of the barges is located on the ocean at the one of the plurality of times;
providing the velocities and the plurality of times to at least one machine learning tool as inputs;
receiving at least one output from the at least one machine learning tool; and
determining at least the first flow rate based at least in part on the at least one output.

5. A method comprising:
loading at least a plurality of items onto a first carrying vessel at a first location;
identifying at least a first aquatic flow path passing within a vicinity of the first location;
determining at least a first flow rate associated with the first aquatic flow path;
transporting, by at least a first support vessel, the first carrying vessel from the first location to a second location within the first aquatic flow path;
selecting a third location within the first aquatic flow path;
determining a first time of arrival of the first carrying vessel at the third location based at least in part on the first flow rate;
causing a second support vessel to travel to at least the third location prior to the first time of arrival; and
transporting, by at least the second support vessel, the first carrying vessel from the third location within the first aquatic flow path to a fourth location.

6. The method of claim 5, wherein the fourth location is within a second aquatic flow path, and
wherein the method further comprises:
determining at least a second flow rate associated with the second aquatic flow path;
selecting a fifth location within the second aquatic flow path;
determining a second time of arrival of the first carrying vessel at the fifth location based at least in part on the second flow rate;
causing a third support vessel to travel to at least the fifth location prior to the second time of arrival; and
transporting, by at least the third support vessel, the first carrying vessel from the fifth location within the second aquatic flow path to a sixth location.

7. The method of claim 6, further comprising:
determining an optimal route from the first location to the sixth location, wherein the optimal route comprises the first aquatic flow path and the second aquatic flow path.

8. The method of claim 5, wherein the first carrying vessel is transported to the second location at a first time, and
wherein the method further comprises:
identifying at least one set of locations associated with the first aquatic flow path based at least in part on the first flow rate;
determining an expected location of the first carrying vessel at a second time based at least in part on the set of locations and the first time;
determining an actual location of the first carrying vessel at the second time;
determining that the expected location of the first carrying vessel at the second time is not consistent with the actual location of the first carrying vessel at the second time;
in response to determining that the expected location of the first carrying vessel at the second time is not consistent with the actual location of the first carrying vessel at the second time,
causing a third support vessel to travel to the actual location of the first carrying vessel at the second time; and
transporting, by at least the second support vessel, the first carrying vessel from the actual location of the first carrying vessel at the second time within the first aquatic flow path to one of the set of locations.

9. The method of claim 8, wherein each of the set of locations is associated with a first track of the first flow path, and
wherein the method further comprises:
updating at least one of the first time of arrival or the first track based at least in part on the actual location of the first carrying vessel at the second time.

10. The method of claim 5, wherein transporting the first carrying vessel from the first location to the second location within the first aquatic flow path comprises:
engaging the first support vessel with the first carrying vessel by one of direct contact or at least one line at approximately the first location; and
disengaging the first support vessel from the first carrying vessel at approximately the second location, wherein disengaging the first support vessel from the first carrying vessel comprises at least one of:
opening the direct contact; or
removing an end of the at least one line from one of the first carrying vessel or the first support vessel.

11. The method of claim 5, wherein the first carrier vehicle is a barge having a substantially flat bottom and at least one of a deck, a cargo bay or a storage compartment for receiving at least some of the plurality of items.

12. The method of claim 5, wherein the first carrier vehicle is coupled to a second carrier vehicle, and
wherein transporting the first carrying vessel comprises:

transporting, by at least the first support vessel, at least the first carrying vessel and the second carrying vessel from the first location to the second location within the first aquatic flow path.

13. The method of claim 5, wherein the first support vessel is one of a towboat or a tugboat.

14. The method of claim 5, further comprising:
receiving an order for delivery of at least a first item to a fifth location;
determining that the first item is aboard the first carrier vehicle;
retrieving the first item from the first carrier vehicle at the fourth location, wherein the fourth location is associated with a port; and
causing a delivery of the first item from the fourth location to the fifth location.

15. The method of claim 5, further comprising:
receiving, from a plurality of carrying vessels, positions of each of the plurality of carrying vessels at a plurality of times, wherein each of the plurality of carrying vessels is operating on at least one body of water at one of the plurality of times;
providing the positions of each of the plurality of carrying vessels and the times to a machine learning tool as inputs;
receiving at least one output from the machine learning tool; and
determining at least the first flow rate based at least in part on the at least one output.

16. The method of claim 5, wherein the first carrying vessel is outfitted with at least one imaging device and at least one engagement system, and
wherein the method further comprises:
capturing at least one image by the at least one imaging device;
detecting at least one object within water of the first aquatic flow path in the at least one image; and
retrieving, by the engagement system, the at least one object from the water of the first aquatic flow path.

17. The method of claim 5, wherein the first flow path is at least a portion of the Gulf Stream current of the Atlantic Ocean.

18. A method comprising:
determining that a plurality of items are stored in a carrying vessel traveling in a first aquatic flow path at a first time;
selecting a first location within the first aquatic flow path, wherein the first location is downstream of the carrying vessel at the first time;
determining a first flow rate of the first aquatic flow path;
calculating a second time at which the carrying vessel will arrive at the first location based at least in part on the first time and the first flow rate;
transmitting at least a first set of instructions to a first support vessel, wherein the first set of instructions instruct the first support vessel to at least:
travel to the first location prior to the second time; and
engage with the carrying vessel at approximately the first location;
determining that the first support vessel is engaged with the carrying vessel within the first aquatic flow path;
selecting a second location within a second aquatic flow path; and
transmitting at least a second set of instructions to the first support vessel, wherein the second set of instructions instruct the first support vessel to at least:
transport the carrying vessel to the second location; and
disengage from the carrying vessel at approximately the second location.

19. The method of claim 18, further comprising:
determining a second flow rate of the second aquatic flow path;
selecting a third location within the second aquatic flow path, wherein the third location is downstream of the second location;
calculating a third time at which the carrying vessel will arrive at the third location based at least in part on the second flow rate;
transmitting at least a third set of instructions to a second support vessel, wherein the third set of instructions instruct the second support vessel to at least:
travel to the third location prior to the third time; and
engage with the carrying vessel at approximately the first location;
determining that the second support vessel is engaged with the carrying vessel within the second aquatic flow path;
selecting a fourth location outside of the second aquatic flow path, wherein the fourth location is associated with a port; and
transmitting at least a fourth set of instructions to the second support vessel, wherein the fourth set of instructions instruct the second support vessel to at least:
transport the carrying vessel to the fourth location.

20. The method of claim 18, wherein the carrying vessel is one of:
a barge having a substantially flat bottom and at least one of a deck, a cargo bay or a storage compartment for storing at least some of the plurality of items; or
a submersible having at least one of a cargo bay or a storage compartment for storing at least some of the plurality of items.

\* \* \* \* \*